(12) United States Patent
Villaescusa

(10) Patent No.: US 12,319,039 B2
(45) Date of Patent: Jun. 3, 2025

(54) MATERIAL, A LAYERED OR LAMINATED MATERIAL, FORMWORK AND OR CONSTRUCTION ELEMENT

(71) Applicant: PLASTIC FREE PACKAGING PTY LTD, Sydney (AU)

(72) Inventor: Mariano Villaescusa, Sydney (AU)

(73) Assignee: PLASTIC FREE PACKAGING PARTY LTD, Sydney (AU)

( * ) Notice: Subject to any disclaimer, the term of this patent is extended or adjusted under 35 U.S.C. 154(b) by 460 days.

(21) Appl. No.: 17/428,354

(22) PCT Filed: Feb. 4, 2020

(86) PCT No.: PCT/AU2020/050077
§ 371 (c)(1),
(2) Date: Aug. 4, 2021

(87) PCT Pub. No.: WO2020/160603
PCT Pub. Date: Aug. 13, 2020

(65) Prior Publication Data
US 2022/0126553 A1    Apr. 28, 2022

(30) Foreign Application Priority Data

Feb. 4, 2019 (AU) .................... 2019900327
Apr. 11, 2019 (AU) .................... 2019901250
Apr. 11, 2019 (AU) .................... 2019901252

(51) Int. Cl.
*B32B 29/00* (2006.01)
*B32B 1/08* (2006.01)
(Continued)

(52) U.S. Cl.
CPC ............. *B32B 29/005* (2013.01); *B32B 1/08* (2013.01); *B32B 5/024* (2013.01); *B32B 27/10* (2013.01);
(Continued)

(58) Field of Classification Search
CPC .......... B31C 1/083; B32B 1/08; B32B 15/12; B32B 15/20; B32B 2250/02;
(Continued)

(56) References Cited

U.S. PATENT DOCUMENTS 2,739,092 A    1/1956 Stevenson
3,629,048 A    12/1971 Davison
(Continued)

FOREIGN PATENT DOCUMENTS

AU    784695    6/2006
CN    201172776    12/2008
(Continued)

OTHER PUBLICATIONS

PCT, "International Search Report and Written Opinion," issued in connection with Application No. PCT/AU2020/050077, May 19, 2020, 13 pages.
(Continued)

*Primary Examiner* — Yan Lan
(74) *Attorney, Agent, or Firm* — McAndrews Held & Malloy, Ltd.

(57) ABSTRACT

The invention relates to a method of making a paper product 10, 10.01 to 10.14, wherein the method includes the step of adding natural reinforcing material (31, 31.1, 51, 51.1, 61, 61.1, 71, 71.1) to one of: a) a layer of pulp as it exits or after it exits from a layer formation process or apparatus; or b) a tank 20, 20.1, 20.2 of pulp prior to it exiting from a layer formation process or apparatus; or c) a combination of a) and b). Additionally, the invention relates to paper products made by this process. The present invention also provides a multi-layered material 2.10, 2.10", 2.10.1, 2.100 to 2.1600, and 100 to 1900, and a layer treatment of a layer or layers
(Continued)

of a multilayered material, and a multilayered material which has had such a layer or layers treated by such a layer treatment.

19 Claims, 52 Drawing Sheets

(51) Int. Cl.
| | |
|---|---|
| *B32B 5/02* | (2006.01) |
| *B32B 27/10* | (2006.01) |
| *B32B 27/12* | (2006.01) |
| *B32B 29/02* | (2006.01) |
| *B32B 37/24* | (2006.01) |
| *B65D 30/08* | (2006.01) |
| *B65D 65/02* | (2006.01) |
| *D21H 11/12* | (2006.01) |
| *D21H 27/42* | (2006.01) |
| *B31C 1/08* | (2006.01) |
| *E04G 13/02* | (2006.01) |

(52) U.S. Cl.
CPC ............ *B32B 27/12* (2013.01); *B32B 29/02* (2013.01); *B32B 37/24* (2013.01); *B65D 31/02* (2013.01); *B65D 65/02* (2013.01); *D21H 11/12* (2013.01); *D21H 27/42* (2013.01); *B31C 1/083* (2013.01); *B32B 2255/12* (2013.01); *B32B 2307/54* (2013.01); *B32B 2307/7163* (2013.01); *B32B 2307/73* (2013.01); *B32B 2317/122* (2013.01); *B32B 2439/46* (2013.01); *B32B 2553/00* (2013.01); *B32B 2597/00* (2013.01); *E04G 13/02* (2013.01)

(58) Field of Classification Search
CPC ............ B32B 2250/03; B32B 2250/04; B32B 2250/05; B32B 2255/10; B32B 2255/12; B32B 2255/205; B32B 2255/26; B32B 2262/062; B32B 2262/065; B32B 2262/067; B32B 2262/08; B32B 2266/0228; B32B 2266/0278; B32B 2270/00; B32B 2272/00; B32B 2307/54; B32B 2307/7163; B32B 2307/718; B32B 2307/7265; B32B 2307/73; B32B 2317/122; B32B 2419/06; B32B 2439/46; B32B 2553/00; B32B 2597/00; B32B 27/08; B32B 27/10; B32B 27/12; B32B 27/32; B32B 27/36; B32B 29/005; B32B 29/007; B32B 29/02; B32B 29/08; B32B 3/266; B32B 37/24; B32B 5/022; B32B 5/024; B32B 5/026; B32B 5/18; B32B 7/12; B65D 31/02; B65D 65/02; D21H 11/12; D21H 15/00; D21H 15/06; D21H 21/18; D21H 23/22; D21H 27/10; D21H 27/32; D21H 27/34; D21H 27/42; E04G 13/02; E04G 9/021; E04G 9/08
See application file for complete search history.

(56) References Cited

U.S. PATENT DOCUMENTS

| | | | |
|---|---|---|---|
| 5,023,126 | A | 6/1991 | Stevens |
| 5,403,443 | A | 4/1995 | Ginestet i Cusso |
| 2005/0255981 | A1 | 11/2005 | Perini |
| 2005/0268274 | A1 | 12/2005 | Beuther |
| 2016/0040337 | A1 | 2/2016 | Dutkiewicz |
| 2018/0209101 | A1 | 7/2018 | Cabell |

FOREIGN PATENT DOCUMENTS

| | | |
|---|---|---|
| CN | 104499346 | 4/2015 |
| WO | 1993/014287 | 7/1993 |
| WO | 1996/012602 | 5/1996 |
| WO | 1998058119 | 12/1998 |
| WO | 2005/011972 | 2/2005 |
| WO | 2009/079702 | 7/2009 |
| WO | 2014075131 | 5/2014 |
| WO | 2017004111 | 1/2017 |
| WO | 2018/019789 | 2/2018 |

OTHER PUBLICATIONS

Verma, B.B., Continuaous jute fibre reinforced laminated paper composite and reinforcement-fibre free paper laminate. Bulletin of Materials Science, Feb. 27, 2010, vol. 32, pp. 589-595.

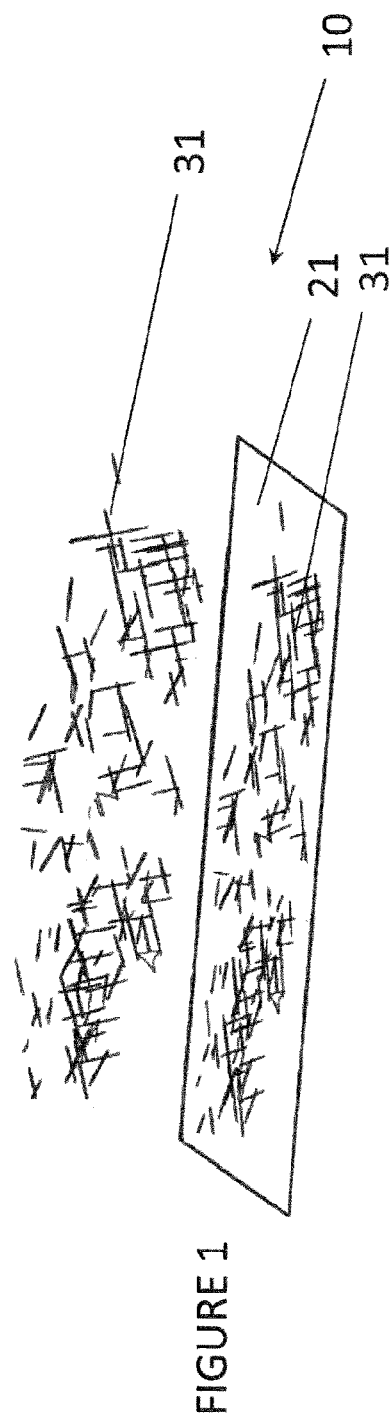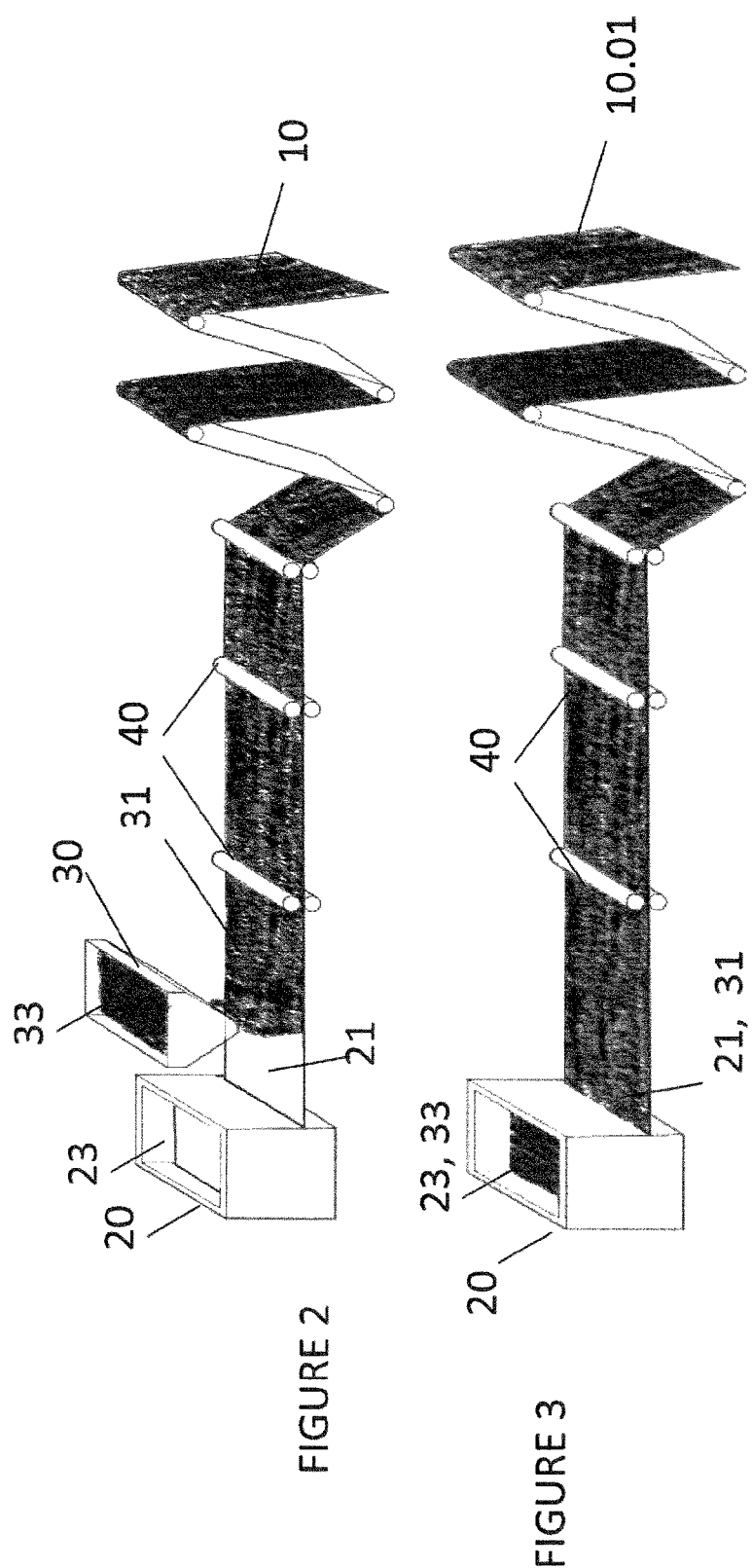
FIGURE 1
FIGURE 2
FIGURE 3

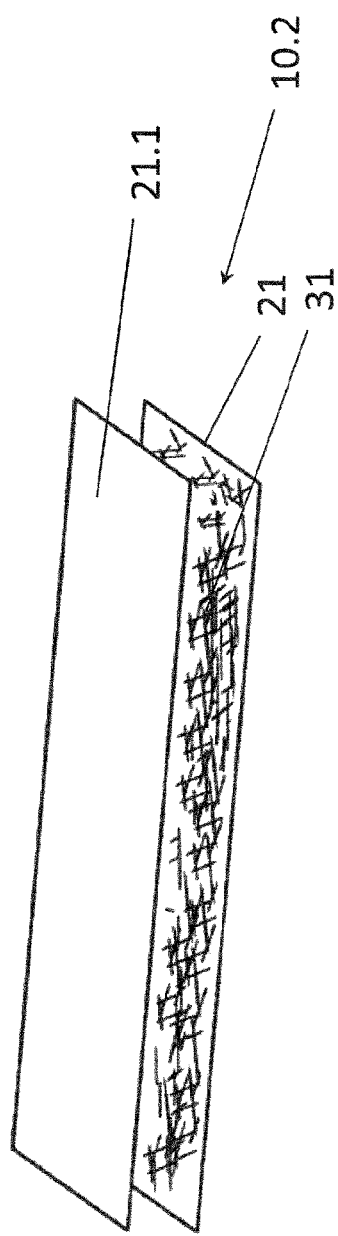
FIGURE 4
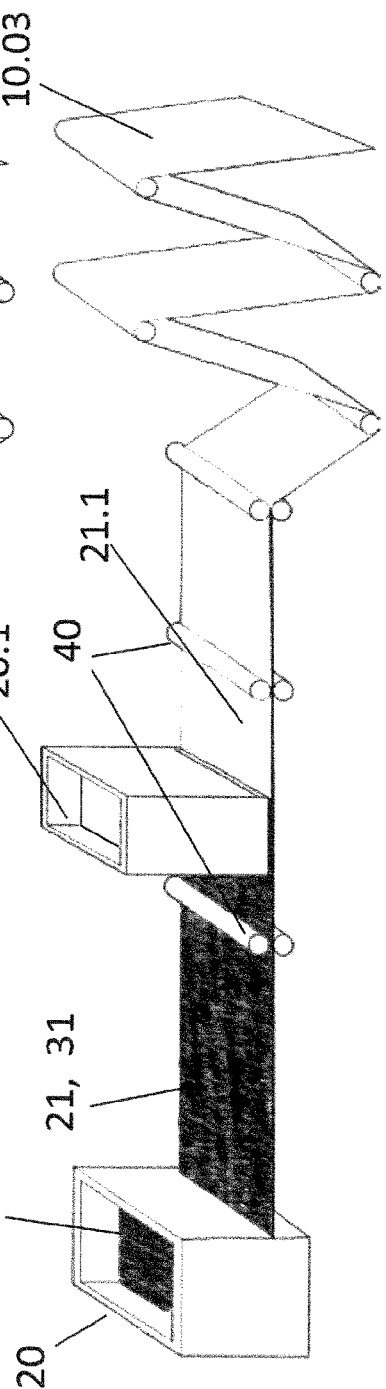
FIGURE 5
FIGURE 6

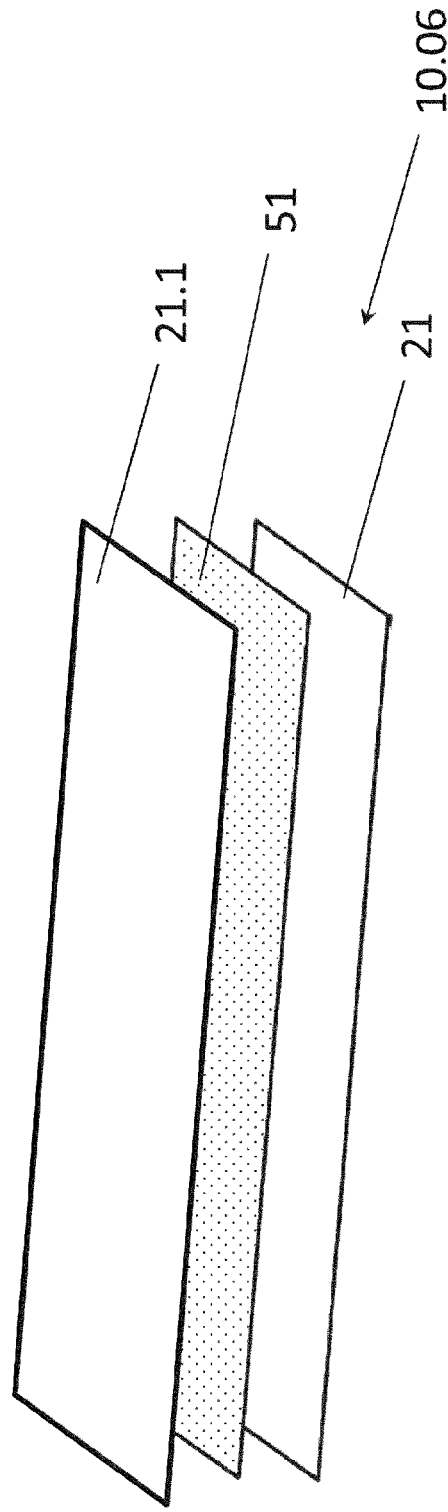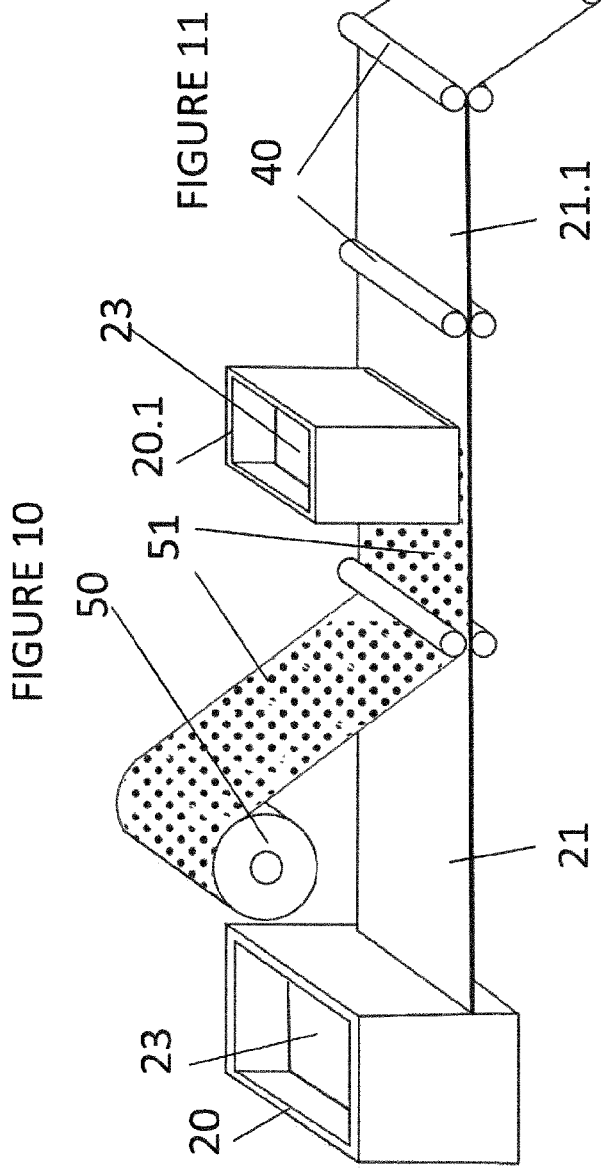

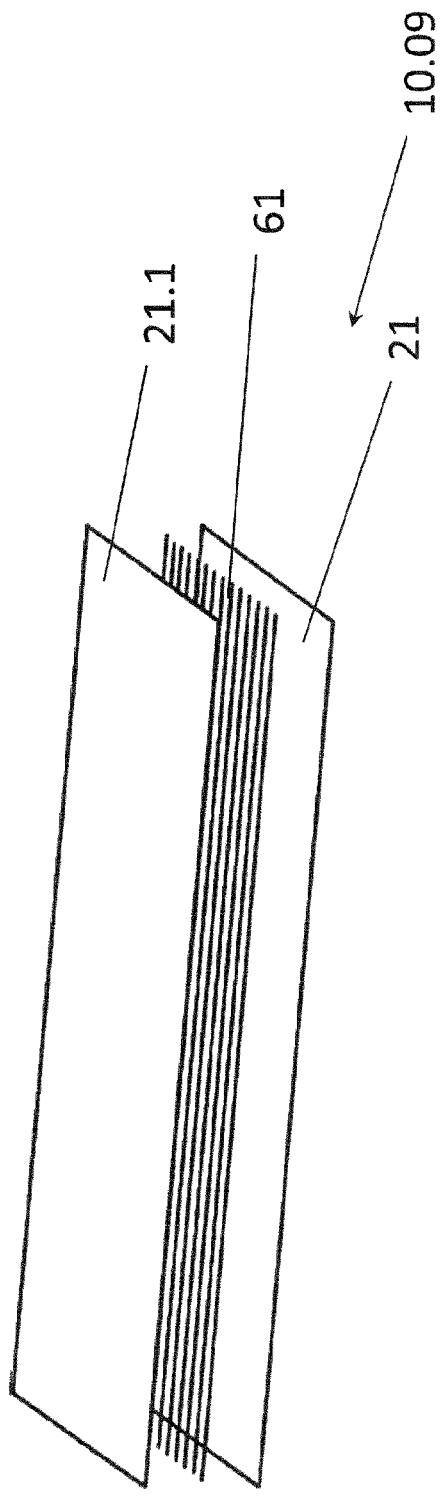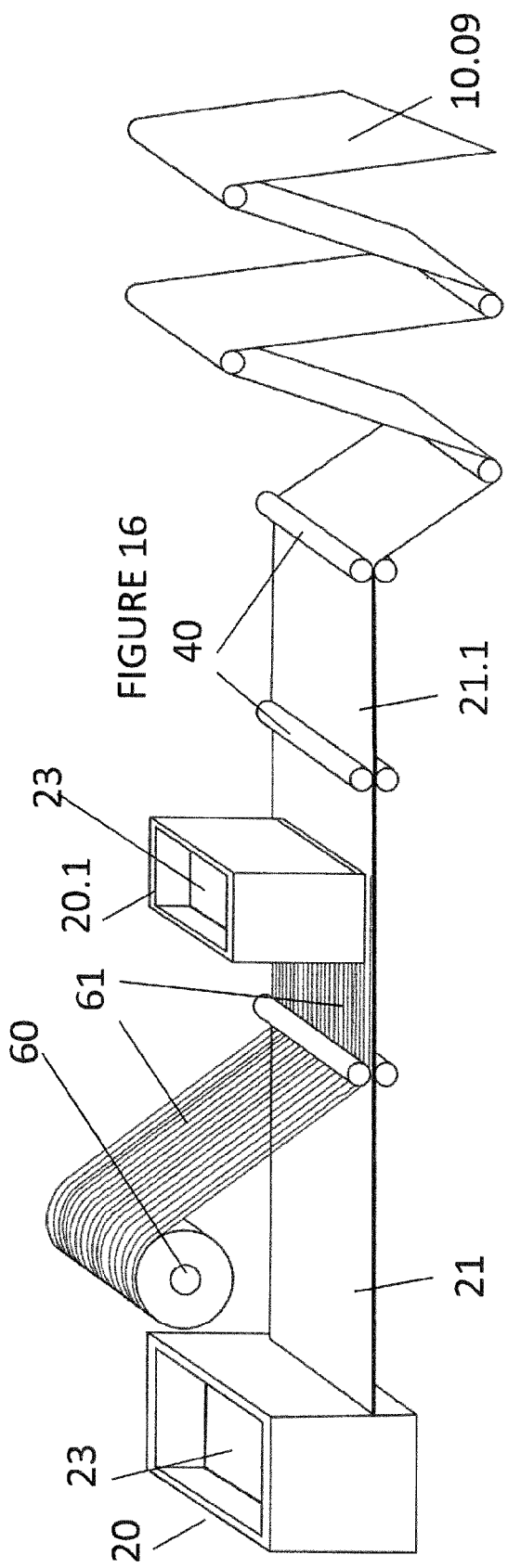

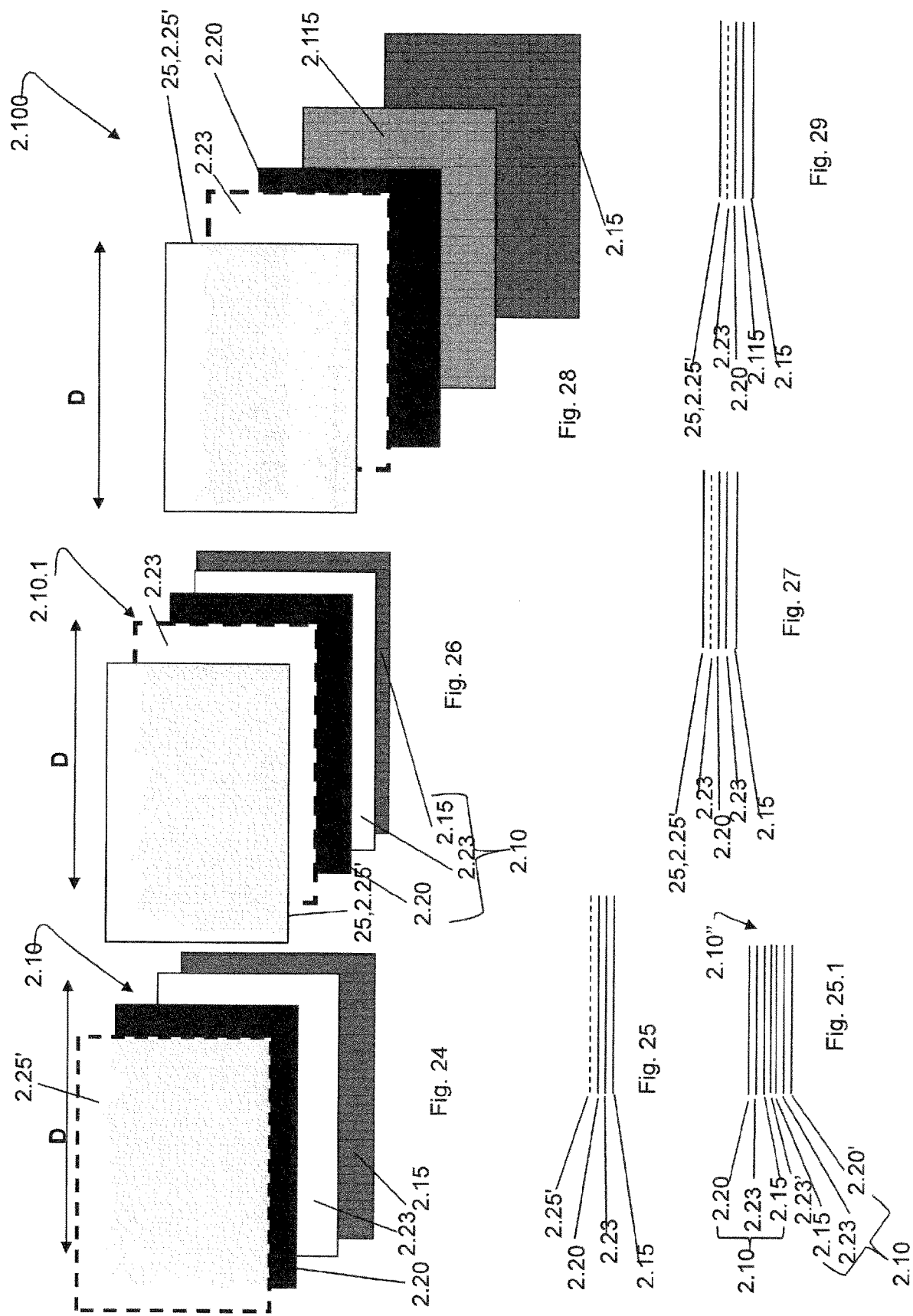

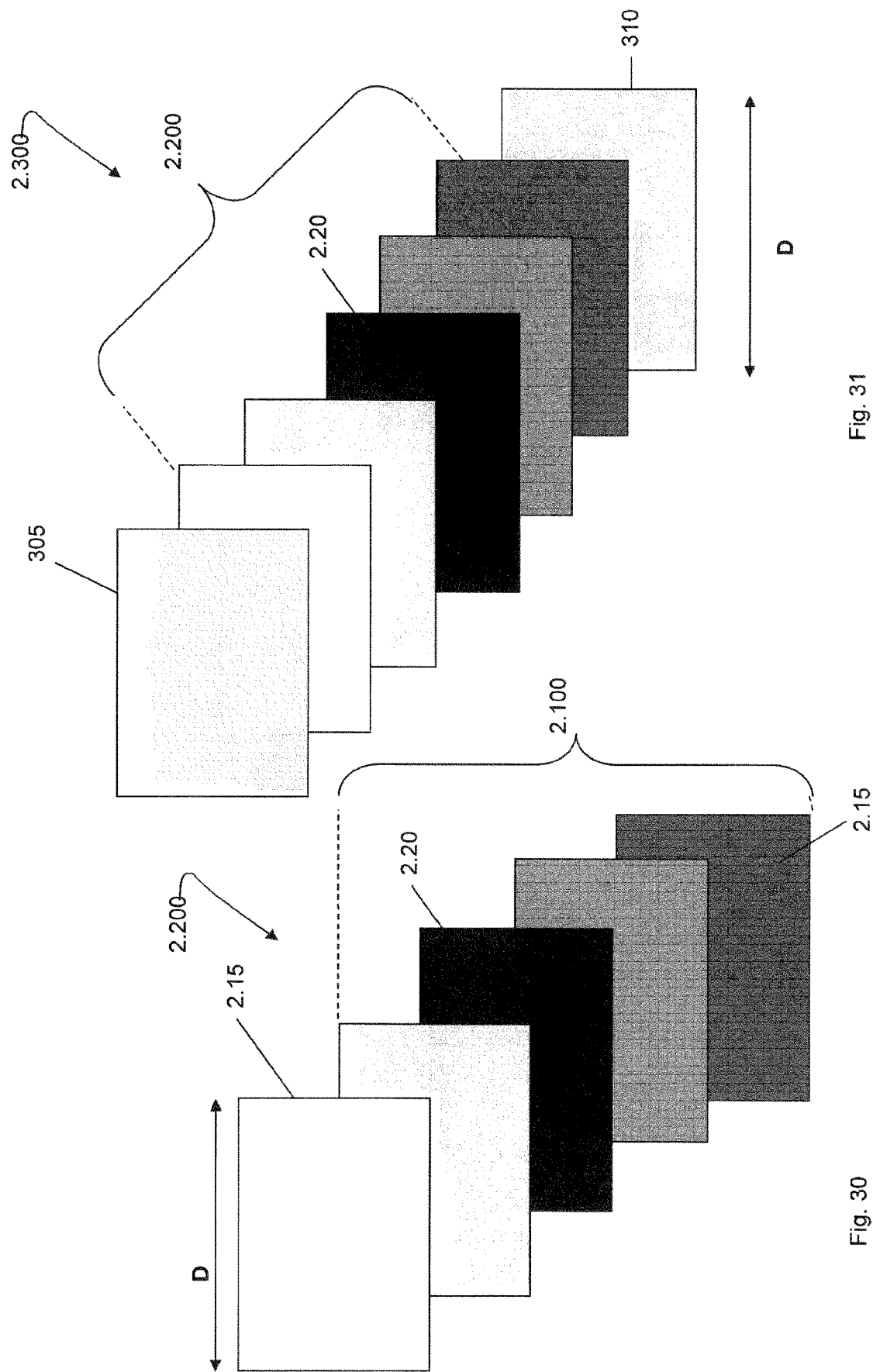

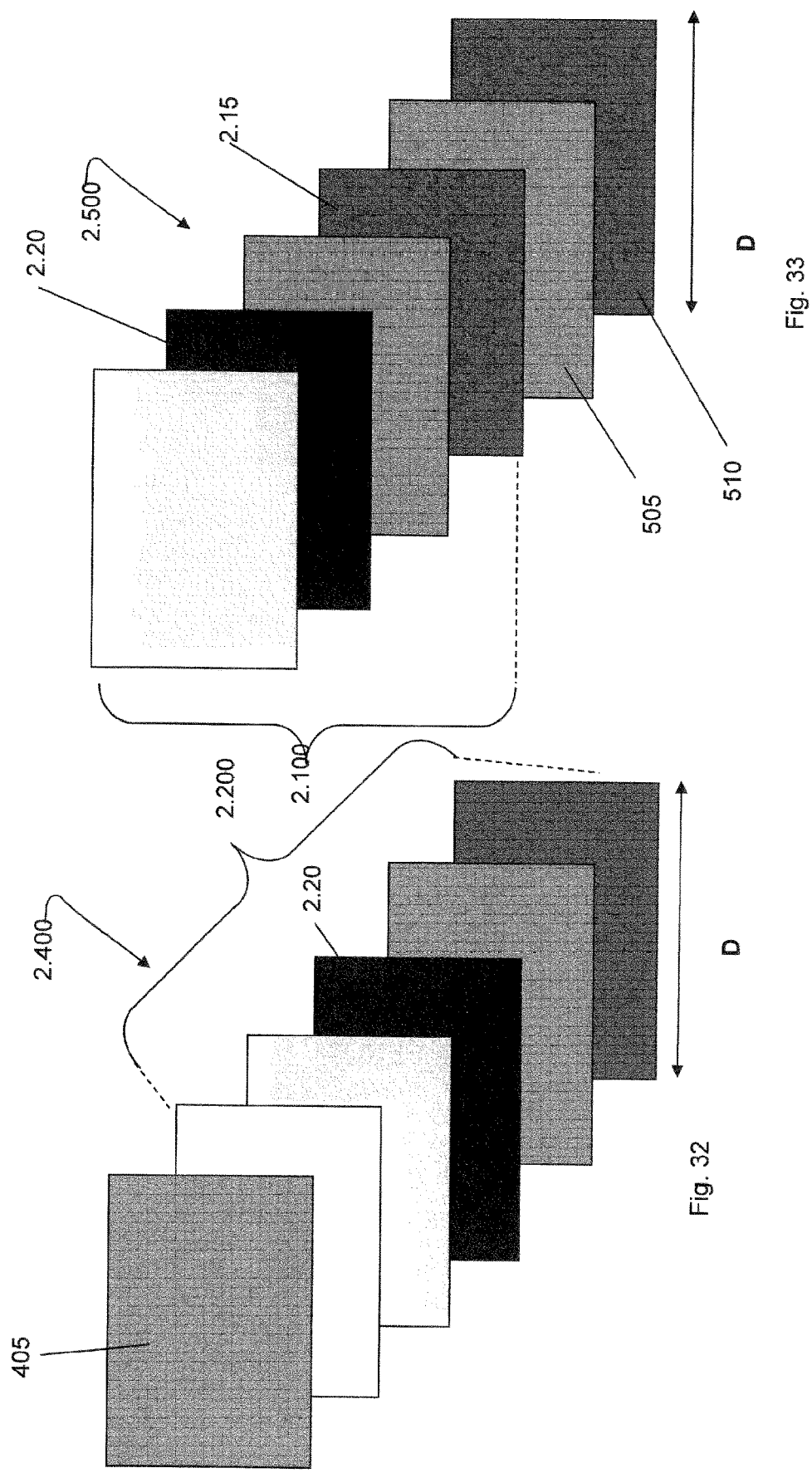

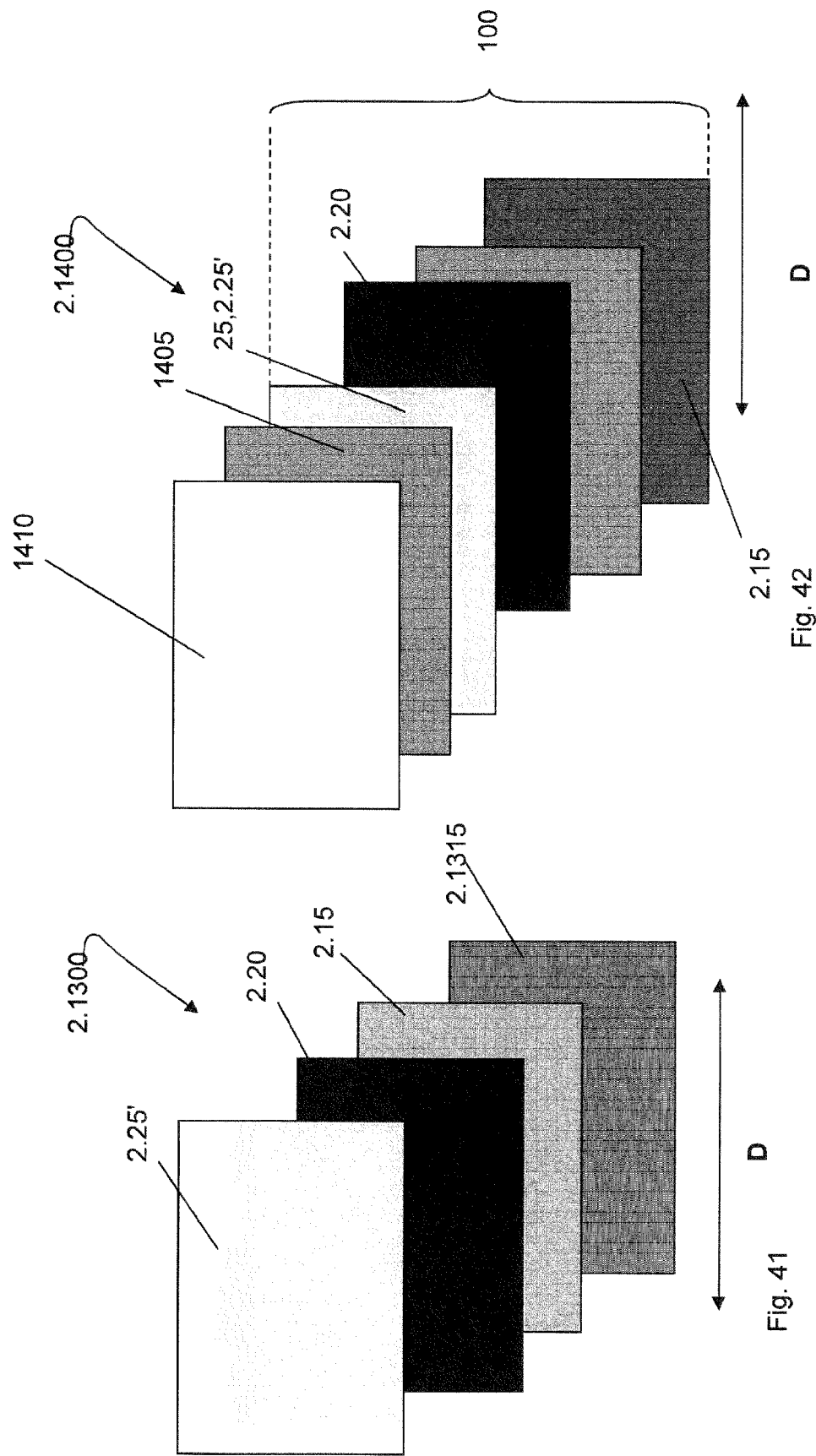

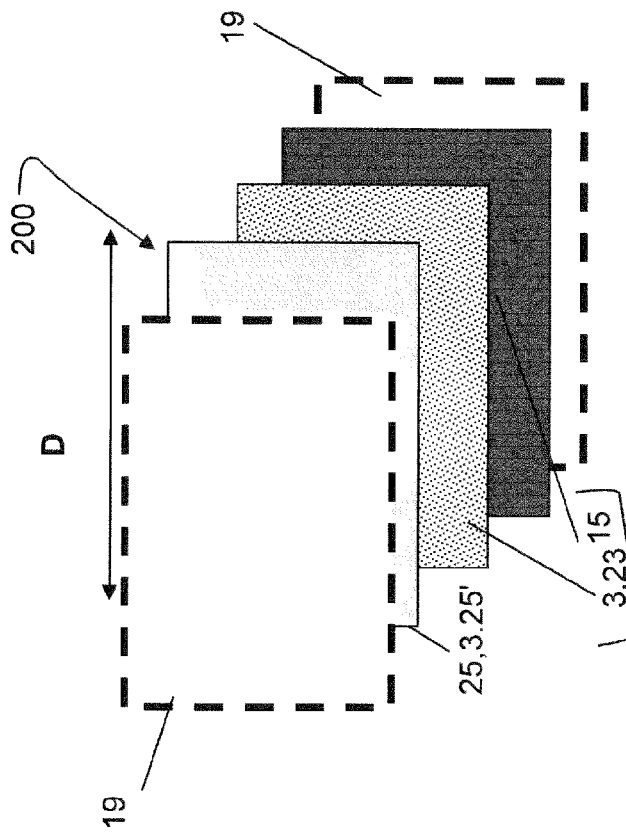
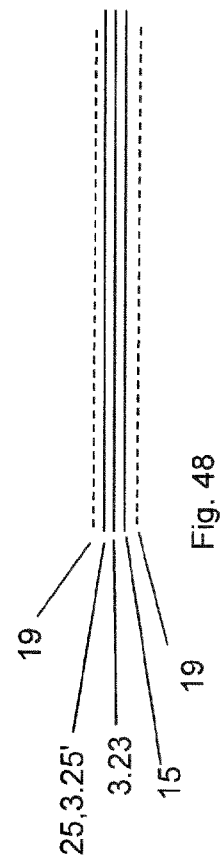
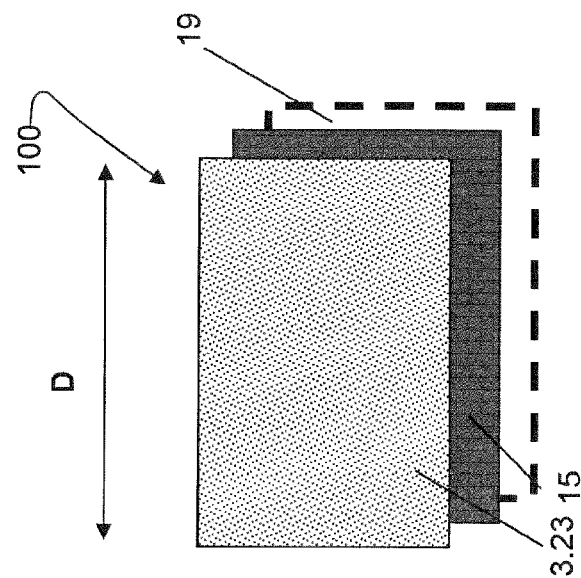
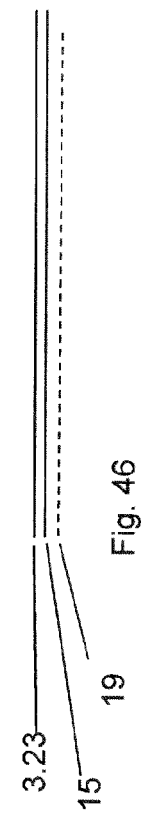

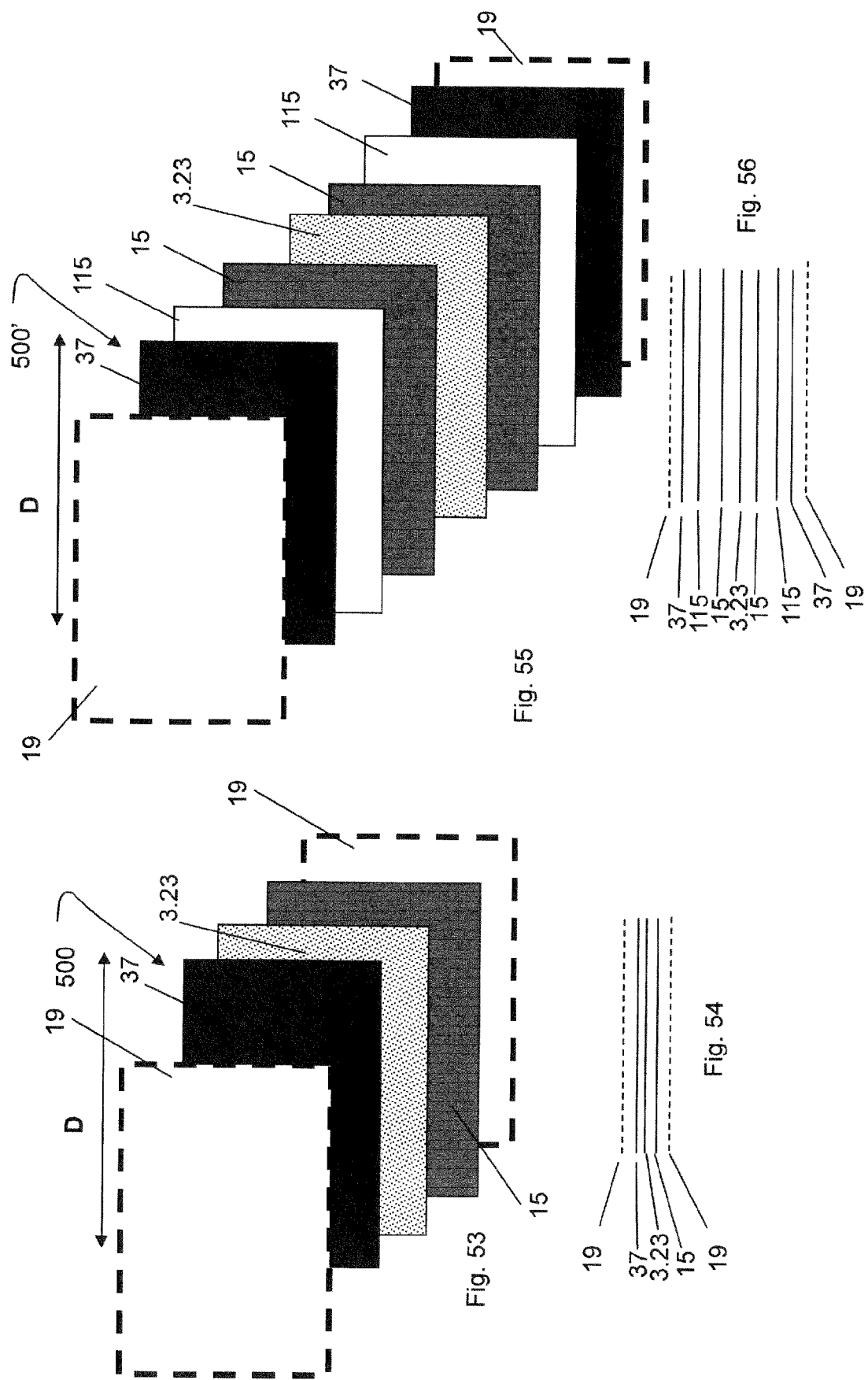

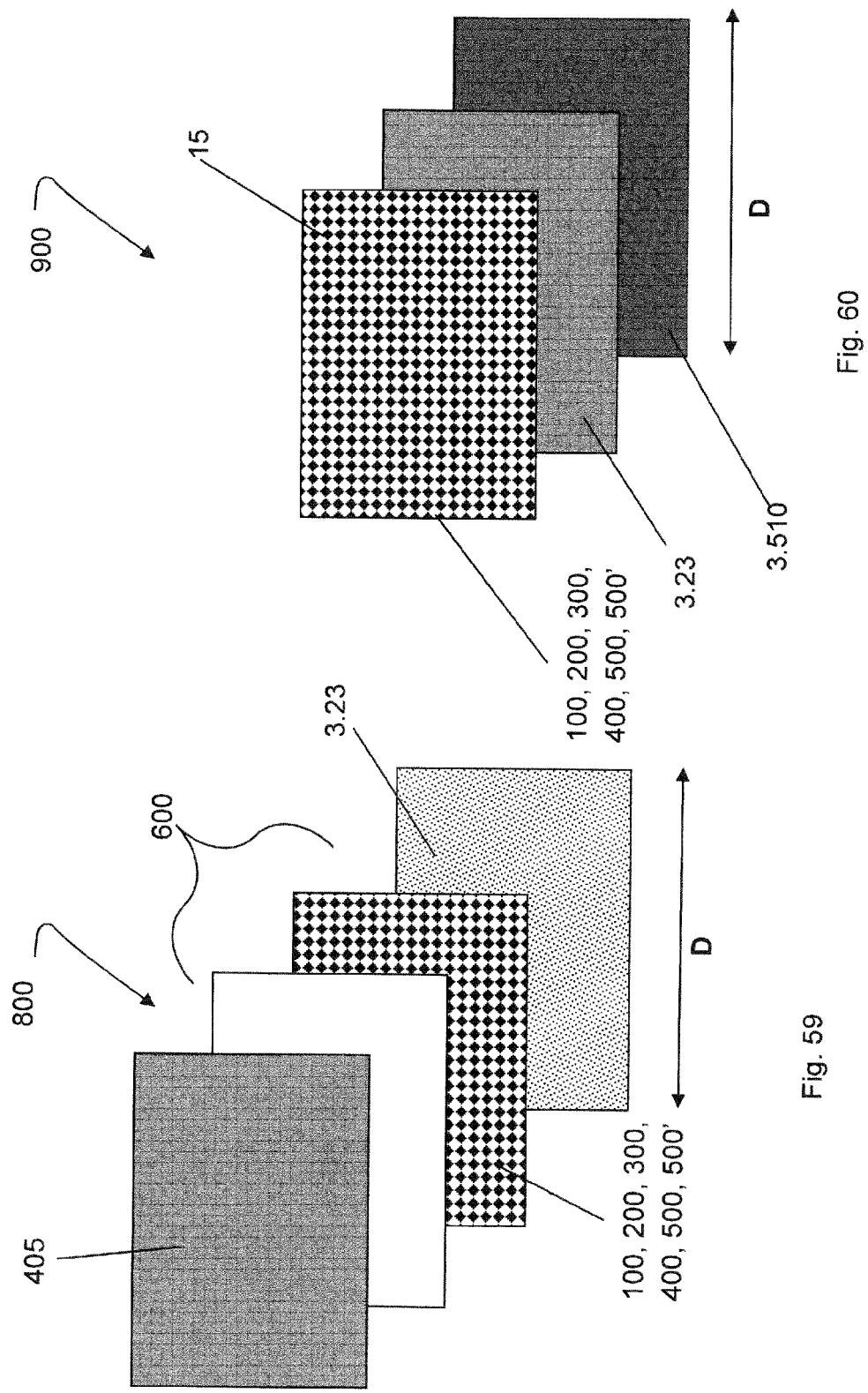

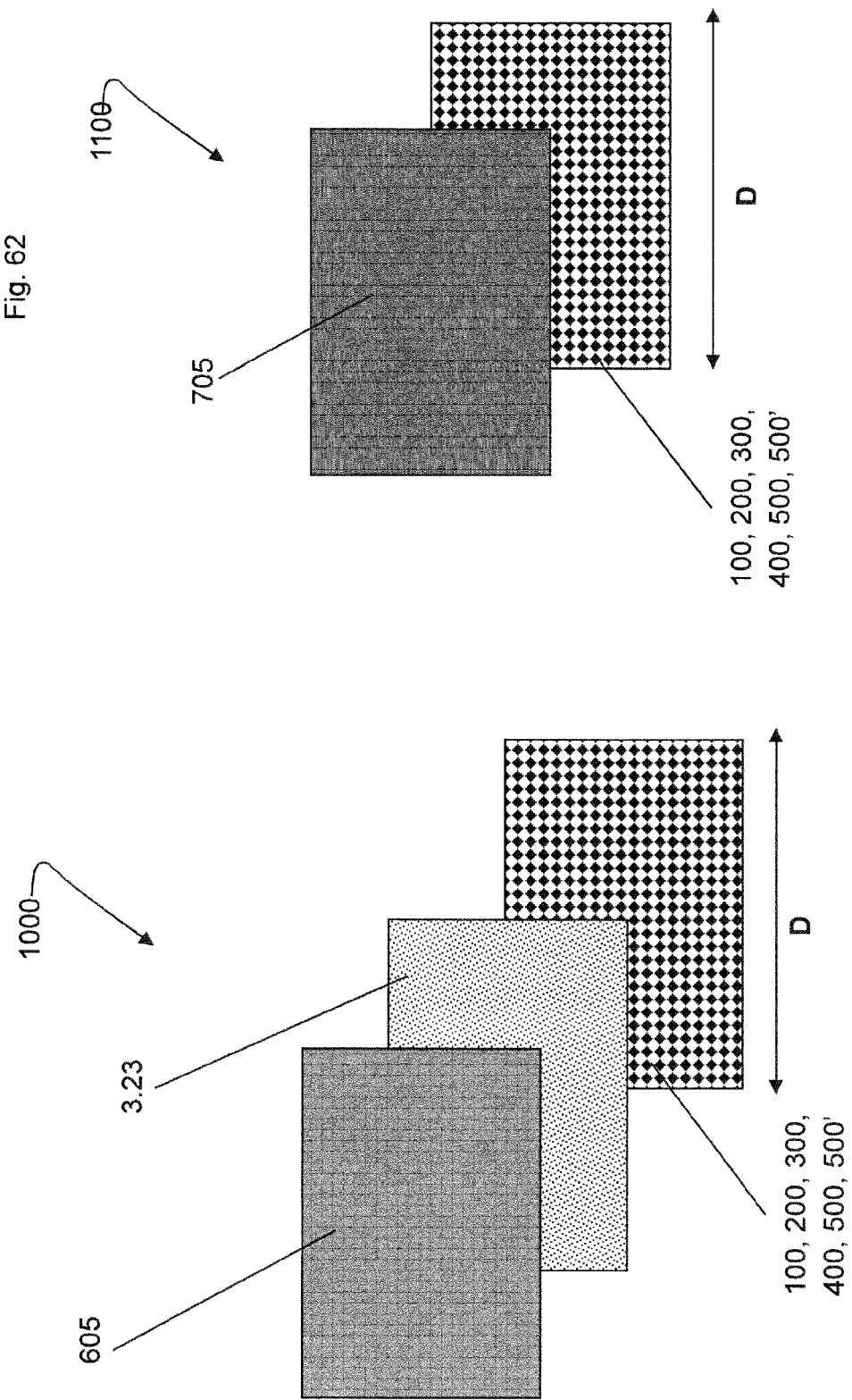

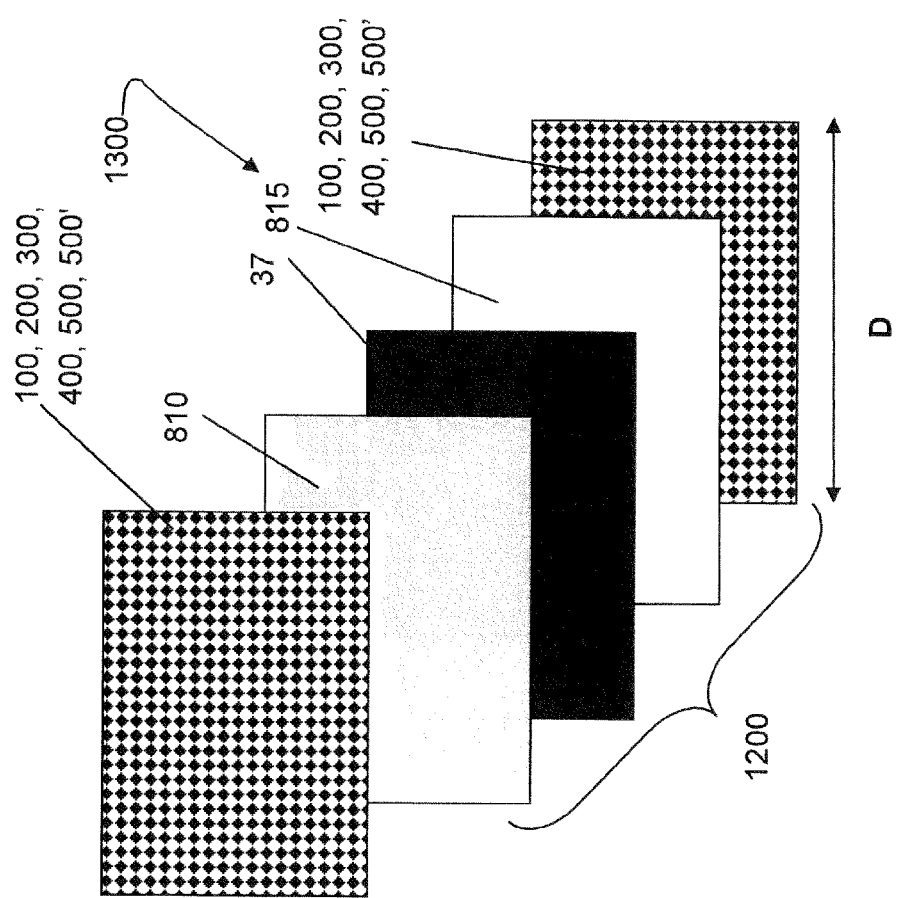
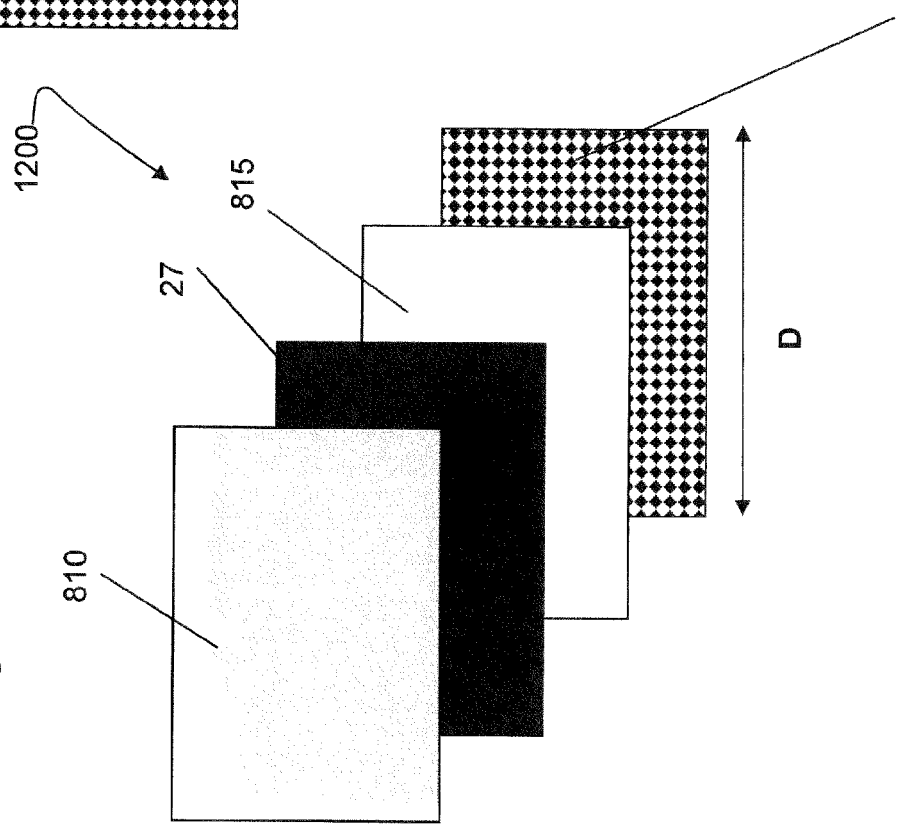

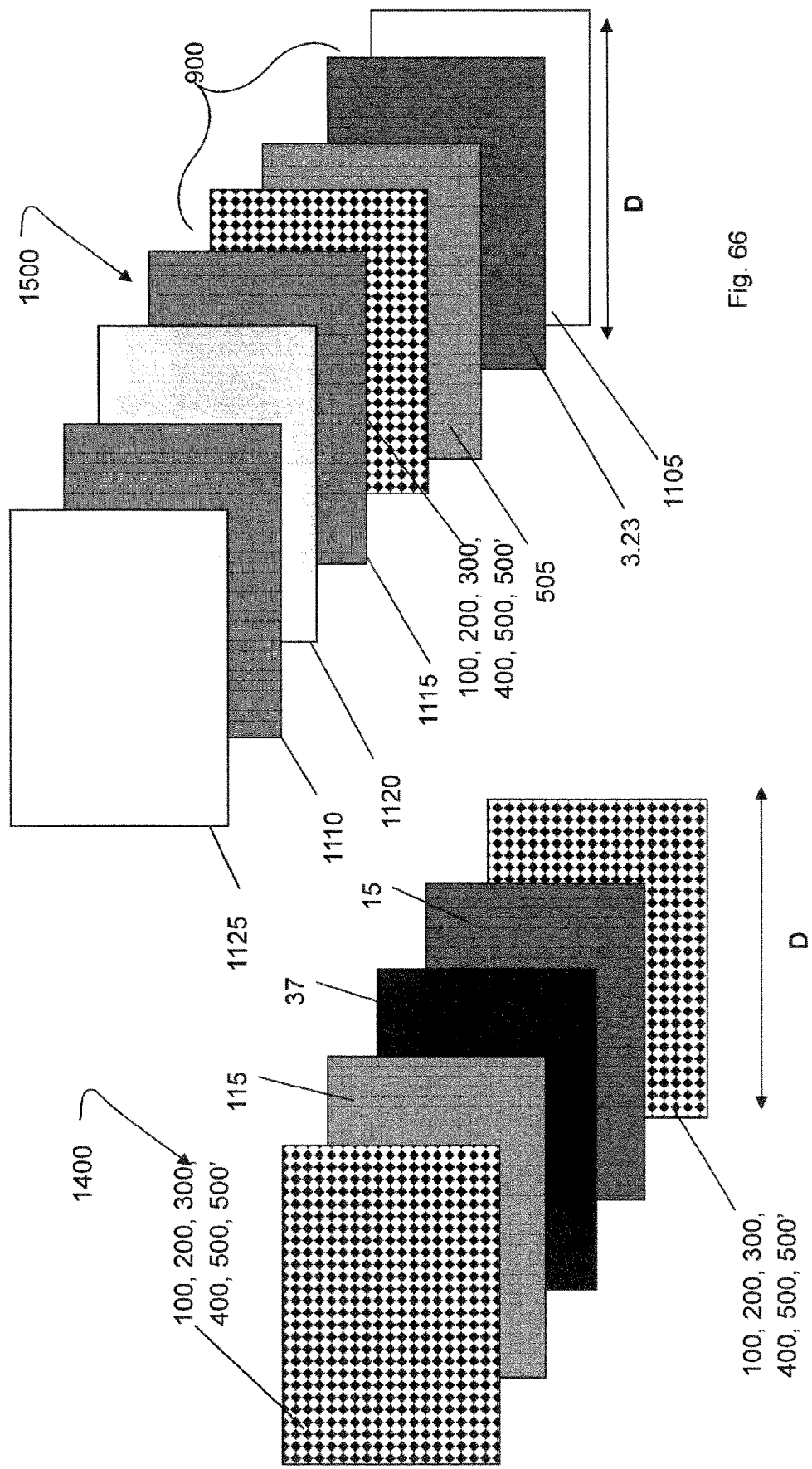

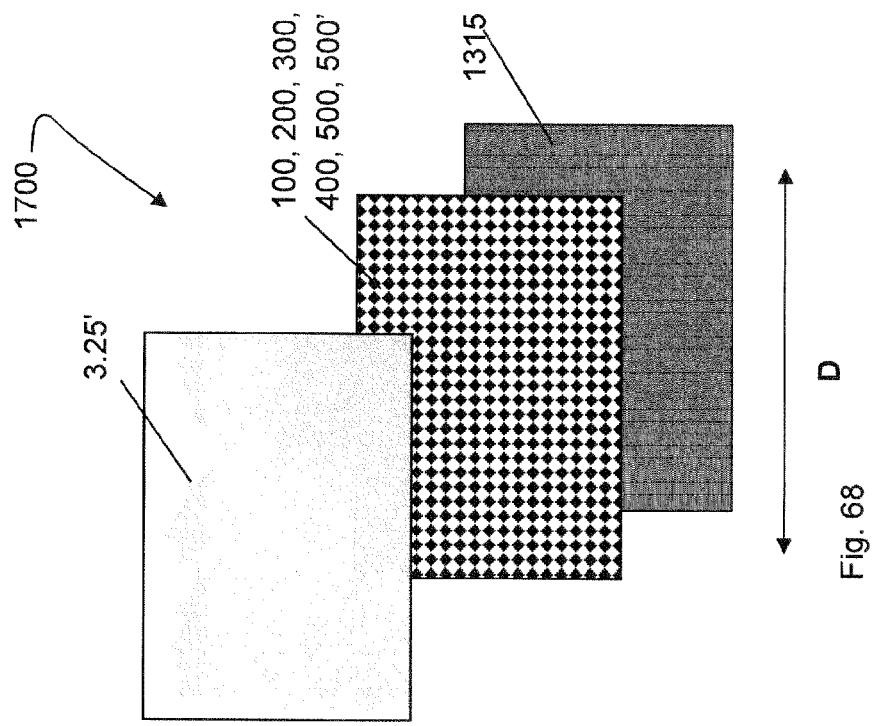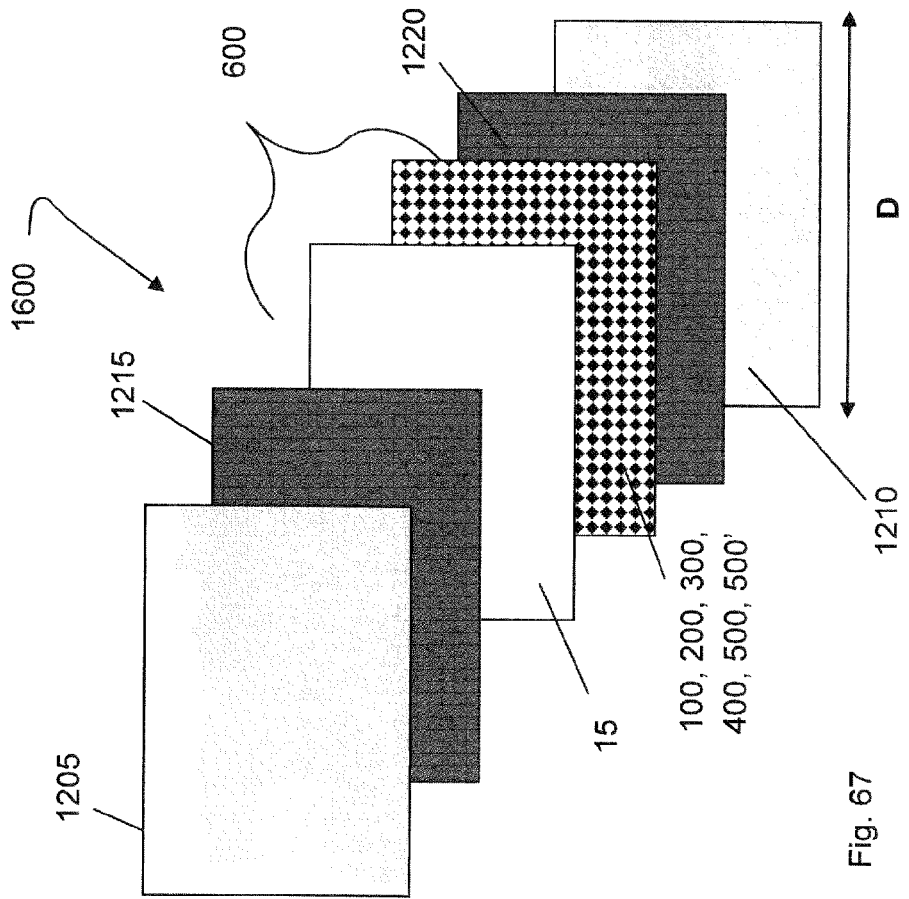

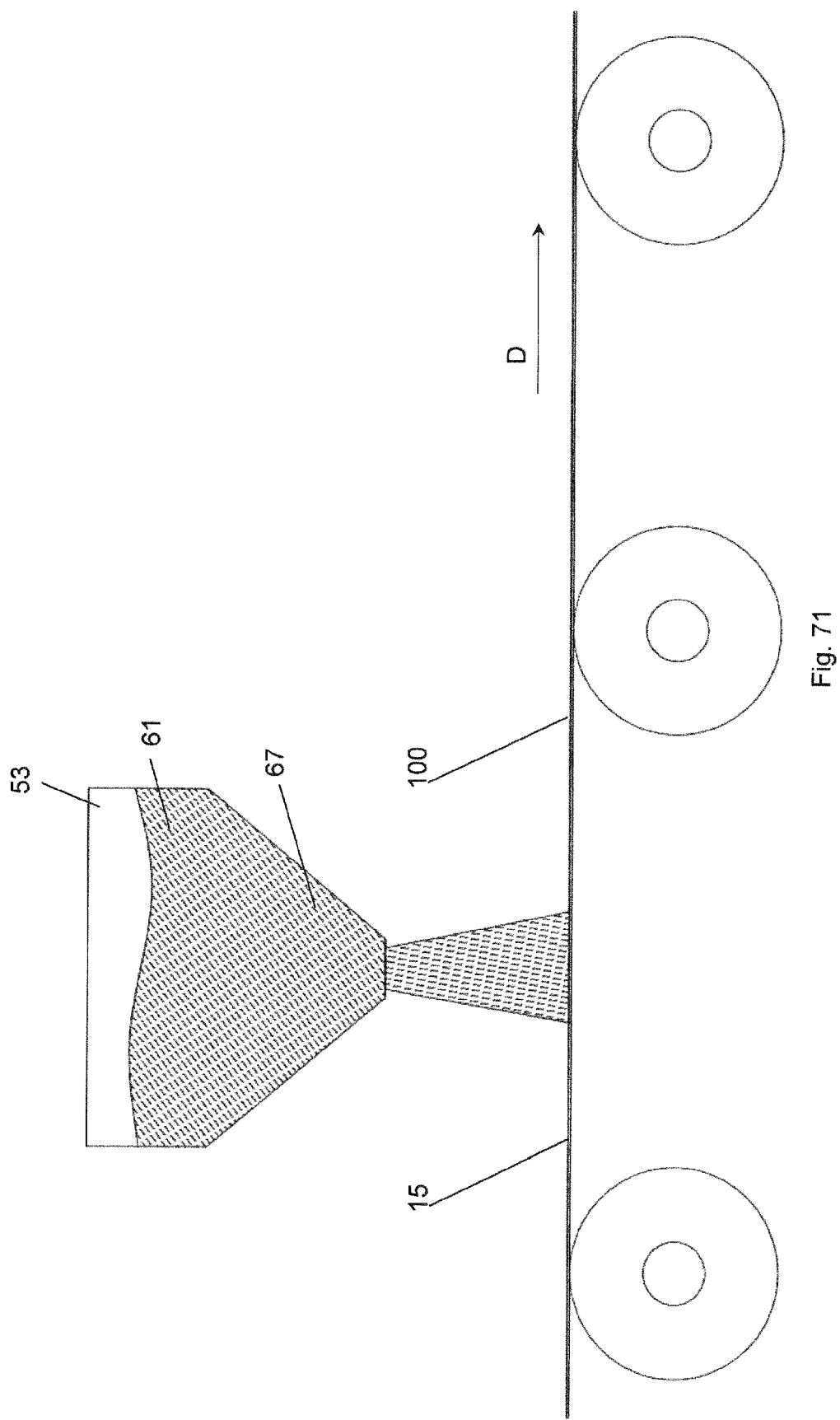

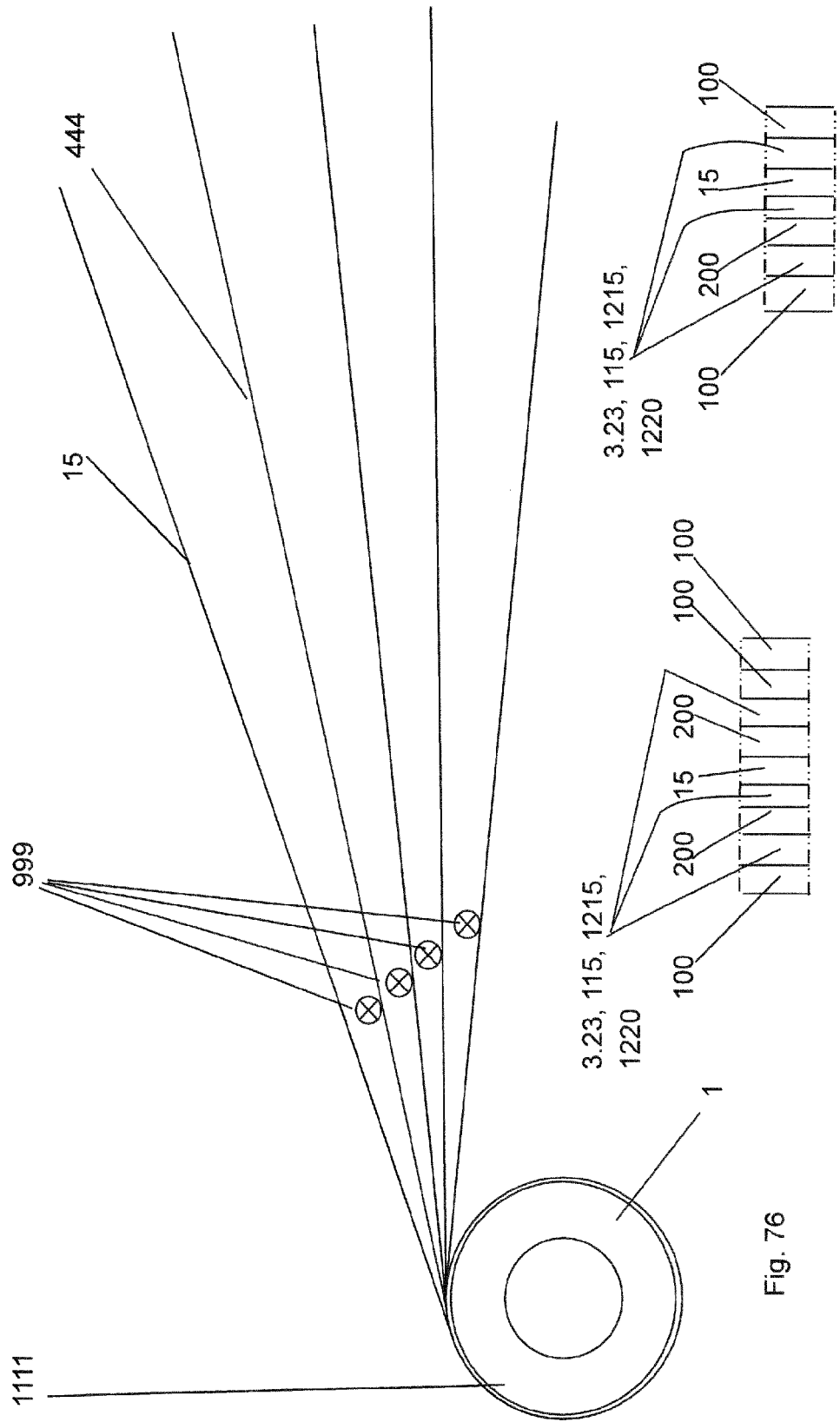

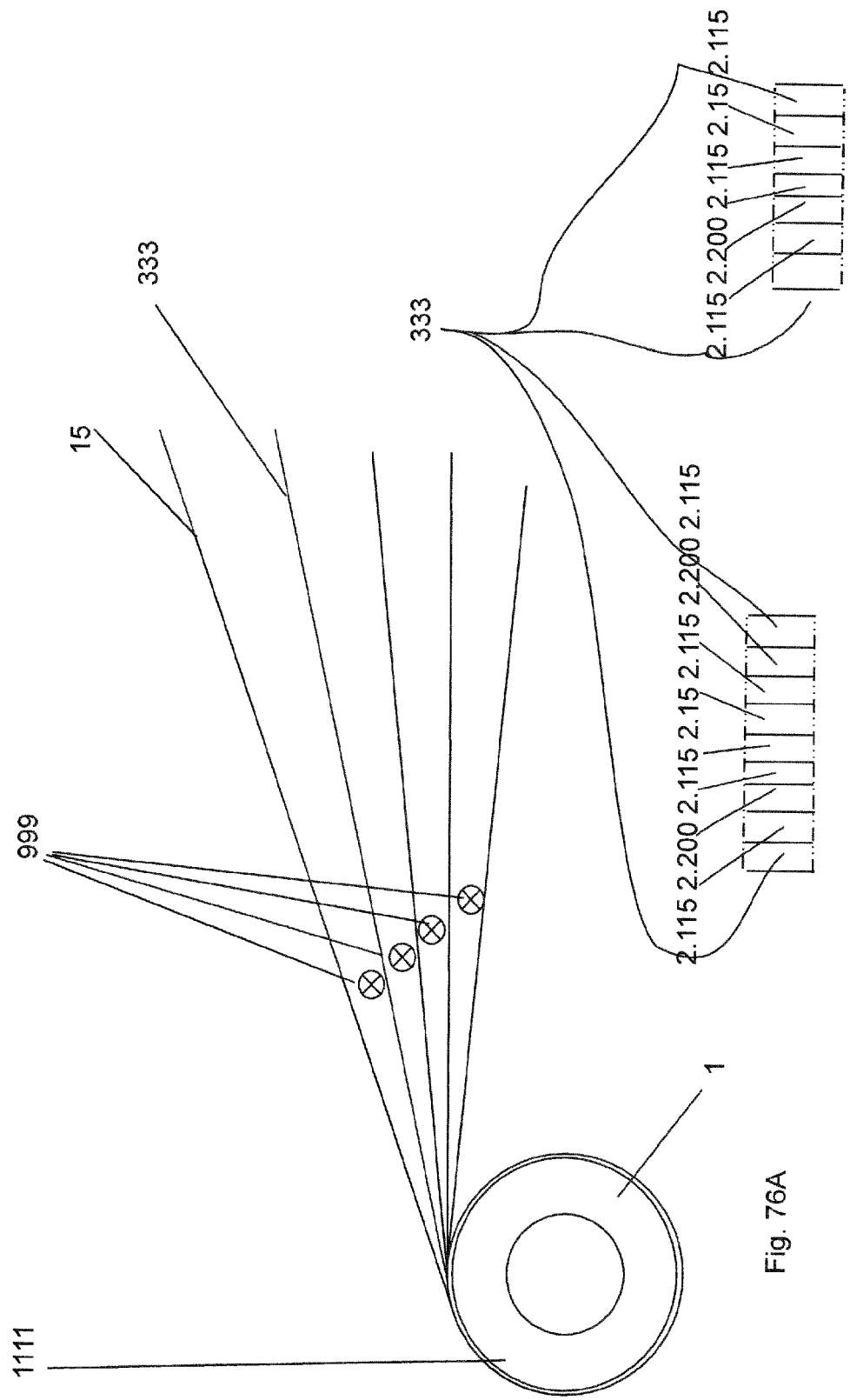

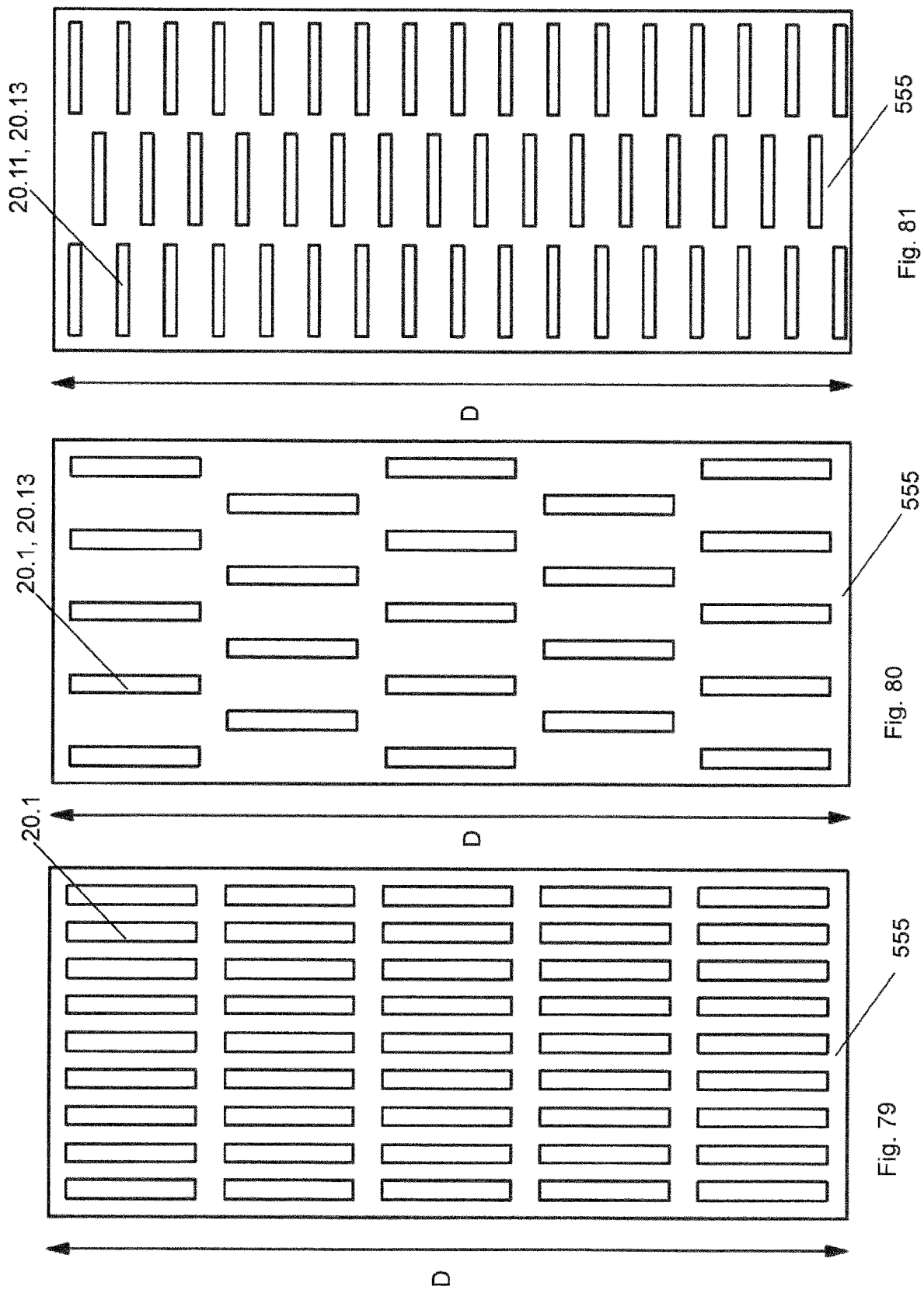

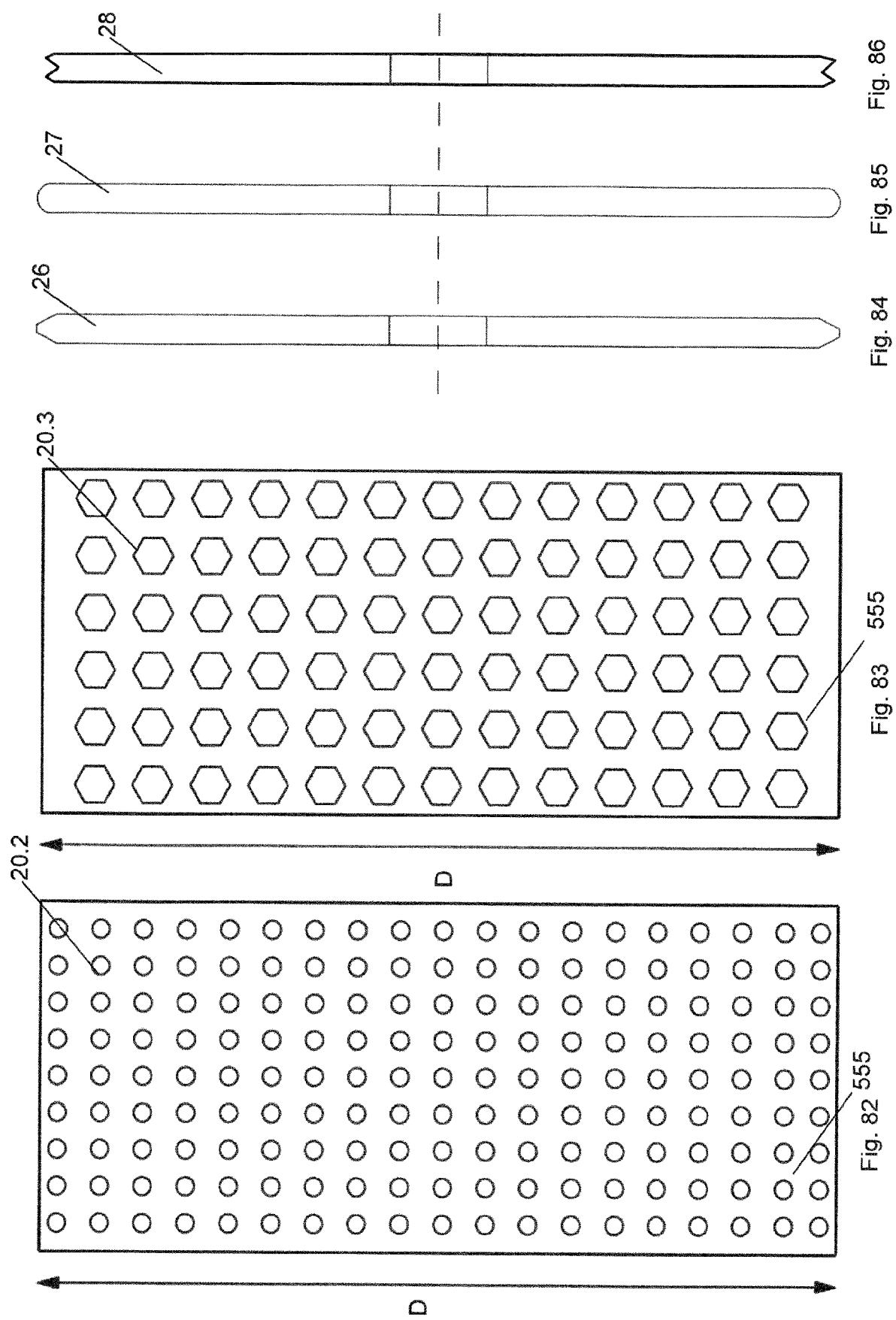

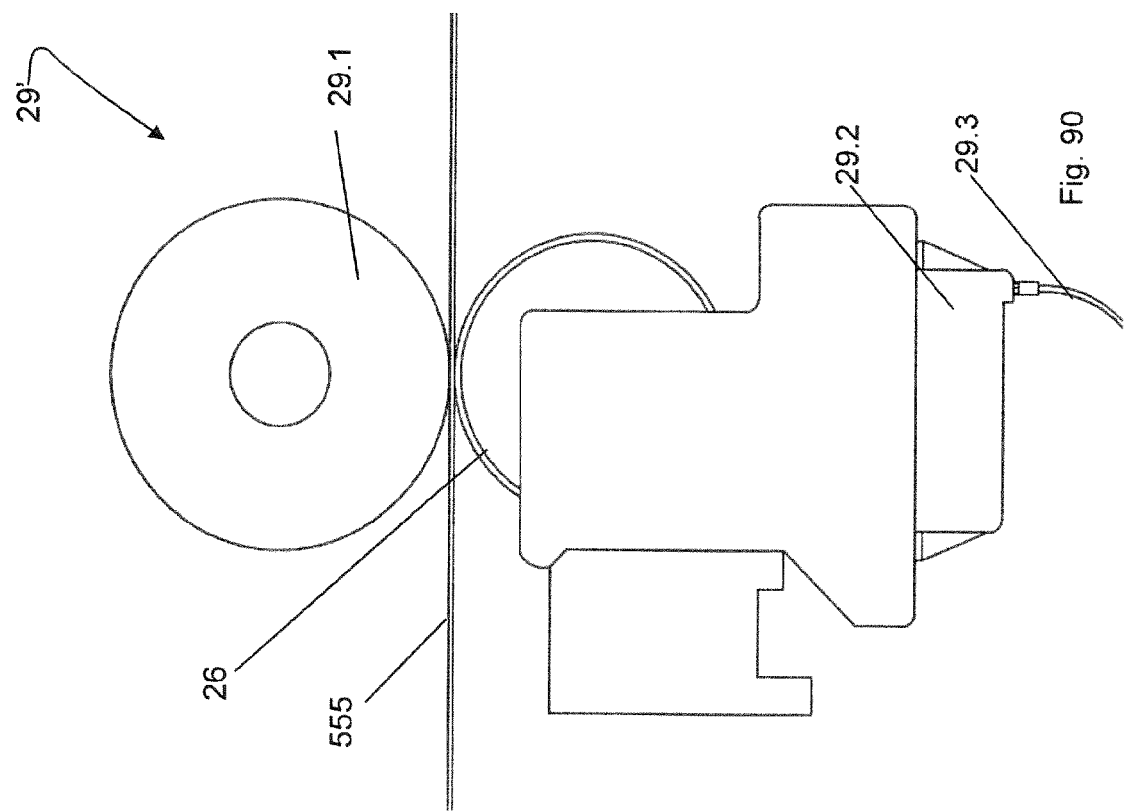
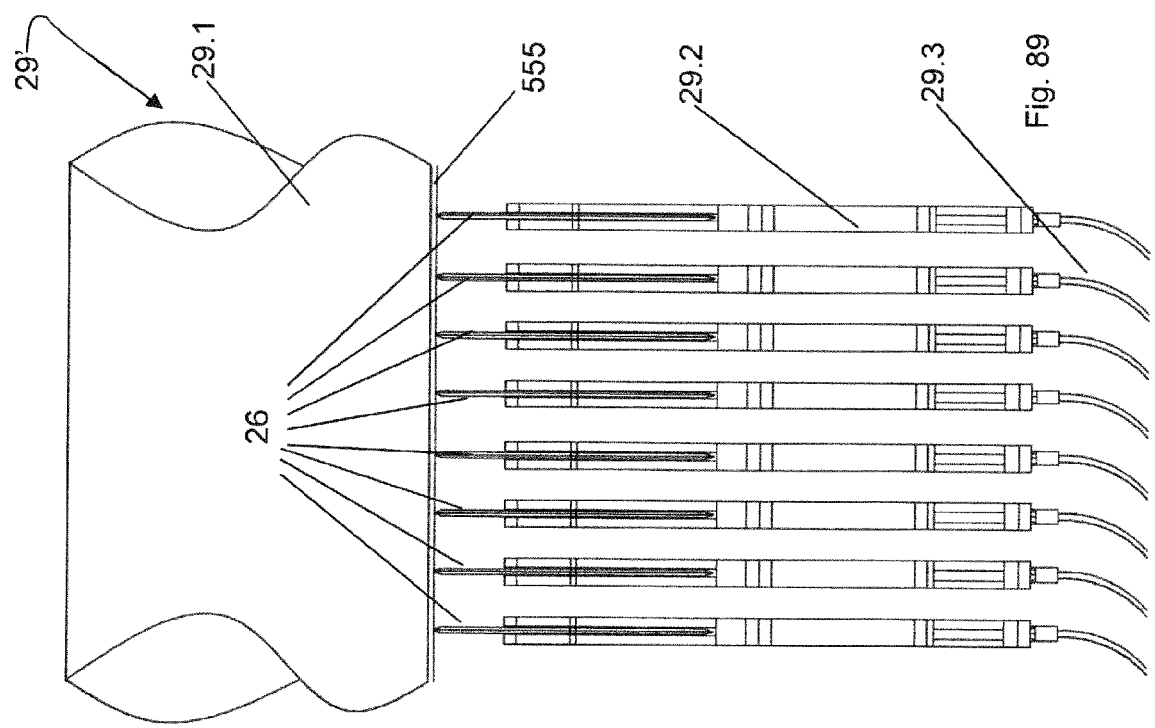

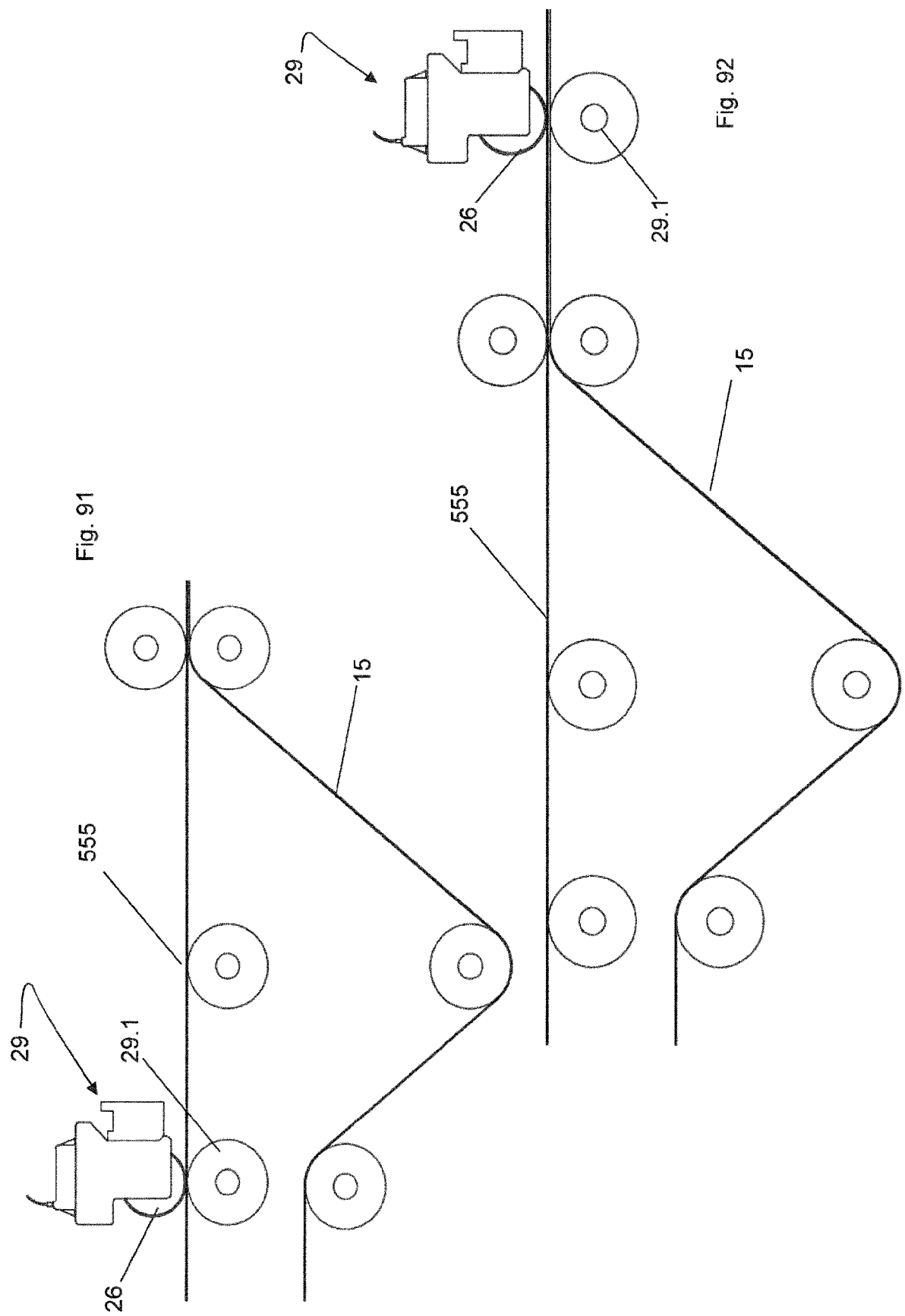

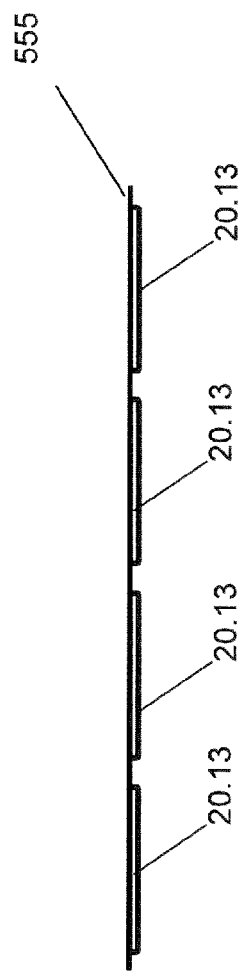
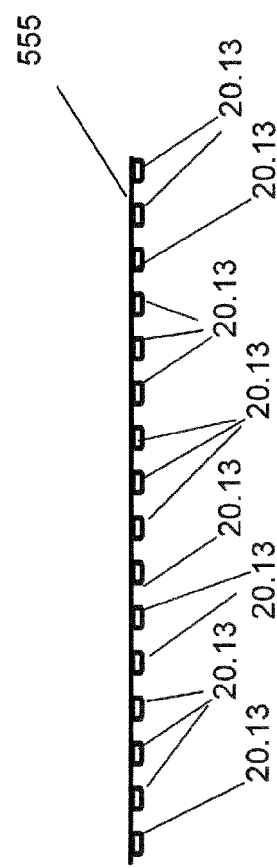

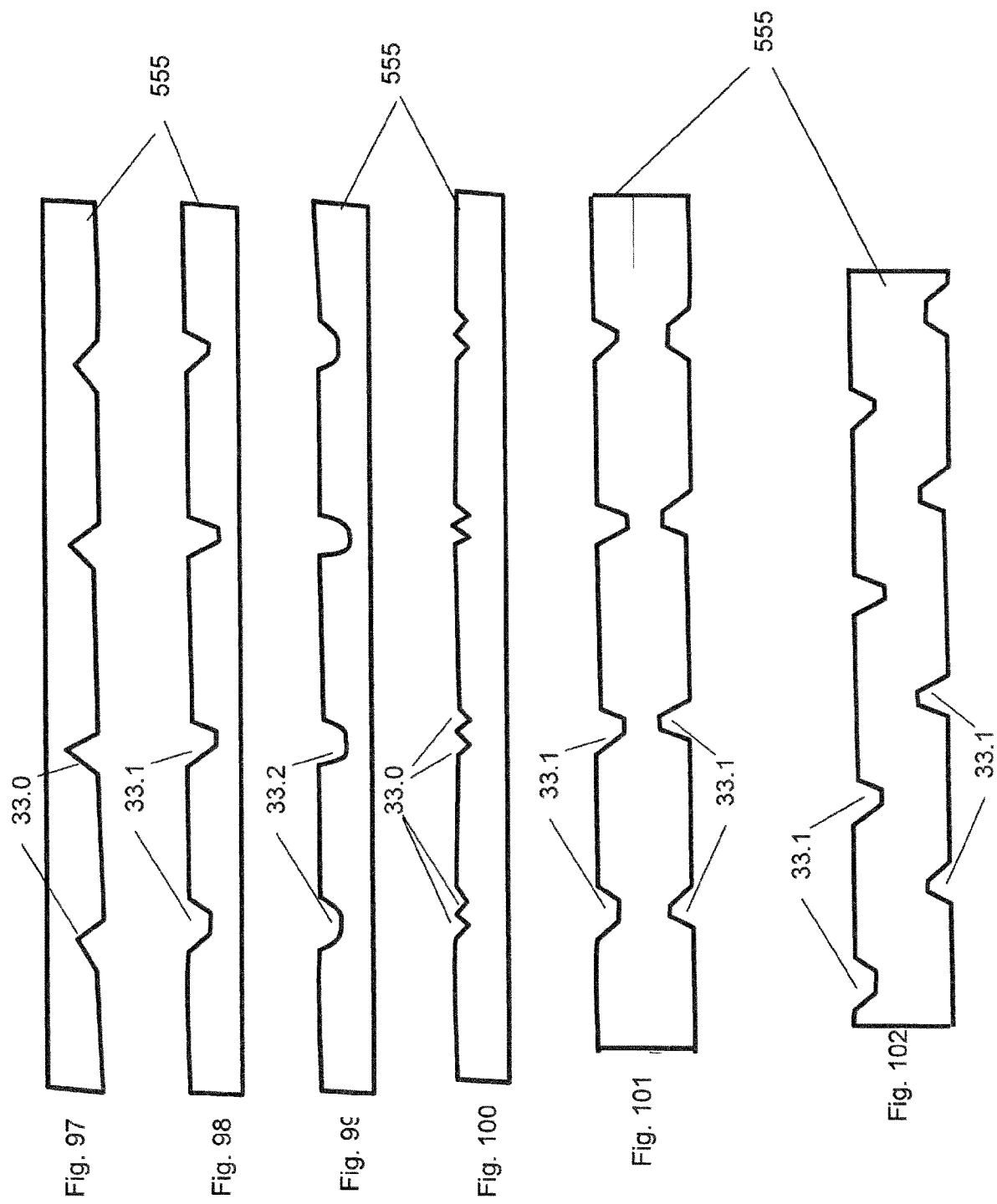

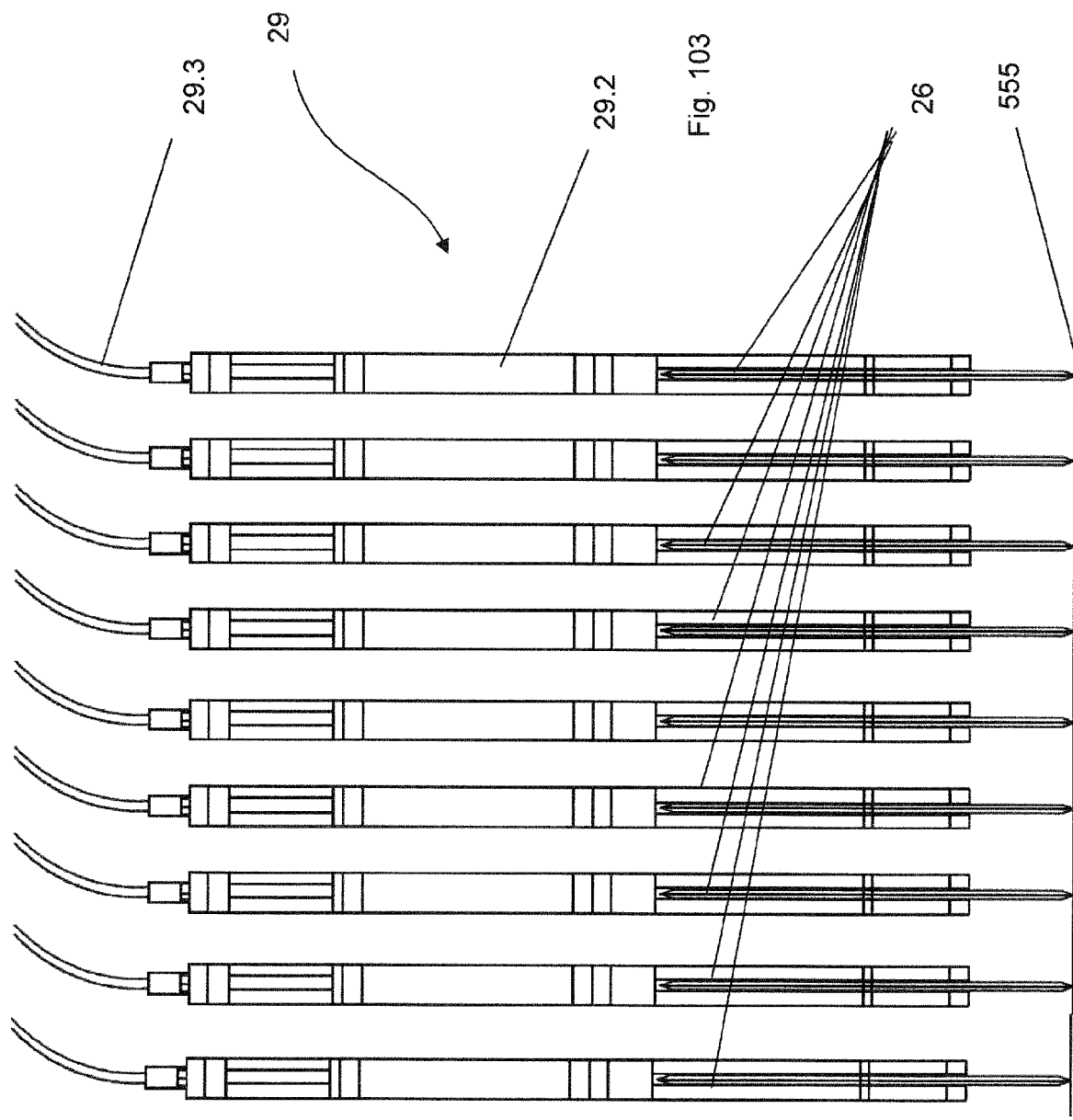

MATERIAL, A LAYERED OR LAMINATED MATERIAL, FORMWORK AND OR CONSTRUCTION ELEMENT

CROSS-REFERENCE TO RELATED APPLICATIONS

This application is a national stage entry of International Patent Application No. PCT/AU2020/050077, published as WO 2020/160603 A1, filed on Feb. 4, 2020, titled "A new material, a new and improved layered or laminated material, formwork and or construction element," which claims priority from Australian Patent Application Nos. AU 2019/900327, filed on Feb. 4, 2019, AU 2019/901250, filed on Apr. 11, 2019, and AU 2019/901252, filed on Apr. 11, 2019, the disclosures of which are incorporated herein by reference in their entirety.

FIELDS OF THE INVENTION

The present invention relates to a paper material, more particularly to a multi-layered material suitable for making sheet products which can have a variety of uses, including being formed into tubing used in a range of applications including forming concrete columns. The paper material of present invention can be used for any purpose that paper material is used for such as packaging, bags, wrapping paper, special wrapping paper, mining pipes, special mining pipes, tubes, tubes for formwork and many others.

The present invention also relates to materials, more particularly to a multi-layered materials suitable for making sheet products like liners, lining material, wrapping, packaging etc. Such material can be formed into tubing used in a range of applications including forming concrete columns and other elements or building elements. The present invention also relates to a formwork or construction element made from such materials, for use as a building or construction element or in forming a building element such as a column or pier. The formwork or construction element can be wound by known techniques such as spiral winding or other winding techniques.

BACKGROUND OF THE INVENTIONS

There has been a need for a more environmentally friendly paper material, particularly one which has improved strength over prior art paper materials. Additionally, there has been a need to reduce or remove the amount of petrochemical based plastics, and replacement of chemical glues for the benefit of the environment. There is also a desire to reduce the amount of energy used to make paper materials.

The technology of materials and tubes for formwork have been developed by the present inventor and his son since 1992. The inventor previously invented, or co-invented, the following:

WO1993014287 which was directed to a form for casting columns of concrete having a substantially square or other rectilinear cross section comprises a cardboard tube adapted to resist internal pressure, a waterproof skin, a mould cavity liner defining a mould cavity of square or other rectilinear cross section and disposed within the tube, and foamed plastics filler bodies filling the spaces between the liner and the tube. It also included a split longitudinally which is held closed by binding means such as adhesive tapes wrapped about the tube.

WO1996012602 which was directed to a novel tube material, and method of forming the tube. The tube had an inner liner and an intermediate layer of in situ moulded expanding foam material, and a flexible outer line. The tube was rigid, with the structural strength derived entirely from the intermediate layer. It also included an inner core, which was used to hold the inner liner in place during forming. The inner core included a mechanism to reduce its diameter, to facilitate removal after curing of the foam.

AU784695 published in 2002 was directed to a formwork for casting pillar-like or column-like structures, having two or more complementary mould segments that have an inner foam core that is at least partly covered with a liquid-impervious skin or liner. The mould segments define, a moulding cavity open towards an upper and a lower end of the formwork. The formwork further included a bracing member disposed to surround and restrain the assembled mould segments, and fasteners arranged to secure, preferably by tensioning, the bracing member, in order to hold the assembled mould segments together and resist displacement during casting. The mould segments were provided with complementary abutment surfaces along a longitudinal axis thereof, such that the segments can be joined in a juxtaposed manner, thereby forming the internal cavity that corresponds in cross-section with the desired shape of the pillar or column to be cast with the mould.

WO2005011972 which was directed to a tube having walls of multi-layer construction, wherein the multi-layer construction includes one or more sub-layers, each the sub-layer consisting of a woven polymer mesh disposed in between one or more outer layers of material selected from the group consisting of paper, poly-propylene and polyethylene, wherein the tube is formed by affixing the sub-layers to each other whilst the sub-layers are wound around a mandrel.

WO2009079702 which was directed to a concrete formwork tube, the tube including an internal lining; an external lining; and two or more complementary mould segments, adapted to be received between the external and internal lining; each mould segment having an inner face and an outer face. The mould segments, when assembled and substantially restrained by the external lining from relative movement, defined a moulding cavity open towards an upper and a lower end of the formwork; and at least one locking segment, the locking segment was adapted to be disposed between two of the mould segments, thereby to tighten the fit of the assembled mould segments inside the external lining.

Then in more recent times his son also invented WO2014075131 which was directed to a formwork or construction element tube, which is made from multiple layers of a multi-layered material, which included a filament reinforcing layer or layers.

Any reference herein to known prior art does not, unless the contrary indication appears, constitute an admission that such prior art is commonly known by those skilled in the art to which the invention relates, at the priority date of this application.

Summary of Invention 1

It is an object of the present invention to provide a more environmentally friendly paper product, which uses no petrochemical based plastics and does not utilise chemical glues. A by-product of this proposed invention 1 is an expected utilising of less energy to manufacture a paper material and the helping of the environment by being 100% biodegradable and or compostable and or recyclable and or reusable.

The present invention provides a method of making a paper product, said method including the step of adding natural reinforcing material to one of: a) a layer of pulp as it exits or after it exits from a layer formation process or apparatus; or b) a tank of pulp prior to it exiting from a layer formation process or apparatus or c) a combination of a) and b).

The natural reinforcing material is comprised of natural fibres.

The natural reinforcing material can be comprised of natural fibres where the orientation of the fibres is not predetermined. Alternatively, the natural reinforcing material can be comprised of natural fibres where the orientation of the fibres is predetermined.

The natural fibres can be oriented to be at an angle to the direction of movement of said pulp layer. The angle can be in a range from parallel to said direction to 90 degrees to said direction.

The natural reinforcing material can be comprised of natural fibres of a length which is not predetermined. Alternatively, the natural reinforcing materials can be comprised of natural fibres of a length which is predetermined, or a combination of both.

The length can be selected according to a strength characteristic or other material property characteristic to be worked into the product.

The predetermined length can a combination of two or more different lengths.

The natural reinforcing material can be one of or a combination of two or more of: hemp, jute, bamboo, kabuya, kenaf, ramie, sisal, or other application appropriate natural fibre.

The natural reinforcing material can be a film.

The natural reinforcing material can be a filament or filament layer.

The natural reinforcing material can be a mesh or woven layer.

The natural reinforcing material can be hessian.

A second layer of pulp can be added.

Over the natural reinforcing material there can be a layer of pulp applied to it, thereby sandwiching said natural reinforcing material between two layers of pulp.

An additional layer of reinforcing material can be applied to the last laid pulp layer.

Over said additional natural reinforcing material can have a layer of pulp applied to it, thereby sandwiching said additional natural reinforcing material between two layers of pulp.

The natural reinforcing material can be added as at least two layers separated by at least one layer of pulp, with the two layers being different from each other, such as one being a layer of natural fibres and the other being in filament form; or one being a layer of natural fibres and the other being in film form; or one being a layer of natural fibres and the other being in woven or mesh form; or one being a layer of natural fibres and the other being in a shredded filament form; or one being a layer in filament form and the other being in film form; or one being a layer in filament form and the other being in woven or mesh form; or one being a layer in filament form and the other being in a shredded filament form; or one being a layer in film form and the other being in woven or mesh form; or one being a layer in film form and the other being in a shredded filament form; or one being a layer in woven or mesh form and the other being in a shredded filament form; or an combination of the forms if more than two layers of natural reinforcing material.

The steps described herein can be repeated as required to construct a multilayered paper product.

The pulp can be any appropriate paper making pulp including or sourced from wood, fibre crops, waste paper, or rags or a combination of these.

The present invention also provides a paper material or product being made by the method of described above.

The present invention also provides a paper material or product having been produced by a mixture of pulp and natural fibre reinforcement, or be comprised of a pulp layer and a natural fibre reinforcement layer.

The paper material or product can have additional pulp layers present above a base pulp layer. There can be present alternating layers of pulp and natural fibre reinforcement.

The present invention also provides a paper material that can used for items such as packaging, bags, wrapping paper, special wrapping paper, mining pipes, special mining pipes, tubes, tubes for formwork and many others.

Summary of Invention 2

The present invention provides a multi-layered material, including at least one solid polymeric non-metallic non-woven film strength layer (hereinafter "the film layer" or "film layers"), and a layer of paper, cardboard, polymer, or a compostable and or biodegradable polymer, the layers being bonded together.

The film layer provides strength in the roll direction in the plane of the film layer.

The film layer provides a burst strength in a direction lateral to the plane of said film layer.

The material can include at least two film layers.

The or each, film layer can be one of the following: a polymeric material; a polymeric material which is compostable and or biodegradable and or recyclable and or reusable; a natural polymeric material which is compostable and or biodegradable and or recyclable and or reusable.

The polymeric material can be one of: polypropylene, polyethylene, a polypropylene and polyethylene blend, or polyester or a blend of these; polymer which is compostable and or biodegradable and or recyclable; or any appropriate polymeric material.

The layer of paper, cardboard or polymer is specifically a paper, and weighs 20 grams per square metre or more.

The material can further include a coating on either or both of the film layer and layer of paper, cardboard or polymer.

The material can include another paper, cardboard or polymer layer that is bonded to the layer of paper, cardboard or polymer or the film layer.

The material can have two or more film layers, there being at least one layer of paper, cardboard, or polymer, or a coating layer, between each adjacent two of the two or more film layers.

The material can have an adhesive film as an outer layer.

One or both outer layers is or are one of: paper, cardboard; a polymeric material; a natural polymeric material; a polymeric material which is compostable and or biodegradable and or recyclable; natural insulation material in film form; natural insulation material in polymer form; natural insulation material in membrane form.

The film layer or at least one of the film layers can include one or more perforations or shaped apertures therein.

The perforations or shaped apertures can be of a shape which is one or has one, or a combination of two or more of the following features: circular: elliptical: regular polygonal: regular pentagonal: regular hexagonal: irregular polygonal:

irregular pentagonal: irregular hexagonal; rectangular; elongated; aligned to be parallel with the roll direction of the film layer; aligned to be at an angle to the roll direction of the film layer.

The perforations or shaped apertures can be formed in the film layer prior to the film layer or layers being bonded to a layer of paper, cardboard or polymer.

The perforations or shaped apertures can be formed in the film layer or film layers after the film layer or layers are bonded to a layer of paper, cardboard or polymer, whereby both the film layer and the paper, cardboard or polymer layer have the perforations or shaped apertures.

The film layer or at least one of the film layers can include one or more lines of scoring or scribing therein.

The lines of scoring or scribing can have or can be one or more than one of the following features: on one side of the film layer or film layers; on two opposed sides of the film layer or film layers; equally spaced across the width of the film layer or film layers; formed to different depths in the film layer or film layers across the width thereof; adjacent lines of scoring or scribing are all of the same cross sectional shape across the width of the film layer; adjacent lines of scoring or scribing are of different cross sectional shapes across the width of the film layer; have a cross section which is partially curved; have a cross section which is an open channel having three sides.

The lines of scoring or scribing can be formed in the film layer prior to the film layer or layers being bonded to a layer of paper, cardboard or polymer.

The lines of scoring or scribing can be formed in the film layer or film layers after the film layer or layers are bonded to a layer of paper, cardboard or polymer, whereby both the film layer and the paper, cardboard or polymer layer have the lines.

The film layer or at least one of the film layers can include one or more shapes embossed or debossed into the film layer.

The shapes can be each of a shape which is one or has one, or a combination of two or more, of the following features: circular: elliptical: regular polygonal: regular pentagonal: regular hexagonal: irregular polygonal: irregular pentagonal: irregular hexagonal; rectangular; elongated; aligned to be parallel with the roll direction of the film layer; aligned to be at an angle to the roll direction of the film layer.

The embossed or debossed shapes can be formed in the film layer prior to the film layer or layers being bonded to a layer of paper, cardboard or polymer.

The embossed or debossed shapes can be formed in the film layer or film layers after the film layer or layers are bonded to a layer of paper, cardboard or polymer, whereby both the film layer and the paper, cardboard or polymer layer have the embossed or debossed shapes.

The multilayer material can include an outer film layer on one side and a second outer film layer or outer insulation layer on a second side, with one or more inner paper, cardboard, polymer or compostable and or biodegradable polymer layers, and respective adhesive or membrane or liquid polymer layers between said outer layers and other layers, said material being adapted for use as a liner or lining material.

One or both of the outer film layers can has an insulation characteristic.

The multilayer material can have all layers and intervening adhesive or membrane or liquid polymer layers and which allows said material, or products made from said material, to be compostable and or biodegradable and or recyclable and or reusable.

The present invention also provides a formwork or construction element tube having multiple layers which include at least two layers comprised of a multi-layered sheet material as described above.

The formwork or construction element can be a multiple multi-layered sheet material layers which also include at least one layer of paper, cardboard or polymer between said at least two multi-layered sheet materials.

The multi-layered sheet material each can have a multiple number of film layers.

The formwork or construction element can be formed by one or more than one of the following means: an adhesive is used to bond said multiple layers together into said tube; a heat bonding process is used to bond said multiple layers together into said tube; said multiple layers are spirally wound; said multiple layers are cylindrically or straight wound; said multiple layers are wrapped.

There can be at least three layers of said multi-layered sheet material as described above, and at a location intermediate an inner and outer layer of said multi-layered sheet material is located said at least one layer of paper, cardboard or polymer, each layer being bonded by an adhesive layer.

The formwork or construction element can include at least one layer which is a hydrophobic layer or a waterproofing layer.

At least one layer of said hydrophobic layer or a waterproofing layer is located at one or more than one of the following: an innermost layer of said tube, an outermost layer of said tube; an intermediate layer of said tube.

The present invention provides a tube formed from winding a multi-layered material as described above.

The tube can have multiple layers of said multi-layered material which are bonded or adhered either side of a paper layer.

The tube can be manufactured from a winding or spiral winding technique.

The tube can be a concrete formwork tube.

Summary of Invention 3

It is an object of the invention 3 to provide a more environmentally friendly laminated material, which uses no petrochemical based plastics or polymers and does not utilise chemical glues. A by-product of the proposed invention is to help the environment by being 100% biodegradable and or compostable and or recyclable and or reusable.

The present invention provides a multi-layered material, including at least one base layer of paper, cardboard or solid polymer of a natural or plant material and at least one applied layer being of a flowing, liquid or melted natural polymer (hereinafter "the liquid polymer") with the liquid polymer bonding to the base layer and setting or solidifying thereto.

The liquid polymer can have combined with it natural fibre reinforcing prior to or after application to said base layer.

The material can include a natural coating on either or both of the base layer and the applied layer.

The material can include another paper, cardboard or natural solid polymer layer that is bonded to the base layer or the applied layer.

The material can have two or more applied layers, there being at least one layer of paper, cardboard, or natural solid polymer, or a natural coating layer, between each adjacent two of the two or more applied layers.

The material can have a polymer or adhesive layer as an outer layer.

One or both outer layers can be paper, cardboard or a solid natural polymeric material.

There can also be included a strength layer adhered or bonded to the applied layer.

There can be included at least one strength layer which is comprised of a woven natural polymer or fibres.

There can be included at least one strength layer which is comprised of one or more filaments comprised of natural polymer or fibres.

There can be included at least one strength layer which is comprised of a film of a natural polymer.

The base layer or the applied layer or layers can include one or more perforations or shaped apertures therein.

The perforations or shaped apertures are or can have one or a combination of two or more of the following features: circular; elliptical; regular polygonal; regular pentagonal; regular hexagonal; irregular polygonal; irregular pentagonal; irregular hexagonal; rectangular; elongated; aligned to be parallel with the roll direction of the base layer; aligned to be at an angle to the roll direction of the base layer.

The perforations or shaped apertures can be formed in the base layer prior to the base layer and the applied layer are bonded.

The perforations or shaped apertures can be formed in the applied layer or layers after the applied layer or layers are bonded to the base layer.

The base layer or the applied layer or layers can include one or more lines of scoring or scribing therein.

The lines of scoring or scribing can have, or are, one or more than one of the following features: on one side of the base layer and or the applied layer; on two opposed sides of the base layer and or the applied layer or layers; equally spaced across the width of the base layer and or the applied layer or layers; formed to different depths in the base layer and or the applied layer or layers across the width thereof; adjacent lines of scoring or scribing are all of the same cross sectional shape across the width of the base layer and or the applied layer or layers; adjacent lines of scoring or scribing are of different cross sectional shapes across the width of the base layer and or the applied layer or layers; have a cross section which is partially curved; have a cross section which is an open channel having three sides; have a cross section which is an open channel having two sides.

The lines of scoring or scribing can be formed in the base layer prior to the applied layer being bonded to the base layer.

The lines of scoring or scribing can be formed in the applied layer or layers and or the base layer after the applied layer or layers are bonded to the base layer.

The base layer and or at least one of the applied layer or layers can include one or more shapes embossed or debossed therein.

The shapes can be or can have one or a combination of two or more of the following features: circular; elliptical; regular polygonal; regular pentagonal; regular hexagonal; irregular polygonal; irregular pentagonal; irregular hexagonal; rectangular; elongated; aligned to be parallel with the roll direction of the base layer; aligned to be at an angle to the roll direction of the base layer.

The embossed or debossed shapes can be formed in the base layer prior to the applied layer or layers being bonded to the base layer.

The embossed or debossed shapes can be formed in the base layer and or the applied layer or layers after the applied layer or layers are bonded to the base layer.

The present invention also includes a formwork or construction element tube having multiple layers which include at least two layers comprised of a multi-layered material as described above.

There can be multiple multi-layered material layers which also include at least one layer of paper, cardboard or natural polymer between the at least two multi-layered sheet materials.

The multi-layered sheet material each has a multiple number of applied layers.

The tube can be formed by one or more than one of the following means: an adhesive is used to bond the multiple layers together into the tube; a heat bonding process is used to bond the multiple layers together into the tube; the multiple layers are spirally wound; the multiple layers are cylindrically or straight wound; the multiple layers are wrapped.

There can be at least three layers of the multi-layered material as described above, and at a location intermediate an inner and outer layer of the multi-layered sheet material is located the at least one layer of paper, cardboard or natural polymer, each layer being bonded by an adhesive layer.

The tube can include at least one layer which is a hydrophobic layer or a waterproofing layer.

At least one hydrophobic layer or a waterproofing layer can be located at one or more than one of the following: an innermost layer of the tube, an outermost layer of the tube; an intermediate layer of the tube.

A tube formed from winding a multi-layered material as described above.

The tube can have multiple layers of the multi-layered material which are bonded or adhered either side of a paper layer.

The tube can be manufactured from a winding or spiral winding technique.

The tube can be a concrete formwork tube.

The present invention provides a tube or a formwork or construction element tube or a multi-layered material as previously described, wherein the tube or material is at least fully biodegradable and or decomposable and or recyclable and or reusable.

The tube or material as described above is able to be disposed of by composting and or biodegrading and or is recyclable and or is reusable.

The present invention also provides a method of producing a material as described above, the method including the step of combining at least one base layer of paper, cardboard or solid polymer of a natural or plant material to an applied layer, whereby the applied layer is a flowing, liquid or melted natural polymer (hereinafter "the liquid polymer") combined with natural fibre reinforcing material, with the liquid polymer bonding to the base layer and setting or solidifying thereto.

The natural fibre reinforcing material can be added to the liquid polymer prior to the liquid polymer being applied to the base layer by a combining or mixing process at a location remote from where the liquid polymer being applied to the base layer.

The natural fibre reinforcing material can be added to the liquid polymer prior to the liquid polymer being applied to the base layer by a combining or mixing process at a location at or in the vicinity of where the liquid polymer being applied to the base layer.

The natural fibre reinforcing material can be added to the liquid polymer simultaneously with, or sequentially to, the liquid polymer being applied to the base layer.

The natural fibre reinforcing material can added by means of a hopper or other dry delivery system to be deposited on the liquid polymer and or the base layer.

The material or method described above can be such that the natural reinforcing material can be comprised of natural fibres where the orientation of the fibres at the time of combining with the liquid polymer is not predetermined.

The natural reinforcing material of the material or method described above, can be comprised of natural fibres where the orientation of the fibres at the time of combining with the liquid polymer is predetermined.

The natural fibres can be oriented to be at an angle to the roll direction of the base layer.

The angle can be in a range from parallel to the direction to 90 degrees to the direction.

The natural fibres can be of a length which is not predetermined.

The natural reinforcing material can be comprised of or can also be comprised of natural fibres of a length which is predetermined.

The predetermined length can be a combination of two or more different lengths.

The length of the natural fibre reinforcing can be selected according to a strength characteristic or other material property characteristic to be worked into a final product.

The natural fibre reinforcing can be one of or a combination of two or more of: hemp, jute, bamboo, kabuya, kenaf, ramie, sisal, or other application appropriate natural fibre.

Summary of Invention 4

The present invention also provides a layer treatment for a multilayered material wherein at least one layer of the multilayered material includes one or more slits, cuts, perforations or shaped apertures therein.

The slits, cuts, perforations or shaped apertures is or have one or a combination of two or more of the following features: circular, elliptical, regular polygonal, regular pentagonal, regular hexagonal, irregular polygonal, irregular pentagonal, irregular hexagonal; rectangular; elongated; aligned to be parallel with the roll direction of the layer; aligned to be at an angle to the roll direction of the layer.

The slits, cuts, perforations or shaped apertures can be formed in the layer or layers prior to the layer or layers being bonded or glued or adhered to other layers.

The slits, cuts, perforations or shaped apertures can be formed in the layer or layers after the layer or layers are bonded or glued or adhered to other layers.

The present invention also provides a layer treatment for a multilayered material, wherein one or more of the layers includes one or more lines of scoring or scribing therein.

The lines of scoring or scribing can have or can be one or more than one of the following features: on one side of the layer or layers; on two opposed sides of the layer or layers; equally spaced across the width of the layer or layers; formed to different depths in the layer or layers across the width thereof; adjacent lines of scoring or scribing are all of the same cross sectional shape across the width of the layer or layers; adjacent lines of scoring or scribing are of different cross sectional shapes across the width of the layer or layers; have a cross section which is partially curved; have a cross section which is an open channel having three sides.

The lines of scoring or scribing can be formed in the layer or layer prior to the layer or layers being bonded or glued or adhered to other layers.

The lines of scoring or scribing can be formed in the layer or layers after the layer or layers are bonded or glued or adhered to other layers.

The present invention further provides a layer treatment for a multilayered material, wherein one or more of the layers includes one or more shapes embossed or debossed into the film layer.

The shapes can be or can have one or a combination of two or more of the following features: circular, elliptical, regular polygonal, regular pentagonal, regular hexagonal, irregular polygonal, irregular pentagonal, irregular hexagonal; rectangular; elongated; aligned to be parallel with the roll direction of the layer or layers; aligned to be at an angle to the roll direction of the layer or layers.

The embossed or debossed shapes can be formed in the layer or layers prior to the layer or layers being bonded or glued or adhered to other layers.

The embossed or debossed shapes can be formed in the layer or layers after the layer or layers being bonded or glued or adhered to other layers.

The layer treatment for a multilayered material as described above can be applied to a multilayered material is also described above.

The present invention also provides a multilayered material which includes one or more layers having a layer treatment applied to it as described above. The multilayered material can also be as described above.

BRIEF DESCRIPTION OF THE DRAWINGS

An embodiment or embodiments of the present invention will now be described, by way of example only, with reference to the accompanying drawings, in which:

FIG. 1 is an exploded perspective view of a schematic of a paper product having a pulp layer and a layer of reinforcing fibres made of naturally occurring materials;

FIG. 2 is a perspective view of a schematic of a production system to produce the paper product of FIG. 1, with the fibres added after pulp layer is formed;

FIG. 3 is a perspective view of a schematic of a production system to produce the paper product of FIG. 1, with the reinforcing fibres added to pulp before a pulp layer is formed;

FIG. 4 is an exploded perspective view of a schematic of a paper product having a multiple of pulp layers and a layer of reinforcing fibres made of naturally occurring materials;

FIG. 5 is a perspective view of a schematic of a production system to produce the paper product of FIG. 4, with reinforcing fibres added after pulp layer is formed, and subsequent pulp layer added;

FIG. 6 is a perspective view of a schematic of a production system to produce the paper product of FIG. 4, with the fibres added to the pulp to form the first pulp layer with a subsequent pulp layer added;

FIG. 10 is an exploded perspective view of a schematic of a paper product having a layer of pulp and a layer of reinforcing fibres made of naturally occurring materials applied as a film and a second layer of pulp to sandwich the film;

FIG. 11 is a perspective view of a schematic of a production system similar to FIG. 9, so as to produce the paper product of FIG. 10, with the natural fibre reinforcing film added after pulp layer is formed, and a second layer of pulp to sandwich the film;

FIG. 15 is an exploded perspective view of a schematic of a multilayer paper product having a layer of pulp and a layer of reinforcing filaments made of naturally occurring materials applied to a first layer of pulp, and then a second layer of pulp applied to sandwich the filament layer to form the product;

FIG. 16 is a perspective view of a schematic of a production system similar to that of FIG. 14, so as to produce the paper product of FIG. 15, with the natural fibre reinforcing filaments being added after pulp layer is formed and a second layer of pulp being added to sandwich the filament layer;

FIG. 24 is a schematic showing a multi-layered material according to a first material embodiment;

FIG. 25 is a schematic cross section through material 2.10 of FIG. 24 perpendicular to direction D, with film and paper/polymeric layer extending into the page of the FIG. 25;

FIG. 25.1 is a schematic cross section through a material 2.10", which is a liner and is made from an upper layer of material 2.10 of FIGS. 24 and 25, and a similar material 2.10' where the film layer 2.20 is an insulative material layer;

FIG. 26 is a schematic showing a multi-layered material according to a second material embodiment;

FIG. 27 is a schematic cross section through material 2.10.1 of FIG. 26 perpendicular to direction D, with paper/polymeric layer, film layer and paper/polymeric layer extending into the page of the FIG. 27;

FIG. 28 is a schematic showing a multi-layered material according to a third material embodiment;

FIG. 29 is a schematic cross section through material 100 of FIG. 28 perpendicular to direction D, with paper/polymeric layer, film layer and paper/polymeric layer extending into the page of the FIG. 29;

FIG. 30 is a schematic showing a multi-layered material according to a fourth material embodiment;

FIG. 31 is a schematic showing a multi-layered material according to a fifth material embodiment;

FIG. 32 is a schematic showing a multi-layered material according to a sixth material embodiment;

FIG. 33 is a schematic showing a multi-layered material according to a seventh material embodiment;

FIG. 41 is a schematic showing a multi-layered material according to a fifteenth material embodiment;

FIG. 42 is a schematic showing a multi-layered material according to a sixteenth material embodiment;

FIG. 45 is a schematic showing a multi-layered material according to a first material embodiment;

FIG. 46 is a schematic cross section through material 100 of FIG. 45 perpendicular to direction D, with applied layer and base layer extending into and the page of the FIG. 1B;

FIG. 47 is a schematic showing a multi-layered material according to a second material embodiment;

FIG. 48 is a schematic cross section through material 200 of FIG. 47 perpendicular to direction D, with applied layer and base layer and paper/cardboard/natural solid polymeric layer extending into and across the page of the FIG. 48;

FIG. 53 is a schematic showing a multi-layered material according to a fifth material embodiment;

FIG. 54 is a schematic cross section through material 300 of FIG. 53 perpendicular to direction D, with base layer and applied layer and natural fibre film layer extending into across the page of the FIG. 54;

FIG. 55 is a schematic showing a multi-layered material according to a sixth material embodiment;

FIG. 56 is a schematic cross section through material 300 of FIG. 55 perpendicular to direction D, with base layer and applied layer and natural fibre film layer extending into across the page of the FIG. 56;

FIG. 59 is a schematic showing a multi-layered material according to an ninth material embodiment;

FIG. 60 is a schematic showing a multi-layered material according to a tenth material embodiment;

FIG. 61 is a schematic showing a multi-layered material according to an eleventh material embodiment;

FIG. 62 is a schematic showing a multi-layered material according to an twelfth material embodiment;

FIG. 63 is a schematic showing a multi-layered material according to a thirteenth material embodiment;

FIG. 64 is a schematic showing a multi-layered material according to a fourteenth material embodiment;

FIG. 65 is a schematic showing a multi-layered material according to a fifteenth material embodiment;

FIG. 66 is a schematic showing a multi-layered material according to a sixteenth material embodiment;

FIG. 67 is a schematic showing a multi-layered material according to a seventeenth material embodiment;

FIG. 68 is a schematic showing a multi-layered material according to a eighteenth material embodiment;

FIG. 71 is a schematic of a process step according to a first method embodiment;

FIG. 76 illustrates a schematic of a mandrel and spiral winding of the material layers to form a tube similar to that of FIG. 75, which utilises individual ones of layers 100, 200, 300, 400, 500, 500', 600, 700, 800, 900, 1000, 1100, 1200, 1300, 1400, 1500, 1600, 1700, 1800, 1900;

FIG. 77 illustrates a schematic cross section of a part of a spiral wound tube, showing the layers used in a large diameter tube of the order of 1000 mm to 2400 mm and or long length of tube, which utilises individual ones of layers 100, 200, 300, 400, 500, 500', 600, 700, 800, 900, 1000, 1100, 1200, 1300, 1400, 1500, 1600, 1700, 1800, 1900;

FIG. 78 illustrates a schematic cross section of a part of a spiral wound tube, showing the layers used in a small diameter tube of the order of 200 mm to 1000 mm and or short length of tube, which utilises individual ones of layers 100, 200, 300, 400, 500, 500', 600, 700, 800, 900, 1000, 1100, 1200, 1300, 1400, 1500, 1600, 1700, 1800, 1900;

FIG. 78A illustrates a schematic of a mandrel and spiral winding of the material layers to form a tube similar to that of FIG. 75, which utilises individual ones of layers 2.10, 2.10.1, 2.100, 2.200, 2.300, 2.400, 2.500, 2.600, 2.700, 2.800, 2.900, 2.1000, 2.1100, 2.1200, 2.1300, 2.1400, 2.1500, 2.1600;

FIG. 78B illustrates a schematic cross section of a part of a spiral wound tube, showing the layers used in a large diameter tube of the order of 1000 mm to 2400 mm and or long length of tube which utilises individual ones of layers 2.10, 2.10.1, 2.100, 2.200, 2.300, 2.400, 2.500, 2.600, 2.700, 2.800, 2.900, 2.1000, 2.1100, 2.1200, 2.1300, 2.1400, 2.1500, 2.1600;

FIG. 78C illustrates a schematic cross section of a part of a spiral wound tube, showing the layers used in a small diameter tube of the order of 200 mm to 1000 mm and or short length of tube which utilises individual ones of layers 2.10, 2.10.1, 2.100, 2.200, 2.300, 2.400, 2.500, 2.600, 2.700, 2.800, 2.900, 2.1000, 2.1100, 2.1200, 2.1300, 2.1400, 2.1500, 2.1600;

FIG. 79 illustrates a schematic plan view of a film having rectangular apertures or perforations of elongate shape aligned with the roll direction of the film;

FIG. 80 illustrates schematic plan view of another film having rectangular apertures or perforations where rows and columns are offset but all are of elongate shape aligned with the roll direction of the film;

FIG. 81 illustrates a schematic plan view of another film where elongated apertures are present in offset rows and columns with the elongate shape aligned at ninety degrees to the roll direction of the film;

FIG. 82 illustrates a schematic plan view of a film having circular apertures or perforations in rows and columns along the length of the film;

FIG. 83 illustrates a schematic plan view of a film having hexagonal apertures or perforations in rows and columns along the length of the film;

FIG. 84 illustrates a diametric cross section through a rotating knife or blade with a flat or blunt engaging edge to score or scribe the film layer;

FIG. 85 illustrates a diametric cross section through a rotating knife or blade with a rounded engaging edge to score or scribe the film layer;

FIG. 86 illustrates a diametric cross section through a rotating knife or blade with a double flat or blunt engaging edge to apply two scores or scribes simultaneously to the film layer;

FIG. 89 illustrates a schematic front view of an assembly of rotating knives or blade for scoring or scribing the lower surface of the film layer;

FIG. 90 illustrates a side view of the arrangement of the components of FIG. 31;

FIG. 91 illustrates a side view of a process step where the film layer is scored or scribed prior to assembly with a paper, cardboard or polymer layer;

FIG. 92 illustrates a side view of a process step where the film layer is scored or scribed after assembly with a paper, cardboard or polymer layer;

FIG. 95 illustrates a schematic side view of film layer with embossed or debossed of shapes, having a plan view similar to FIG. 79 or 80;

FIG. 96 illustrates a schematic side view of film layer with embossed or debossed of shapes, having a plan view similar to FIG. 81, 82 or 82;

FIG. 97 illustrates an exaggerated schematic front or rear end view of a film layer which has been scored or scribed by a V-shaped rotating knife on its underside;

FIG. 98 illustrates an exaggerated schematic front or rear end view of a film layer which has been scored or scribed by a truncated v-shaped rotating knife such as in FIG. 84, on its upper side;

FIG. 99 illustrates an exaggerated schematic front or rear end view of a film layer which has been scored or scribed by a truncated rounded end rotating knife such as in FIG. 85 on its upper side;

FIG. 100 illustrates an exaggerated schematic front or rear end view of a film layer which has been scored or scribed by a double v-shaped rotating knife such as in FIG. 86 on its upper side;

FIG. 101 illustrates an exaggerated schematic front or rear end view of a film layer which has been scored or scribed by opposed and aligned truncated v-shaped rotating knives such as in FIGS. 84 and 93, simultaneously on its upper and lower sides;

FIG. 102 illustrates an exaggerated schematic front or rear end view of a film layer which has been scored or scribed by opposed and offset truncated v-shaped rotating knives such as in FIGS. 84 and 94, simultaneously on its upper and lower sides;

FIG. 103 illustrates an enlarged view of a portion of the components and arrangement of FIGS. 87, 89 and 93.

DETAILED DESCRIPTION OF THE EMBODIMENT OR EMBODIMENTS OF INVENTION 1

Figure 7:
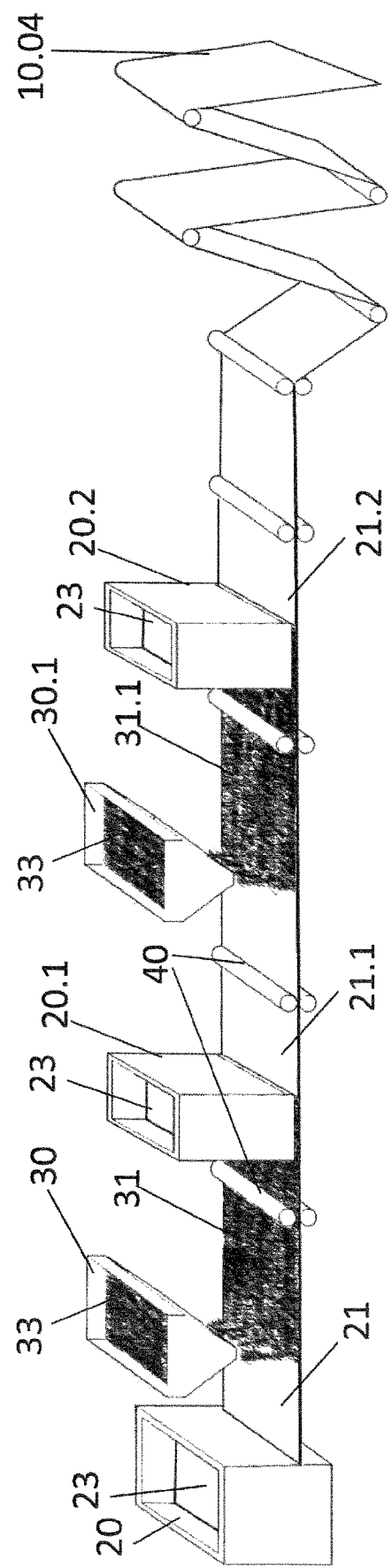
FIG. 7 is a perspective view of a schematic of a production system to produce a multilayer paper product similar to that of FIG. 4, with reinforcing fibres added after first pulp layer with a second pulp layer added, and a subsequent layer of reinforcing fibres added to the second layer, and finally a third layer of pulp added.

In general terms, the invention and embodiments as illustrated in FIG. 1 to 22, is a method of making a paper product 10, 10.01, 10.02, 10.03, 10.04, 10.05, 10.06, 10.07, 10.08, 10.09, 10.11, 10.12, 10.13 and 10.14 wherein the method includes the step of adding natural reinforcing material 31, 31.1, 51, 51.1, 61, 61.1, 71, 71.1 to one of: a) a layer of pulp as it exits or after it exits from a layer formation process or apparatus; or b) a tank 20, 20.1, 20.2 of pulp 23 prior to it exiting exits from a layer formation process or apparatus as a layer 21, 21.1, 21.2; or c) a combination of a) and b).

The pulp making process used can be any known to those skilled in the art, but preferably the most environmentally friendly pulp making process is used, as will be known by those skilled in the pulp making art.

Preferably the pulp used is any appropriate paper making pulp including or sourced from wood, fibre crops, waste paper, or rags or a combination of these.

In the machines and processes of FIGS. 2, 3, 5, 6, 7, 9, 11, 12, 14, 16, 17, 19, 21, and 22, the pulp layering process utilised and or paper making process utilised and or layering apparatus utilised and or paper making apparatus utilised can be any known by those skilled in the art, with hoppers 30, 30.1 and roll mechanisms 50, 50.1 and 60, 60.1 and 70 70.1 are sized and controlled to suit the machinery and processes utilised.

The natural reinforcing material 31, 31.1, 51, 51.1, 61, 61.1, 71, 71.1 is comprised of natural fibres, which are one of or a combination of two or more of: hemp, jute, bamboo, kabuya, kenaf, ramie, sisal, or other appropriate natural fibre.

In the system and method of FIGS. 2, 3, 5, 6 and 7 the natural fibres 31 and 31.1 are such that their orientation is not predetermined. Whereas, in the systems and methods of FIGS. 9, 11, 12, 14, 16, 17, 19, 21, and 22, the natural fibres 51, 51.1, 61, 61.1, 71, 71.1 have their orientation predetermined, whether in filament form, film form or woven form.

The fibres when oriented are preferably at an angle to the direction of movement of the pulp layer and this angle is in a range from parallel to said direction to 90 degrees to said direction.

The natural reinforcing materials utilised can be of a length which is not predetermined, that is, in the products and systems of FIGS. 1 to 7, they can be one or more than one of the following: random or of non pre-set length; uniform length; all the same length where the fibres are first passed through a sizing process; a mixture of pre-set lengths; a range of pre-set lengths.

The range of lengths for the fibres 31 utilised will depend upon the application for, design of, strength characteristic or other material property characteristic requirements of the paper product being produced. The length of fibre is expected to be of the order to 2 to 25 mm and up to 50 mm in length when these are being added by means of a hopper 30. It may be that the operation and characteristics of the hopper 30 may dictate a fibre length to ensure the optimal operation of the hopper and fibre metering systems used relative to the rate of flow of the pulp 21 passing under the hopper 30. In the case of the filaments the natural fibres are spun into continuous lengths and in the case of the mesh reinforcing natural fibre, these are filaments which are woven into the layer to be added to the pulp layer.

In the case of the embodiment of FIGS. 8 to 12, the natural reinforcing material is in the form of a film, such as those films produced from microfibrillated natural fibres such as wood pulp fibres, cotton fibres, tunicin cellulose, chitosan, silk fibres and collagen which had been developed in the 1990s by a super-grinding method.

In the case of the embodiment of FIGS. 13 to 17, the natural reinforcing material is a filament or filament layer, with the filaments being made from spun natural fibres. These can be individually wound onto reels or rolls 60, and unwound for adding to a layer of pulp. Alternatively, they can be enveloped in, or temporarily attached to, a film or natural fibre film whereby they are deployed within the film or they are separated from the film as they are brought into contact with the pulp layer 21, 21.1.

In the case of the embodiment of FIGS. 18 to 22, the natural reinforcing material is a mesh or woven layer, and can for example be such a layer made from hessian.

In each of the method and system embodiments of FIGS. 5, 6, 7, 11, 12, 16, 17, 21, 22, and 23 a second or subsequent layer of pulp such as 21.1 or 21.2 is added over the natural fibre reinforcing layer.

While in the embodiments of FIGS. 1 and 2 produce a product 10 where the natural fibre reinforcing layer 31 is the last layer added. Whereas in the rest of the embodiments, the last layer of natural fibre reinforcing is overlayed by final pulp layer such as 21.1 or 21.2. However, if desired, it will be understood that a multi pulp layer product can be produced which has one or more layers of natural reinforcing fibre sandwiched between the pulp layers and which finishes with a final layer of natural fibre reinforcing.

It will also be understood that any number of alternate layers of pulp and natural reinforcing fibres can be applied to construct a desired paper product. It will also be understood that depending upon the application and characteristics, multiple layers of pulp may be applied before a layer of natural reinforcing fibres is applied.

Illustrated in FIG. 1 is a paper material or product 10, having a pulp layer 21 and natural fibre reinforcing layer 31, which is made by the processes of FIG. 2 or 3. In the FIG. 2 embodiment the process is begun by producing a pulp 23 which is generally held in a tank 20, for feeding to the layer forming apparatus and ejecting a pulp layer 21 from the apparatus. Downstream of the layer forming apparatus associated with the tank 20, a hopper 30 and associated metering system (not illustrated) holds a supply of natural reinforcing fibres 33, which are fed to and deposited on the pulp layer 21 to produce the natural fibre reinforcing layer 21. This is then fed, as in pre-existing paper making machines, to a series of rollers 40 which apply pressure as required to produce the desired paper product, and a subsequent dewatering process (not illustrated) as is normal in such paper making processes.

The thickness of the pulp layer 21 and the natural fibre reinforcing 31 will be determined by the product 10 to be produced and its application.

Whereas in the embodiment of FIG. 3, a paper material or product 10.01 is formed by the natural reinforcing fibres 33 being added to pulp 23 by either being pre-mixed in a desired ratio, or added together to the tank 20 and mixed therein. The layer forming process then ejects a combined pulp and reinforcing layer 21, 31 which subsequently passes through rollers 40 and a dewatering process to produce product 10.01.

The embodiment of FIG. 4 is a paper material or product 10.02 which is similar to the product 10 in that it has a lower pulp layer 21 an intermediate natural fibre reinforcing layer 31 and an upper pulp layer 21.1. This is made by the process of FIG. 5, which is similar to that of FIG. 2 except that downstream of the hopper 30 is another tank or hopper 20.1 holding pulp 23 and has an associated layer forming apparatus to add an additional layer 21.1 to produce the product 10.02.

Whereas in the embodiment of FIG. 6, a product 10.03 is produced, which is similar to product 10.01, and made by a similar process to that in FIG. 3, except that a downstream tank or hopper 20.1 holding pulp 23 with an associated layer forming apparatus adds an additional layer 21.1 to produce the product 10.03.

Illustrated in the embodiment of FIG. 7 the process is similar to that of FIG. 5, except that downstream of the hopper or tank 20.1 there is first located hopper 30.1 with natural fibre reinforcing fibres 33 which are deposited to the layer 21.1 via a metering and layer producing apparatus (not illustrated) which produces a reinforcing layer 31.1. Downstream of the layer 31.1 is added a third pulp layer 21.2 which is added by hopper or tank 20.2 which holds pulp 23, to produce the final product 10.04.

Figure 8:
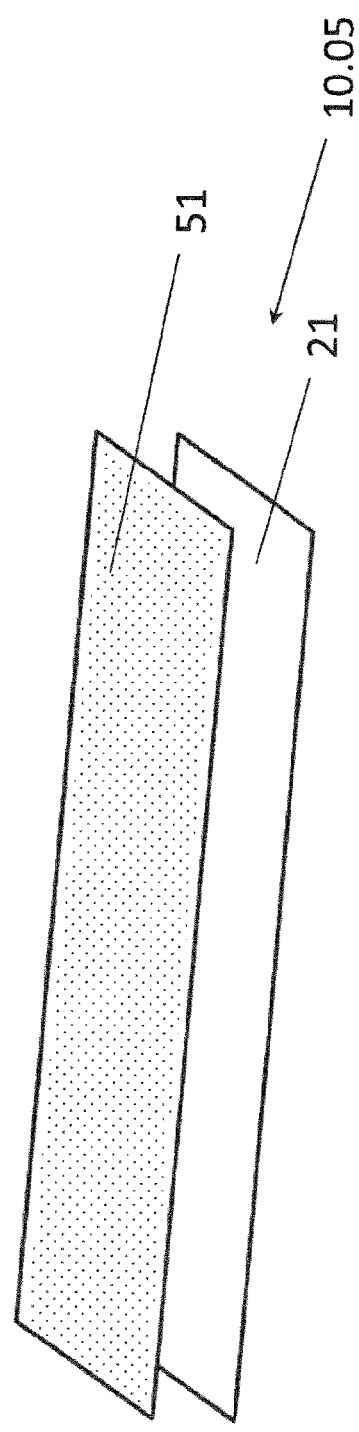
FIG. 8 is an exploded perspective view of a schematic of a paper product having a layer of pulp and a layer of reinforcing fibres made of naturally occurring materials applied as a film.
Figure 9:
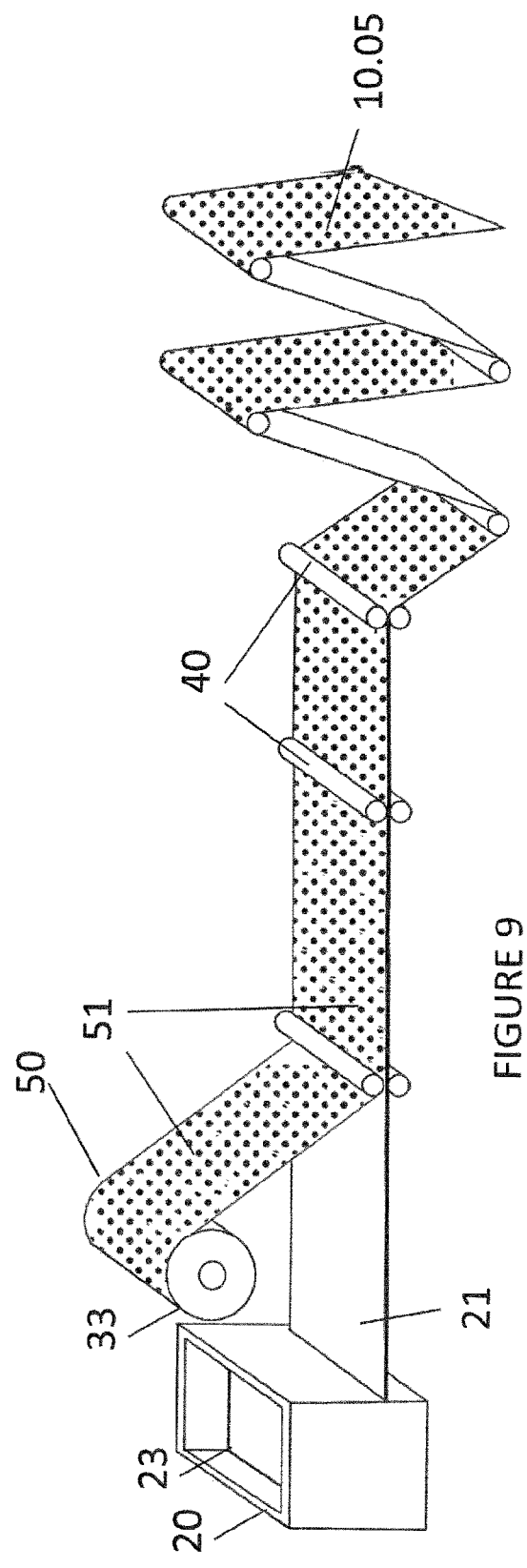
FIG. 9 is a perspective view of a schematic of a production system to produce the paper product of FIG. 8, with the natural fibre reinforcing film added after pulp layer is formed.

Illustrated in FIG. 8 is a paper material or product 10.05 which is comprised of a pulp layer 21 with a natural fibre reinforcing film layer 51. The film layer 51 can be of the sort produced from microfibrillated natural fibres such as wood pulp fibres, cotton fibres, tunicin cellulose, chitosan, silk fibres and collagen which had been developed in the 1990s by a super-grinding method. As illustrated in FIG. 9 the film 51 is rolled on a reel or roll 50 and applies to the pulp layer 21 which exits the tank 20, and is bonded or otherwise compressed to the layer 21 by rollers 40 to produce the product 10.05.

Illustrated in FIG. 10 is another paper material or product 10.06 which is similar to the product 10.05 of FIG. 8, except that a second layer of pulp 21.1 is applied by the process of FIG. 11 to the film layer 51. As is shown in FIG. 11, this is done by a tank or hopper 20.1 downstream of the film layer 51 and associated layer making apparatus to deposit the pulp layer 21.1 thereby resulting in the product 10.06.

Figure 12:
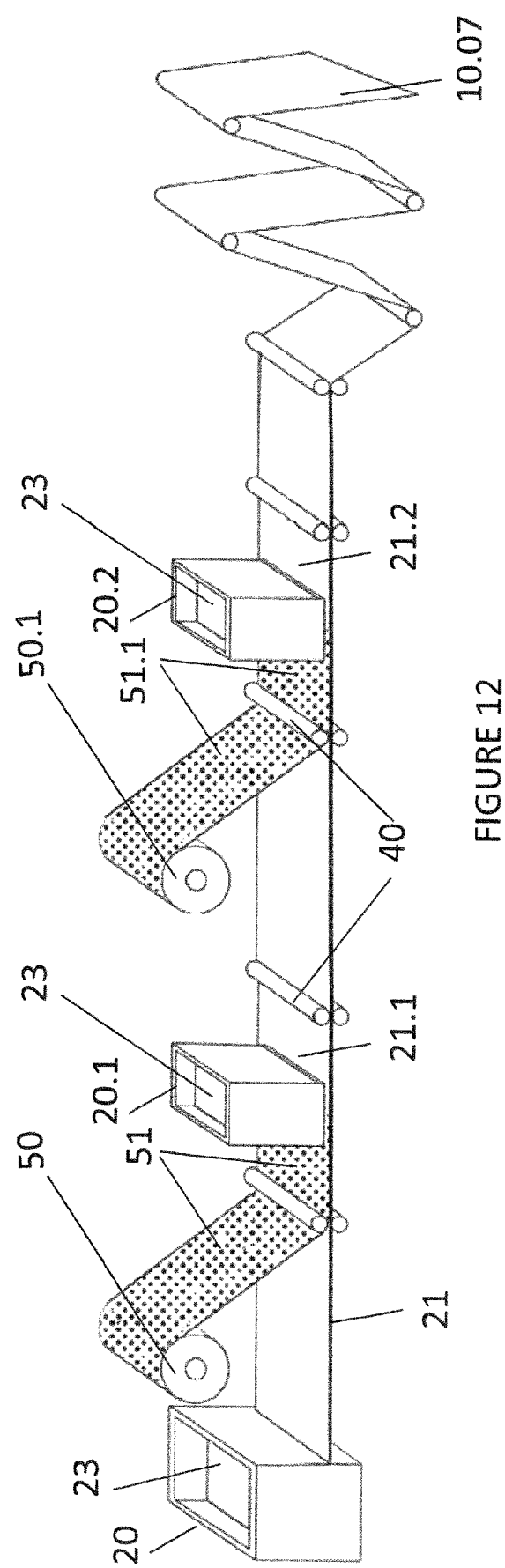
FIG. 12 is a perspective view of a schematic of a production system similar to that of FIG. 11, so as to produce a multilayer paper product similar to that of FIG. 10, with a reinforcing fibre film added after a first pulp layer is formed, with a second pulp layer added, and a subsequent layer of reinforcing fibre film added to the second layer, and finally a third layer of pulp added.

Illustrated in FIG. 12 is a process to produce a product 10.07 which is similar to the product 10.06), and produced by a process similar to that of FIG. 11, except that another natural fibre reinforcing film layer 51.1 is added from roller or reel 50.1 downstream of the tank or hopper 20.1. Subsequently, another pulp layer 21.2 is added from hopper or tank 20.2 which holds pulp 23, and this then feeds to further rollers to finally produce the paper material or product 10.07.

Figure 13:
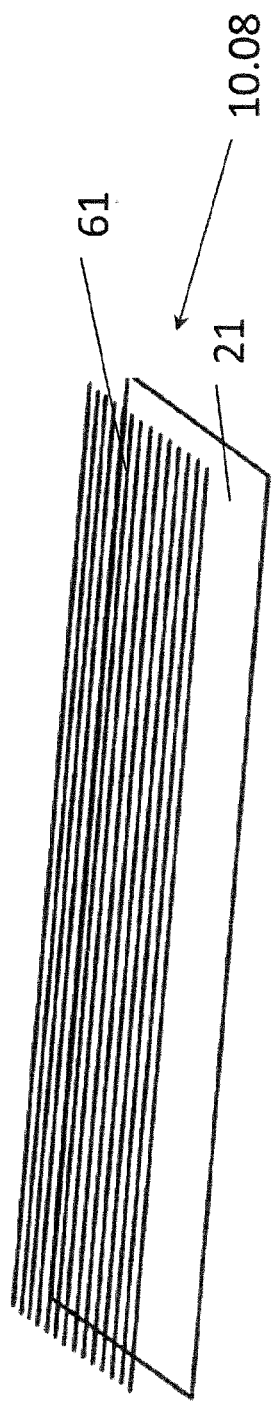
FIG. 13 is an exploded perspective view of a schematic of a paper product having a layer of pulp and a layer of reinforcing filaments made of naturally occurring materials applied to a first layer of pulp to form the product.
Figure 14:
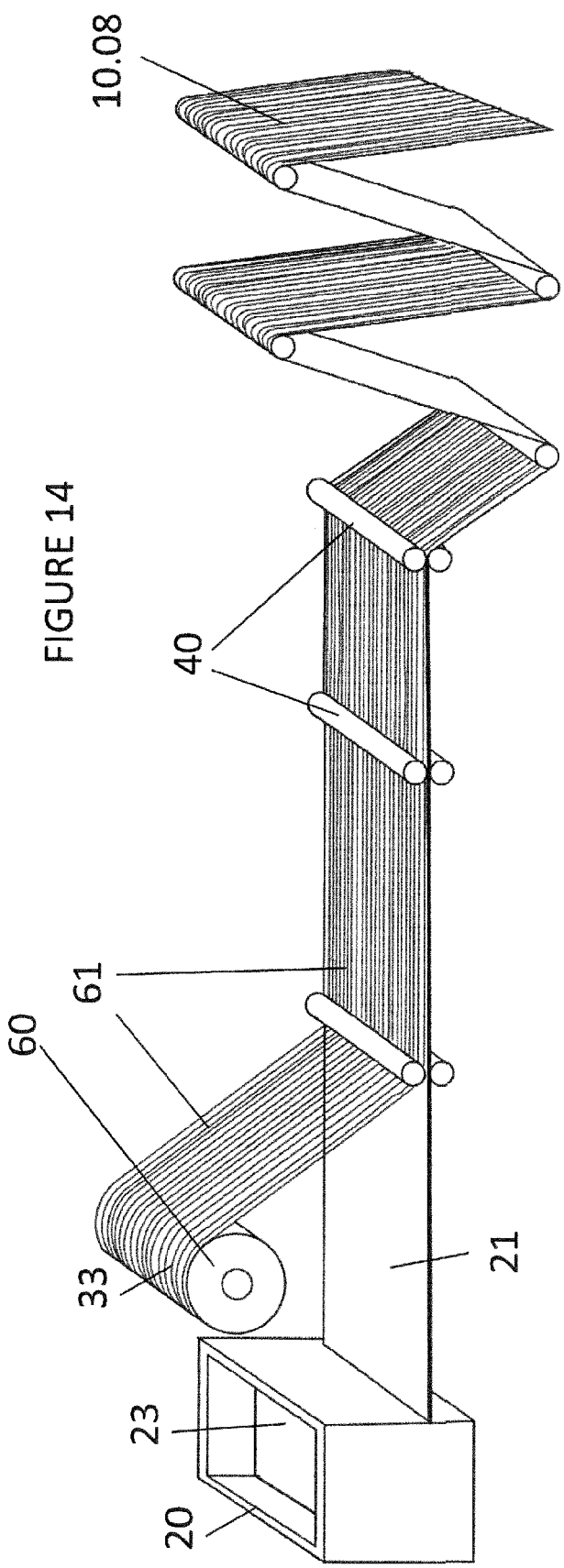
FIG. 14 is a perspective view of a schematic of a production system so as to produce the paper product of FIG. 13, with the natural fibre reinforcing filaments being added after pulp layer is formed.

Another embodiment of a paper material or product 10.08 is illustrated in FIG. 13 which has a lower pulp layer 21 with an upper layer 61 of natural fibre reinforcing in the form of filaments. The paper material or product 10.08 is produced by the method of FIG. 14, where a reel or roll 60, which comprises a multiple of filaments individually wound on the reel or roll 60. Alternatively the reel or roll 60 can be made up of a composite of multiple reels, so as to dispense the filaments 61 to the pulp layer 21. Another alternative is that the filaments 61 are enveloped in a film layer or attached to a film layer which in turn is wound onto a reel, and as the filaments are dispensed, the film layer can be removed. The filament layer 61 is added downstream of the tank 20, and passes through rollers 40 and on to a dewatering process to produce the paper material or product 10.08.

Illustrated in FIG. 15 is another paper material or product 10.09 which is similar to the product 10.08 of FIG. 13, except that a second layer of pulp 21.1 is applied to the film layer 61 by process of FIG. 16 which is the process of FIG.

14 which is extended to add another pulp layer. As is shown in FIG. 16, this is done by a tank or hopper 20.1 downstream of the point of addition of the filament layer 61 and associated layer making apparatus, to deposit the pulp layer 21.1 thereby resulting in the product 10.09.

Figure 17:
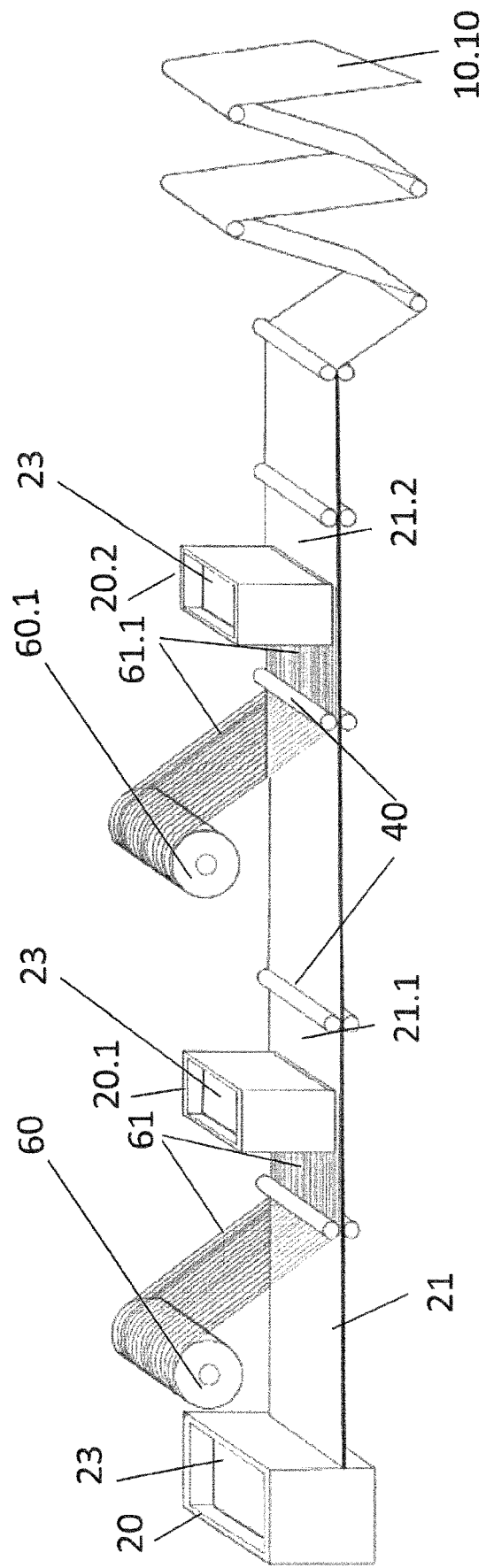
FIG. 17 is a perspective view of a schematic of a production system similar to that of FIG. 16, so as to produce a multilayer paper product similar to that of FIG. 15, with a reinforcing fibre filaments added after a first pulp layer is formed, with a second pulp layer added, and a subsequent layer of reinforcing fibre filaments added to the second layer, and finally a third layer of pulp added.

Illustrated in FIG. 17 is a process to produce a product 10.10 which is similar to the product 10.09, and produced by a process similar to that of FIG. 16, except that another natural fibre reinforcing filament layer 61.1 is added from roller or reel 60.1 downstream of the tank or hopper 20.1. Subsequently, another pulp layer 21.2 is added from hopper or tank 20.2 which holds pulp 23, and this then feeds to further rollers to finally produce the paper material or product 10.10.

Figure 18:
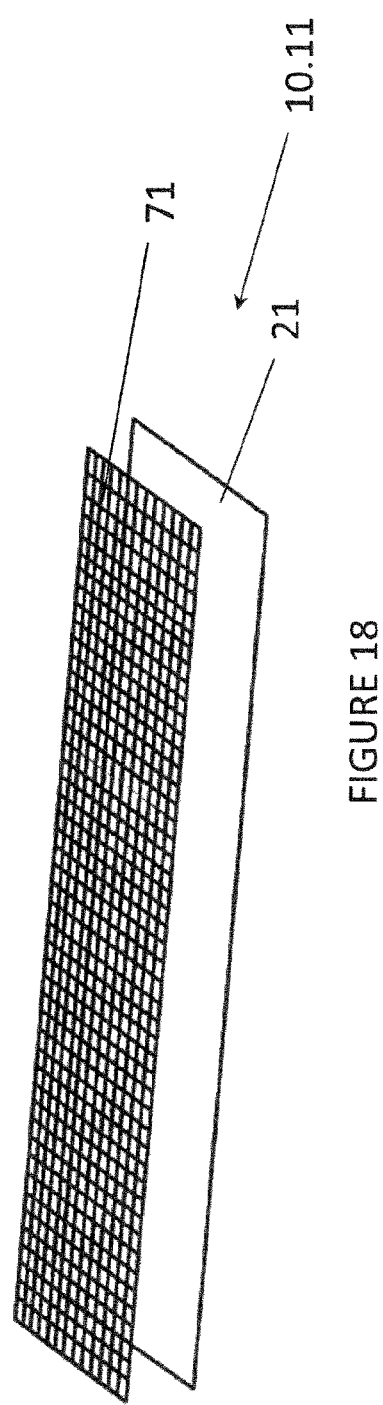
FIG. 18 is an exploded perspective view of a schematic of a paper product having a layer of pulp and a layer of reinforcing fibres in a mesh made of naturally occurring materials applied to a first layer of pulp to form the product.

Another embodiment of a paper material or product 10.11 is illustrated in FIG. 18 which has a lower pulp layer 21 with an upper layer 71 of natural fibre reinforcing in the form of a mesh or a woven layer which is woven from natural fibre filaments. The paper material or product 10.11 is produced by the method of FIG. 19, where a reel or roll 70 deposits layer 71 downstream of the tank 20, and passes through rollers 40 and on to a dewatering process to produce the paper material or product 10.11.

Figure 19:
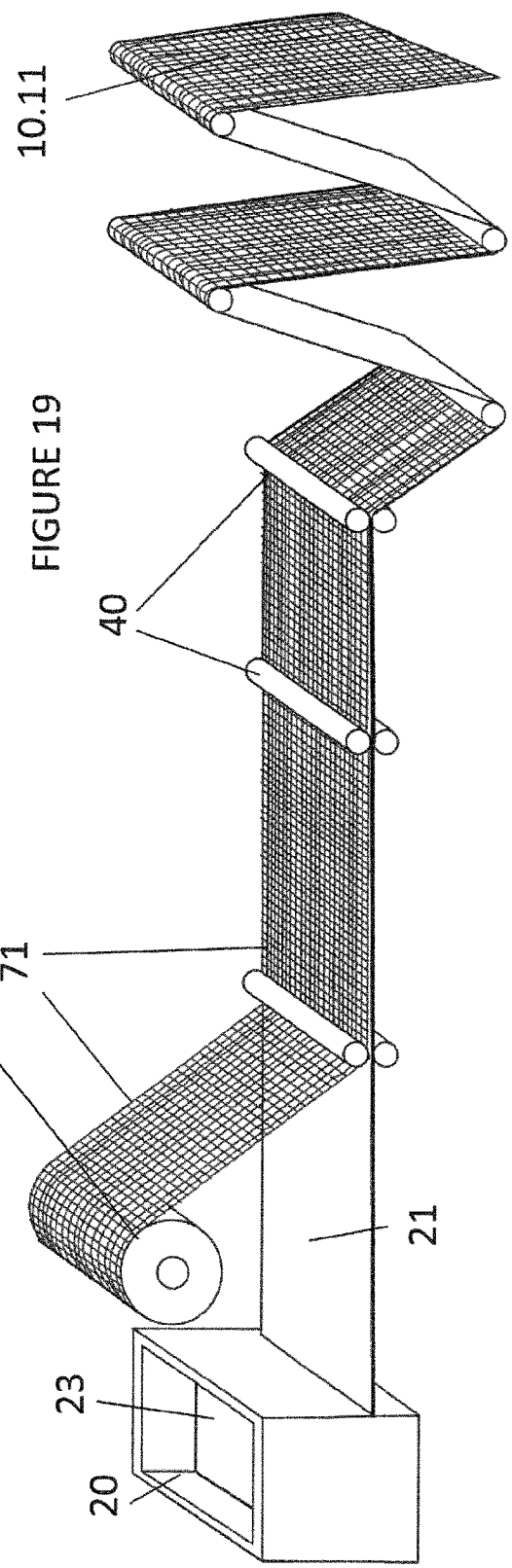
FIG. 19 is a perspective view of a schematic of a production system so as to produce the paper product of FIG. 18, with the layer of reinforcing fibres in a mesh being added after pulp layer is formed.
Figure 20:
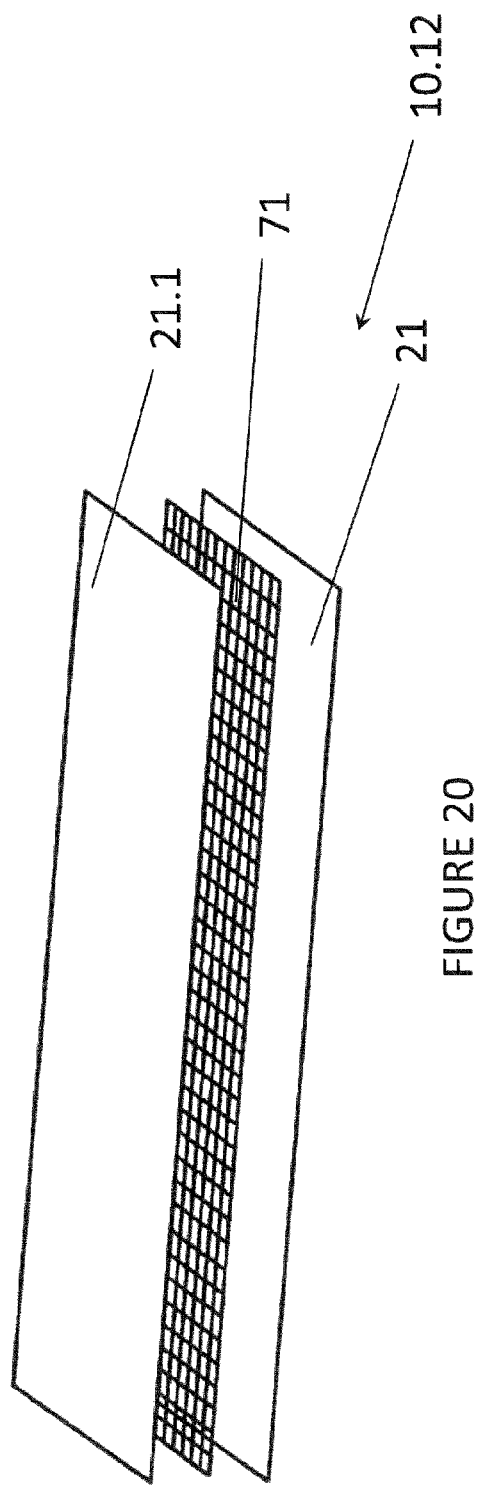
FIG. 20 is an exploded perspective view of a schematic of a multilayer paper product having a layer of pulp and a layer of reinforcing fibres in a mesh made of naturally occurring materials applied to a first layer of pulp, and then a second layer of pulp applied to sandwich the mesh layer to form the product.
Figure 21:
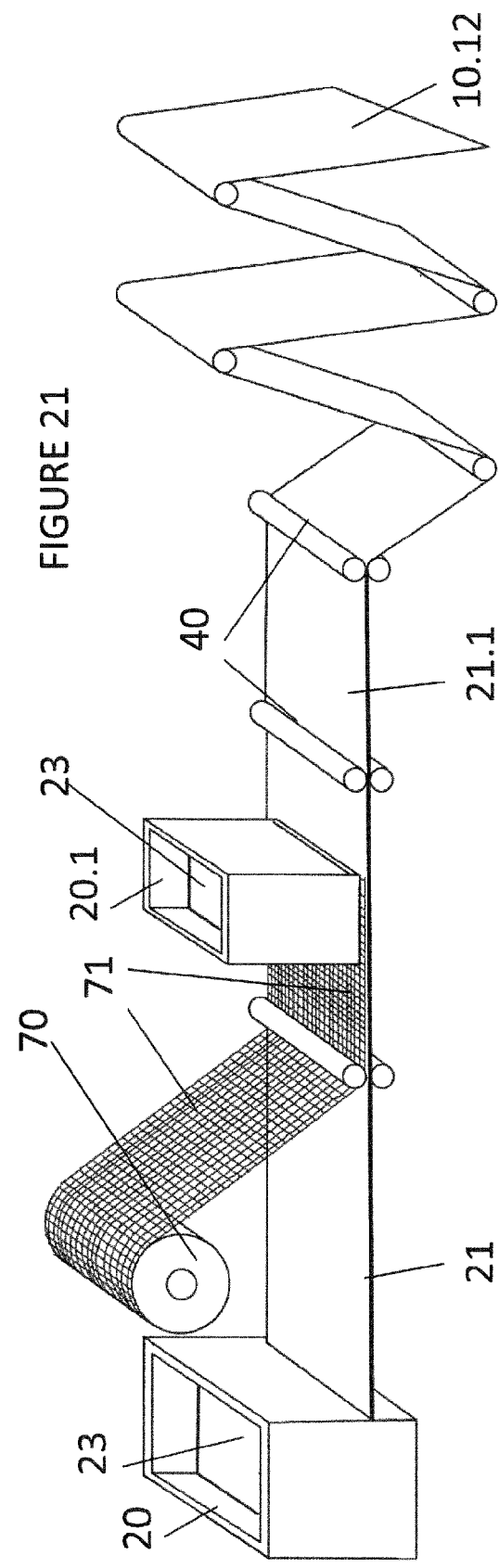
FIG. 21 is a perspective view of a schematic of a production system similar to that of FIG. 16, so as to produce the paper product of FIG. 20, with the layer of reinforcing fibres in a mesh being added after a first pulp layer is formed and a second layer of pulp being added to sandwich the reinforcing mesh.

Illustrated in FIG. 20 is another paper material or product 10.12 which is similar to the product 10.11 of FIG. 18, except that a second layer of pulp 21.1 is applied to the mesh layer 71 by process of FIG. 21 which is the process of FIG. 19 which is extended to add another pulp layer. As is shown in FIG. 21, this is done by a tank or hopper 20.1 downstream of the point of addition of the mesh layer 71 and associated layer making apparatus, to deposit the pulp layer 21.1 thereby resulting in the product 10.12.

Figure 22:
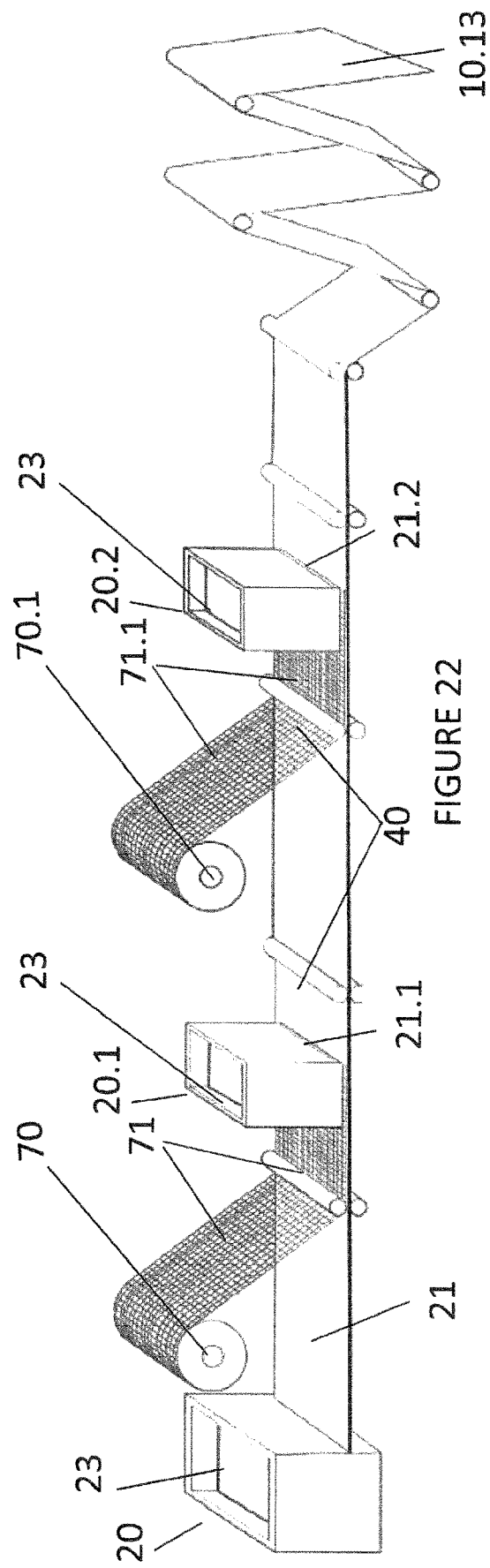
FIG. 22 is a perspective view of a schematic of a production system similar to that of FIG. 21, so as to produce a multilayer paper product similar to that of FIG. 20, with a layer of reinforcing fibres in a mesh added after a first pulp layer is formed, with a second pulp layer added, and a subsequent layer of reinforcing fibres in a mesh added to the second pulp layer, and finally a third layer of pulp added.

Illustrated in FIG. 22 is a process to produce a product 10.13 which is similar to the product 10.12, and produced by a process similar to that of FIG. 21, except that another natural fibre reinforcing mesh layer 71.1 is added from roller or reel 70.1 downstream of the tank or hopper 20.1. Subsequently, another pulp layer 21.2 is added from hopper or tank 20.2 which holds pulp 23, and this then feeds to further rollers to finally produce the paper material or product 10.13.

Figure 23:
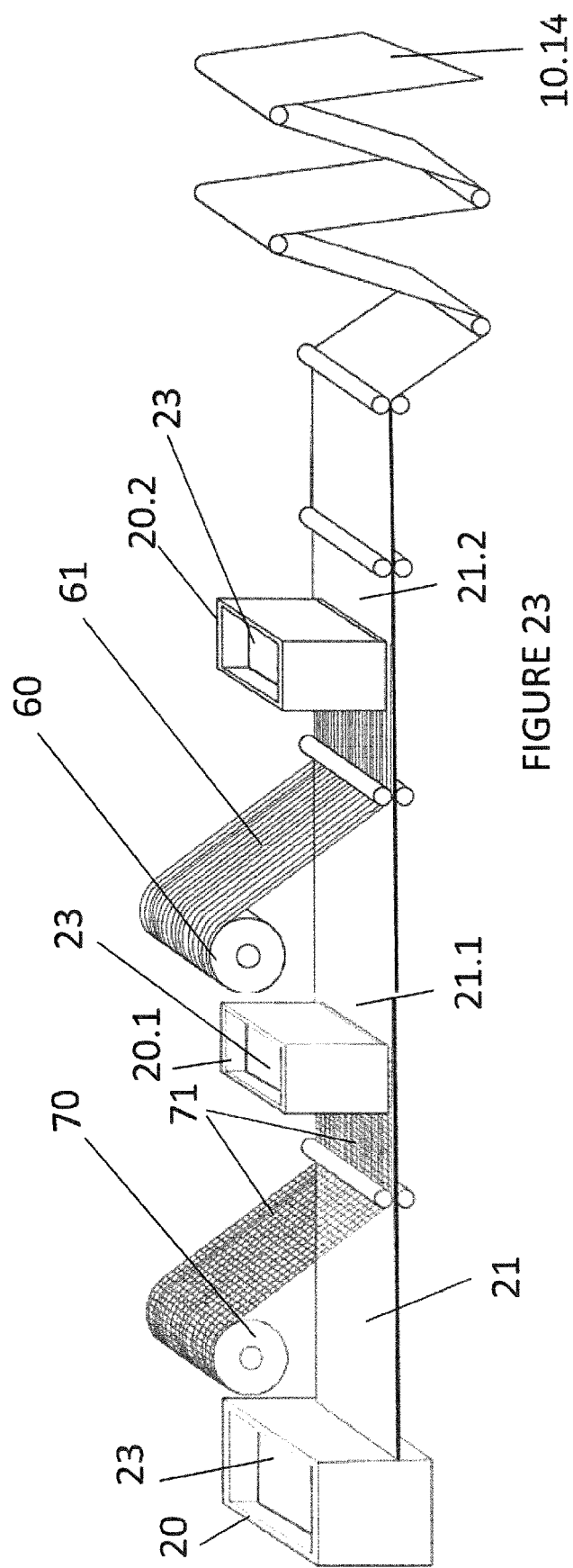
FIG. 23 is a schematic of production system similar to that of FIG. 22 to produce a multilayered product where the layer of reinforcing fibres in the lower layer is a woven or mesh which is overlayed by a pulp layer and then a second reinforcing layer being a filament layer is add prior to a final pulp layer being added.

Illustrated in FIG. 23 is a hybrid process of the processes described above. The above forms of natural reinforcing elements can be combined in different layers of the same product, such as is the case of paper material or product 10.14 in FIG. 23. Once the pulp layer 21 is formed a layer 71 of woven or mesh formed natural fibres is applied, then a second layer of pulp 21.1 applied, a second natural reinforcing material layer 61 in filament form is applied, before finally applying another layer of pulp 21.2. This just one example of the possible combinations able to be performed. Other combinations can include as one being a layer of natural fibres 31 and the other being in filament form 61; or one being a layer of natural fibres 31 and the other being in film form 51; or one being a layer of natural fibres 31 and the other being in woven or mesh form 71; or one being a layer of natural fibres 31 and the other being in a shredded filament form; or one being a layer in filament form 61 and the other being in film form 51; or one being a layer in filament form 61 and the other being in woven or mesh form 71 as in FIG. 23; or one being a layer in filament form 61 and the other being in a shredded filament form; or one being a layer in film form 51 and the other being in woven or mesh form 71; or one being a layer in film form 51 and the other being in a shredded filament form; or one being a layer in woven or mesh form 71 and the other being in a shredded filament form; or an combination of the forms if more than two layers of natural reinforcing material.

Thus by the methods described above a paper material or product 10, 10.01, 10.02, 10.03, 10.04, 10.05, 10.06, 10.07, 10.08, 10.09, 10.10, 10.11, 10.12, 10.13 and 10.14 is produced. Generally and broadly the paper material or product can be described as having either a mixture of pulp 23 and natural fibre reinforcement 33, or be comprised of a pulp layer 21 and a natural fibre reinforcement layer 31. Additional pulp layers 21.1 can be added and or alternating layers of pulp 21, 21.1 and natural fibre reinforcement 31, 31.1, 51, 51.1, 61, 61.1, 71, 71.1 can be added to construct the paper material or product to the desired characteristics.

Figure 104:
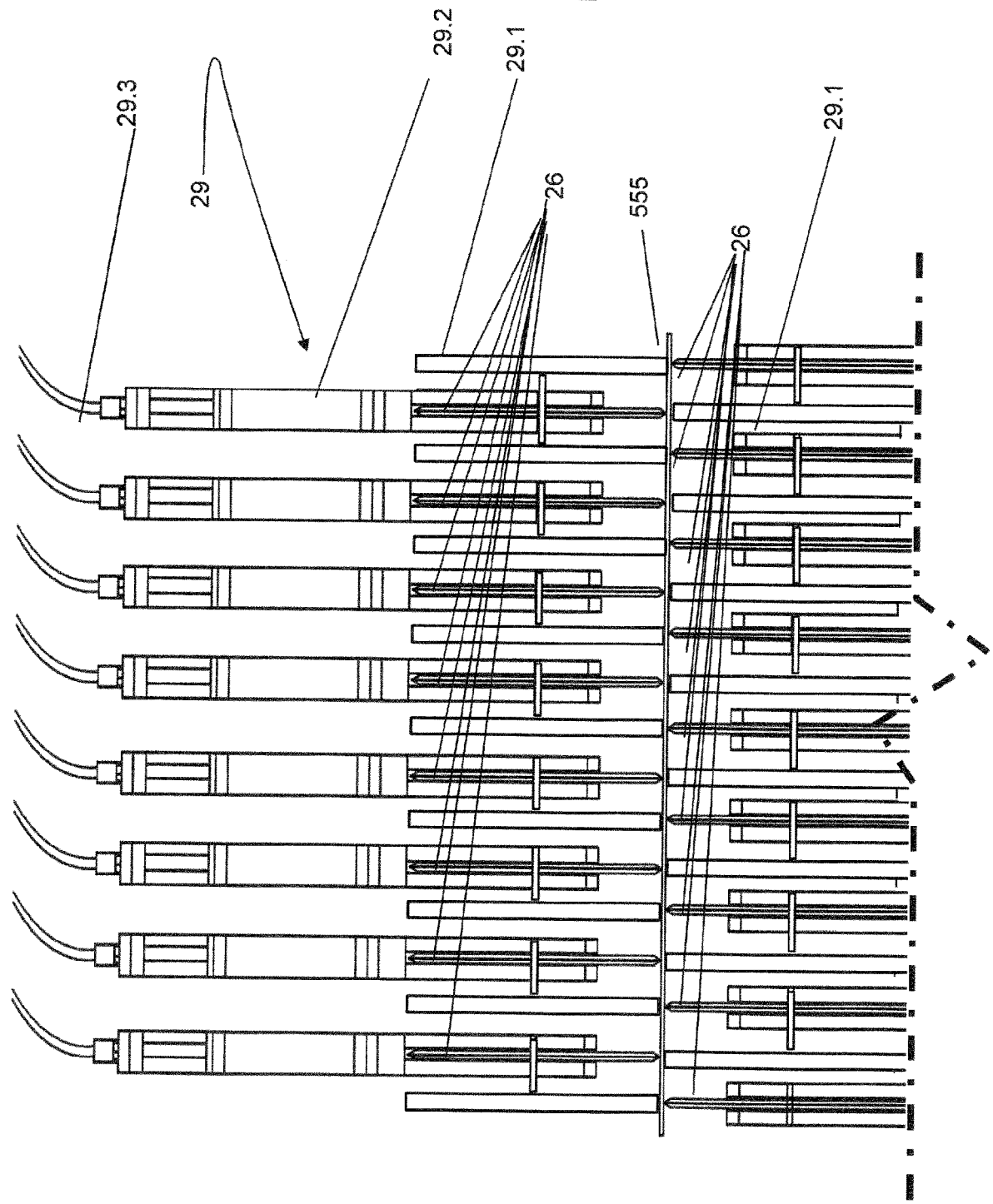
FIG. 104 illustrates an enlarged view of a portion of the components and arrangement of FIG. 94.

The paper material or product 10, 10.01, 10.02, 10.03, 10.04, 10.05, 10.06, 10.07, 10.08, 10.09, 10.10, 10.11, 10.12, 10.13 and 10.14 can be used for any purpose that paper material is used for such as packaging, bags, wrapping paper, special wrapping paper, mining pipes, special mining pipes, tubes, tubes for formwork and many others, including for use in manufacturing the materials as described with respect to FIGS. 24 to 44 and the materials as described with respect to FIGS. 45 to 104 below, where a paper or cardboard layer are indicated.

While the above description illustrates embodiments which contain exclusively one type of natural reinforcing material being added such as in FIGS. 1 to 7 and related description which has it in the form of natural fibres, or natural fibre film as in FIGS. 8 to 12; or natural fibre reinforcing filament as in FIGS. 13 to 17; or woven or mesh layers of natural fibre reinforcement as in FIGS. 18 to 22, it will be readily understood, that combinations of these can be readily put into production, for example, a paper material of product having a reinforcing layer which is a combination of two or more of layers 31, 51, 61, 71; or which has layers which alternate between the reinforcing types e.g. 31 and 51; or 31 and 61, or 31 and 71, or 51 and 61, or 51 and 71, or 61 and 71, or multiple alternating layers of different types.

In this regard, the film 51 of FIGS. 8 to 12 is added from a roll 50 and or 50.1, as are the filaments 61 from rolls 60 and the woven or mesh layer 71 from rolls 70. However it is readily envisaged that the film 51, filaments 61 and mesh 71 could be first chopped or shredded or comminuted into either random or non-preset lengths or chards or discrete pieces of set length and width and or thickness or shapes, and these can then be added to the pulp and or pulp layers in the same manner as natural reinforcing fibres are added as in FIGS. 1 to 7 to also produce a paper material or product.

While natural reinforcing materials described above have specific shapes such a mesh, or fibres or filaments, it will be understood that the natural reinforcing material can be supplied in any appropriate shape for adding to the pulp layer 21 or mixed in with the pulp material 23 in the tank or hopper 20.

In each of the systems described above in respect of FIGS. 1 to 23, the natural reinforcing material 31, 31.1, 51, 51.1, 61, 61.1, 71, 71.1 is added in a dry state to the layer 21 of pulp 23, or mixed in with the pulp 23 in the tank or hopper. However, it will be understood that it can be added in a wet state if appropriate. The wet state and or dry state of the natural reinforcing material 31, 31.1, 51, 51.1, 61, 61.1, 71, 71.1 can be varied according to a number of factors including material characteristics of the paper product or material to be produced and the downstream paper making processes to be performed, such as dewatering steps etc.

Detailed Description of the Embodiment or Embodiments of Invention 2

As illustrated in FIG. 24 there is disclosed an improved multi-layered construction for a multi-layered material 2.10.

As shown in FIGS. 24 and 25, and in general terms, the multi-layered sheet material 2.10 includes at least a layer of paper (or cardboard—from this point forward including the claims the word "paper" includes "cardboard" and vice versa) or polymeric material 2.15 (which may be, or not be, a compostable and or biodegradable polymer). For ease of reference, this layer will be referred to as a paper layer, but it should be understood that it can be replaced with a cardboard or polymeric layer. The paper layer 2.15 is bonded to at least one solid polymeric non-metallic non-woven film strength layer 2.20 (hereinafter "film layer 2.20" or "film layers 2.20"), which is a single full width film layer 2.20 having strength characteristics in the plane of the layer and in the roll direction D. Between the film layer 2.20 and paper layer 2.15 is a layer of adhesive 2.23 such as a polymer adhesive layer, as illustrated in FIG. 25. The layer 2.23 can be replaced by other bonding methods such as sonic welding where the layer 2.15 is a polymer layer and the film layer 2.20 is a compatible polymeric film layer.

The material 2.10 of FIGS. 24 and 25 is considered to be a single ply material in that only a single paper or polymeric layer 2.15 is present. It will be noted that a layer 2.25' is present in FIG. 24 which has a broken line outer frame which is used to denote that a coating layer 2.25' can be applied to form an outer layer of the material 2.10, and which can be applied to the film layer 2.20, or for that matter the paper or polymeric layer 2.15. The coating layer 2.25' can be of a thickness of the order of about 40 to 45 µm. The coating layer 2.25' can be pol666ypropylene, polyethylene, or a polypropylene and polyethylene blend, or another polymer variant. The coating layer 2.25' can be a coloured coating. Also, the coating layer 2.25' can be hydrophobic or hydrophilic, depending on the application and intended use of the multi-layered material 2.10.

In the embodiment of multi-layer material 2.10 described in the previous two paragraphs, the material 2.10 and products made from it may not be biodegradable and or compostable and or recyclable, but may be reusable. However, in another embodiment the multi-layer material 2.10 is a product or is used to make a product, which is biodegradable and or compostable and or recyclable and or reusable, by the material 2.10 being made from a layer 2.15 of paper or cardboard which are themselves biodegradable and or compostable and or recyclable or a polymeric or natural polymer material is chosen which has the same qualities. The at least one film layer 2.20 and the adhesive layer 2.23 are also chosen so as to be biodegradable and or compostable and or recyclable.

Illustrated in FIG. 25.1 is a multilayer material 2.10", which can be utilised as a liner or lining material, or put to any application for which it is suitable, for example concrete finishes, a sisalation for roofing, etc. It is made from an upper layer of material 2.10 of FIGS. 24 and 25, and a similar material 2.10' where the film layer 2.20' is another film layer and or an insulative material layer. The layers 2.20 and 2.20' are joined to respective paper or cardboard layers 2.15 by respective adhesive or adhesive membrane or liquid polymer layers 2.23. Finally, the paper or cardboard layers 2.15 are joined by an adhesive or adhesive membrane or liquid polymer layer 2.23' to finish the final assembly of the multilayer material 2.10". If the multilayer material 2.10" or the product or liner made from it, is to be biodegradable and or compostable and or recyclable and or reusable, then film layers 2.20 and 2.20' are made from materials which are biodegradable and or compostable and or recyclable such as films produced from microfibrillated natural fibres such as wool fibres, wood pulp fibres, cotton fibres, tunicin cellulose, chitosan, silk fibres and collagen. Such natural fibre films act as a natural insulative material to differing levels depending upon the layer thickness and layer material, where the application or end use would call for this. Alternatively, the insulative film layer 2.20' can be replaced by a paper or cardboard based insulative layer to perform the insulation functions, as paper or cardboard is biodegradable and or compostable and or recyclable. It will be understood that the adhesive or membrane or liquid polymer layers 2.23 which bind the film layer, insulation layer and cardboard layers together, are also selected from those which are biodegradable and or compostable and or recyclable, as described below.

Whereas if the multilayer 2.10" is not required to be biodegradable and or compostable and or recyclable and or reusable, then film layers 2.20 and 2.20' can be made from materials such as chemical based films as the film layer 2.20 whereas the insulative layer 2.20' can be made from metallised polyester, polystyrene foam, polyurethane foam, aluminium foil lined plastics, and the respective adhesive or membrane or liquid polymer layers 2.23, 2.23' can be selected from chemical based adhesives, membranes and polymers.

In respect of the material 2.10" of FIG. 25.1, if desired, or if called for by the application to which it is to be put, then a proportion of the layers utilised can be biodegradable and or compostable and or recyclable and or reusable, whereas other layers need not be so. This however, may make the material on the whole not biodegradable and or not compostable and or not recyclable and or not reusable.

A two-ply material 2.10.1 is illustrated in FIGS. 26 and 27 is produced by means of the material 2.10, to which a second paper or polymeric layer 25 is added, in a subsequent bonding step, or layers 2.15 and 25 are simultaneously bonded to the film layer 2.20 in the manufacturing process. As in the material 2.10 of FIGS. 24 and 25, there can be layers 2.23 of adhesive such as polymer-based adhesives, between the respective paper layers 25 and 2.15 and the film layer 2.20, as best illustrated in FIG. 27. If the layer 25 is a paper or cardboard or polymeric layer 25, then the liquid or melted polymer layer 2.23 represented with a broken line frame will be present. Alternatively, the paper/cardboard/polymeric layer 25 can instead be a coating layer 2.25' of a coating, for example of about 40 to 45 µm in thickness. The coating layer 2.25' can be polypropylene, polyethylene, or a polypropylene and polyethylene blend, or another polymer variant. The coating layer 2.25' can be a coloured coating. Also, the coating layer 2.25' can be hydrophobic or hydrophilic, depending on the application and intended use of the multi-layered material. In the case of a coating layer 2.25' being present instead of a paper/cardboard/polymeric layer 25, then the liquid or melted polymer layer 2.23 represented with a broken line frame will not be used or present.

As is described below, further layers can be added to form other variations as depicted in FIGS. 28 to 44. The film layer 2.20 can be made from a variety of materials, such as polyester, polypropylene, polyethylene, other polymer variant, or a blend of different polymeric materials if the characteristics of compostable and or biodegradable and or recyclable and or reusable is or are not required.

Several embodiments are illustrated in the accompanying FIGS. 24 to 43. The different embodiments can be used for constructing tubing or formwork of different tensile strengths, thicknesses, and weights. In the embodiments depicted in FIGS. 24 to 43, film layers 2.20 are used as the strength layers.

FIG. 28 depicts an embodiment of a multi-layered material 2.100. The multi-layered material 2.100 includes a layer of paper or cardboard 2.15, and a film layer 2.20. The film layer 2.20 is applied, adhered or bonded directly to the adjacent polymeric or paper or cardboard layers 25. In respect of the embodiment illustrated in FIG. 28 preferably the cardboard layer 2.15 is made of paper, such as Kraft paper, preferably of at least 20 grams per square metre (GSM). The film layer 2.20 can be made of materials which include polymers such as polyester, polypropylene, polyethylene, or another polymeric variant such as a blended material, or combinations of these materials. A specific example of such films are those made of 100% polypropylene, whether virgin or recycled, having a thickness of approx. 0.04 mm to 0.15 mm, having a tensile strength of greater than or equal to 45N in the roll direction, and an elongation of less than or equal to 30%.

When the film layer 2.20 and the material 2.100, and a product made from it, is to be biodegradable and or compostable and or recyclable and or reusable, then the film layer 2.20 can be provided from those films which will give this result. For example, films produced from microfibrillated natural fibres such as wood pulp fibres, cotton fibres, tunicin cellulose, chitosan, silk fibres and collagen which had been developed in the 1990s by a super-grinding method. An advantage of such natural fibre films is that they can also act as a natural insulative material, where the application or end use would call for this.

As illustrated in FIGS. 28 and 29, there is also another layer 2.115 located between the cardboard layer 2.15 and the film layer 2.20, being a coating or adhesive layer 2.115 which bonds the layers 2.15 and film layer 2.20 together. The adhesive coating layer 2.115 can be made by various resins, such as polymer resins, water or solvent based adhesives which can be heat activated, or heat activated various polymers, or a resin or adhesive can be used which creates a sealing bond to give the tube a hydrophobic property. As an example, the coating layer 2.115 which is located between the cardboard layer 2.15 and the film layer 2.20 can be about 30 to 40 μm in thickness.

The film layer 2.20 of FIG. 28 is described above as being bonded to layer 25 which consists of paper or polymer or cardboard, however this can instead be a layer 2.25' of a coating, for example about 40 to 45 μm in thickness. The coating layer 2.25' can be polypropylene, polyethylene, or a polypropylene and polyethylene blend, or another polymer variant. The coating layer 2.25' can be a coloured coating. Also, the coating layer 2.25' can be hydrophobic or hydrophilic, depending on the application and intended use of the multi-layered material.

In respect of FIG. 28, if the layer 25 is a paper or cardboard or polymeric layer 25, then the liquid or melted polymer layer 2.23 represented with a broken line frame will be present. Alternatively, the paper/cardboard/polymeric layer 25 can instead be a coating layer 2.25' of a coating, for example of about 40 to 45 μm in thickness. The coating layer 2.25' can be polypropylene, polyethylene, or a polypropylene and polyethylene blend, or another polymer variant. The coating layer 2.25' can be a coloured coating. Also, the coating layer 2.25' can be hydrophobic or hydrophilic, depending on the application and intended use of the multi-layered material. In the case of a coating layer 2.25' being present instead of a paper/cardboard/polymeric layer 25, then the liquid or melted polymer layer 2.23 represented with a broken line frame will not be used or present.

As an example, a multi-layered material 2.100 as discussed above can have a nominal thickness of about 0.30 mm to 0.40 mm, and a mass of around 235 GSM. Initially, the multi-layered material 2.100 thus constructed can be formed into widths of approximately 2.4 metres, and formed into another roll, which can be cut or slit and rewound to desired lengths and widths. A preferred roll about 152 to 175 mm in width, and 1000 m or more in length, can be used with existing spiral winding machines, to form a spiral wound tubing of any appropriate internal diameter, for concrete formwork. Typical diameters range between 250 mm and 2000 mm. If a paper layer 2.15 or 25 of about 105 GSM is used, the resulting tubing having two layers of the sheet material 2.100 and two alternating layers of Kraft paper, is expected to have a burst strength in a radial direction of the tubing of about 700 KPa or higher.

The coating layer 2.25' can have a bonding function, or not, as the case may be depending upon the application or use of the material 2.100. Where it has the same or a similar composition and function as the other coating layer 2.115, it enables further layers to be bonded to the multi-layered material 2.100. Therefore, the multi-layered material 2.100 depicted in FIG. 28 can be considered a base upon which other embodiments can be constructed, or from which variants are made. Exemplary embodiments are shown in FIGS. 30 to 44. Of course, as mentioned above, the layers can be bonded in other ways, such as by roll bonding.

Thus the basic sheet material can be considered to be a film layer 2.20, which is bonded to a paper, cardboard or polymeric layer 2.15 in the case of material 2.10 as in FIGS. 24 and 25; or a film layer 2.20, which is bonded to two paper, cardboard or polymeric layers 2.15 and 25 in the case of material 2.10.1 as in FIGS. 26 and 27; or a film layer 2.20 adhered to paper, cardboard or polymeric layers 2.15 and 25 via an adhesive layer 2.115 in the case of material 2.100 as in FIGS. 28 and 29.

As shown in FIG. 30, the multi-layered material 2.200 includes a multi-layered material 2.100 of FIG. 28 and further includes a paper or cardboard layer 2.15 that are bonded together. The provision of Kraft paper layers 2.15 on both sides of the overall material 200 increases the strength, thickness, rigidity of the material 2.200 compared to the multi-layered material 2.100 of FIG. 28. Tensile and burst pressures of the material 2.200 are also increased when the material 2.200 is used as e.g. a construction formwork tube.

As an example, a multi-layered material 2.200 as depicted in FIG. 30, given Kraft paper of about 105 GSM is used, can have a nominal thickness of about 0.45 mm, and a mass of around 340 GSM. The multi-layered material 2.200 thus constructed can be formed into widths of approximately 2.4 metres, and formed into another roll, which can be cut or slit and rewound to desired lengths and widths. The resulting roll can be about 152 to 175 mm in width, and 1000 metres or more in length. The roll can then be spiral wound using existing spiral winding machines into tubing of any appropriate internal diameter, for concrete formwork. The resulting tubing is expected to have a burst strength of 1080 KPa or higher.

FIG. 31 depicts a further embodiment. The multi-layered material 200 of FIG. 30 is further modified by adding layers of polymer blend coating 305, 310, one on either side of the multilayered material 2.200. The polymer blend coating layers 305, 310 can be water resistant (i.e. hydrophobic), so that the resulting multi-layered material 2.300 can act as a moisture barrier. The moisture barrier function of multi-layered material 2.300 can be useful in construction, or in other situations where moisture poses a threat to the finished product.

The multi-layered material 2.400 depicted in FIG. 32 is similar to the multi-layered material 2.300 depicted in FIG. 31. The difference between the two materials 2.400 and 2.300 is that the multi-layered material 2.400 shown in FIG. 32 adds only one film or polymer blend coating layer 405 on one side of the multi-layered material 2.200 shown in FIG. 30. Other multi-layered materials, or simply another film layer 2.20, can then be bonded to the multi-layered material 2.400 where further strength and thickness in the overall material is required.

The multi-layered material 2.500 depicted in FIG. 33 is constructed by adding a waterproof adhesive film 505 which bonds another paper or cardboard layer 510 to the paper or cardboard layer 2.15 of the basic multi-layered material 2.100. Another single layer or multi-layered material can be bonded to the paper or cardboard layer 510 to create the desired outcome. The multi-layered material 2.500 can be used in different applications, e.g. to form spiral wound tubes.

The cardboard, Kraft paper, or polymeric layers 25, 505 or 510 assist with later bonding of the multi-layered material into spiral wound tubes, by either adhesive or other bonding means.

Figure 34:
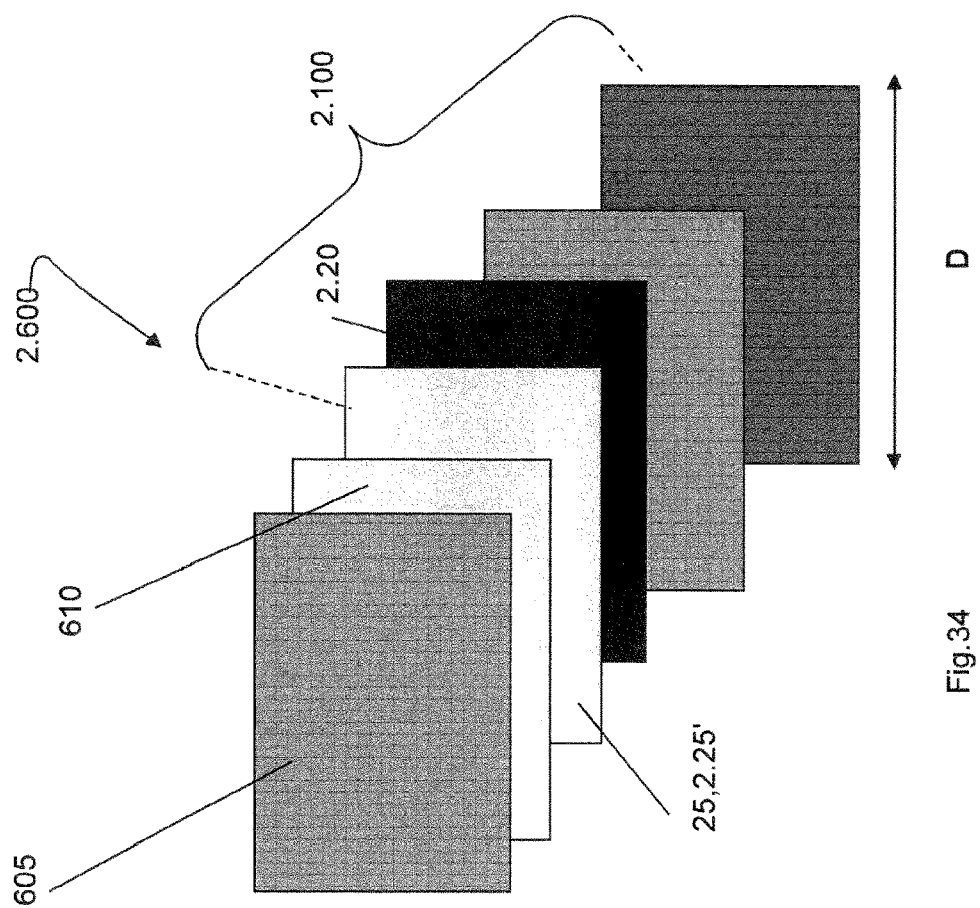
FIG. 34 is a schematic showing a multi-layered material according to an eighth material embodiment.

The multi-layered material 2.600 depicted in FIG. 34 is similar to the multi-layered material 2.500 depicted in FIG. 33. The difference is that the second paper or cardboard layer 605 is bonded to the paper layer 25 of the basic multi-layered material 2.100 via a coating layer 610. The coating layer 610 can be the same as, or similar to, the coating layer 2.25' described as being present in the multi-layered material 2.100 described in relation to FIG. 28, but will have adhesive, resin, or a solvent, etc., to enable the bonding between the paper layers 605, and 2.15.

Figure 35:
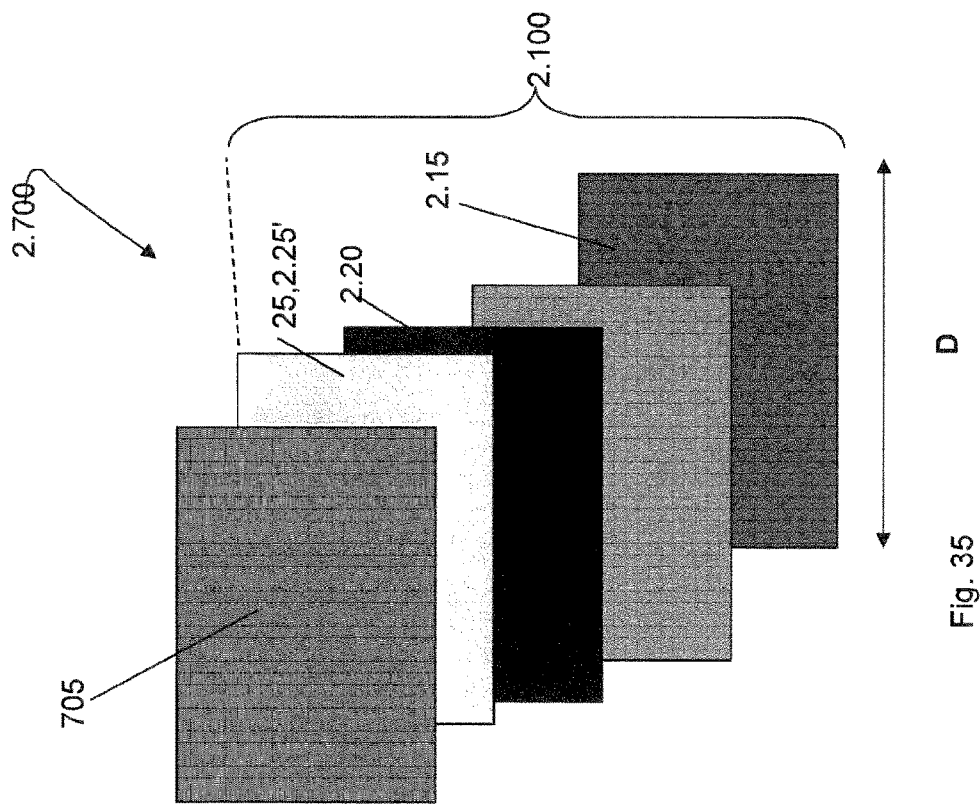
FIG. 35 is a schematic showing a multi-layered material according to a ninth material embodiment.

The multi-layered material 2.700 depicted in FIG. 35 adds a film or polymer blend coating 705 to the paper layer 25 or coating 2.25' of the multi-layered material 2.100 shown in FIG. 28. Further layers or variants of the multi-layered material can be added if desired.

Figure 36:
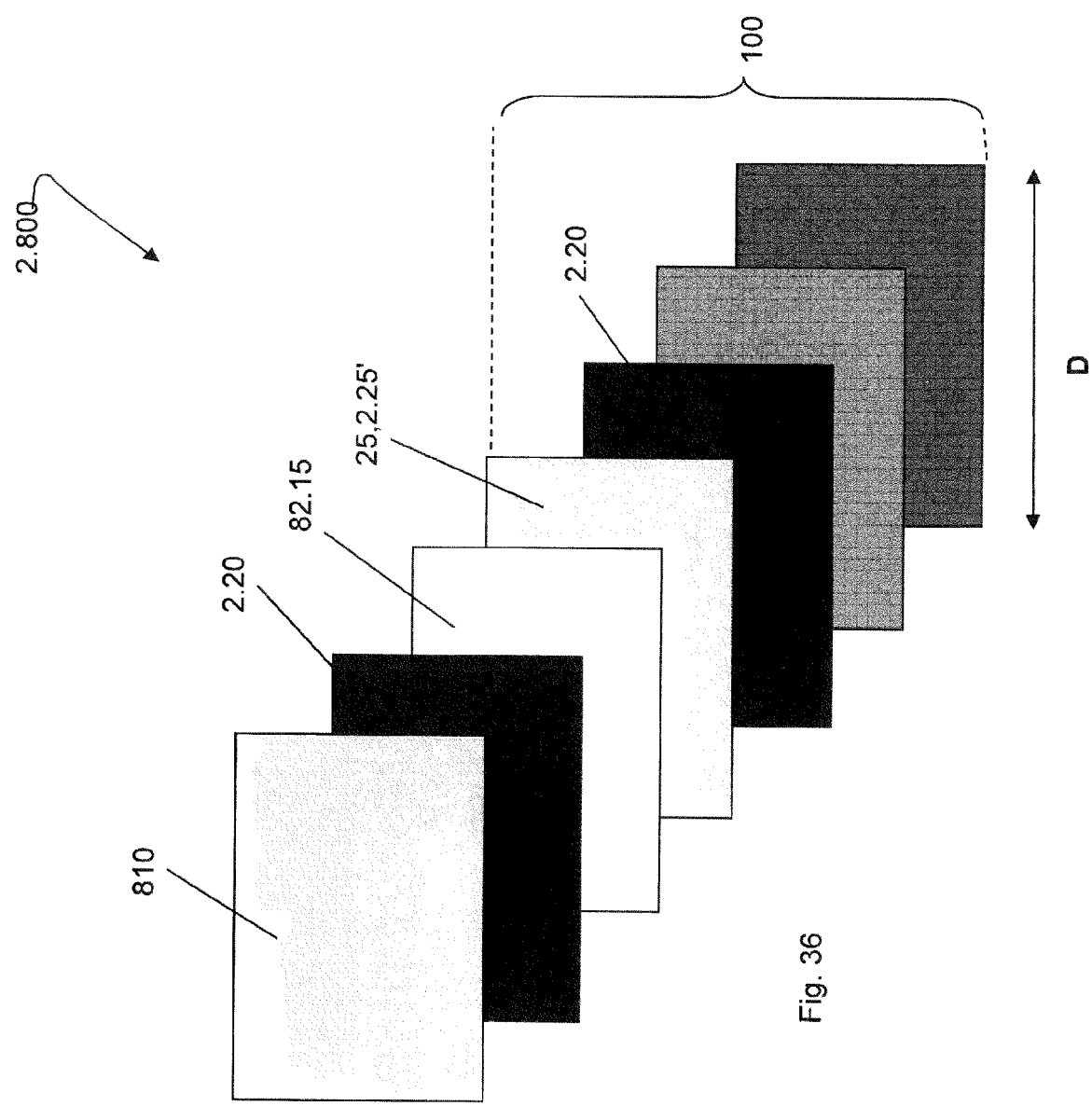
FIG. 36 is a schematic showing a multi-layered material according to a tenth material embodiment.

The multi-layered material 2.800 depicted in FIG. 36 adds a further film layer 2.20 sandwiched between two coating layers 810, 815, to the paper layer 25, or coating layer 2.25' of the multi-layered material 2.100 shown in FIG. 28. Again, the coating layer 815 closest to the paper layer 25 needs to be able to bond to the paper layer 25 or coating layer 2.25'.

Figure 37:
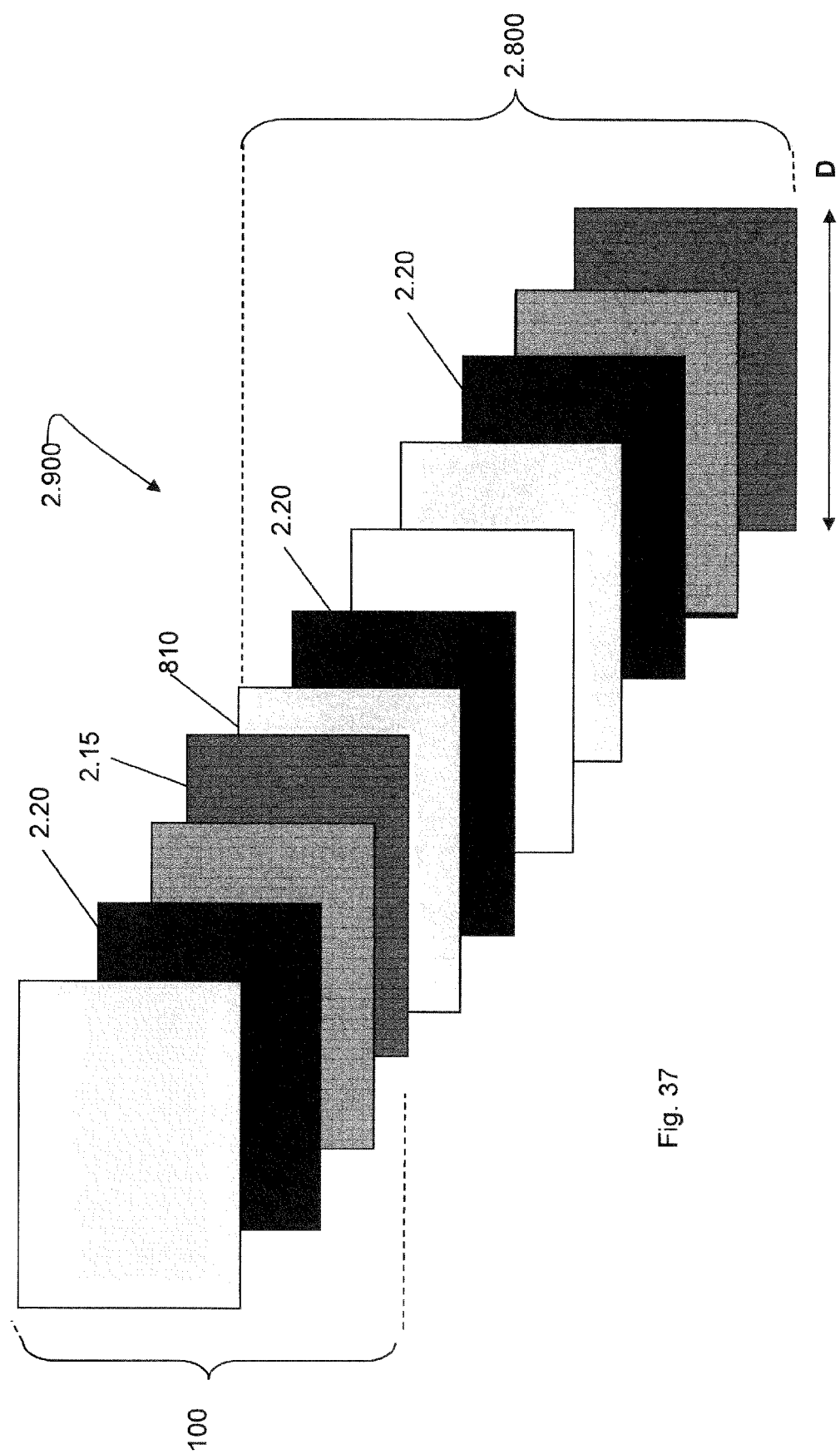
FIG. 37 is a schematic showing a multi-layered material according to an eleventh material embodiment.

The multi-layered material 2.900 depicted in FIG. 37 combines the material 2.100 shown in FIG. 28 to the material 2.800 depicted in FIG. 36.

The multi-layered materials 2.800, 2.900 depicted in FIGS. 36 and 37 have two and three film layers 2.20, respectively. This increases the tensile and burst pressures of the materials 2.800, 2.900. The materials 2.800, 2.900 are suitable as moisture barrier or heavy-duty construction liner.

Figure 38:
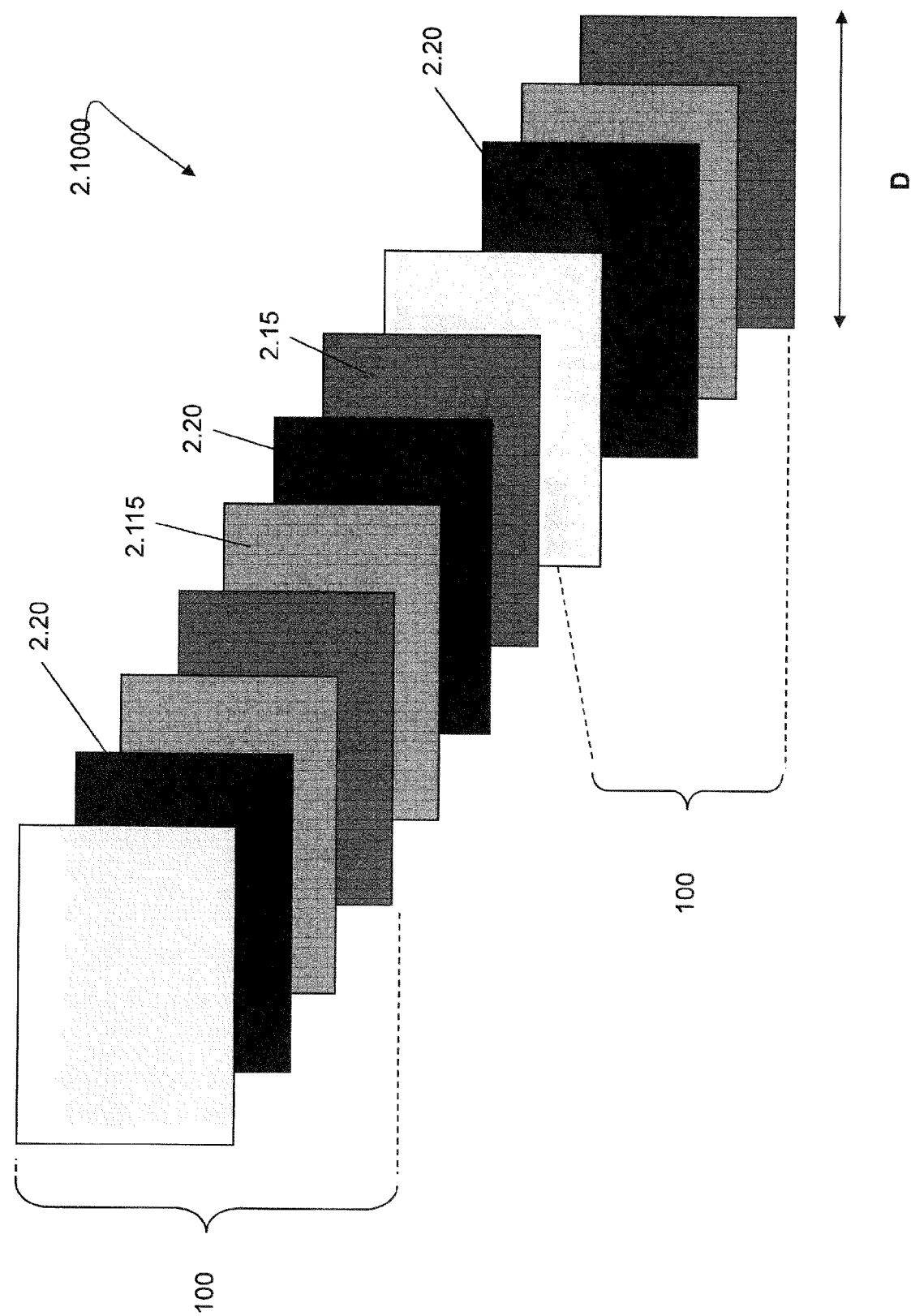
FIG. 38 is a schematic showing a multi-layered material according to a twelfth material embodiment.

The multi-layered material 2.1000 depicted in FIG. 38 combines two of the multi-layered materials 2.100 shown in FIG. 28, one on either side of three centre layers. The three centre layers include a coating layer 2.115, a film layer 2.20, and another paper layer 2.15. This variant can further be bonded to another variant combination, as it has a Kraft paper as an outer layer. Doing so can substantially increase the overall tensile strength, burst pressure, and rigidity in the finished product.

Figure 39:
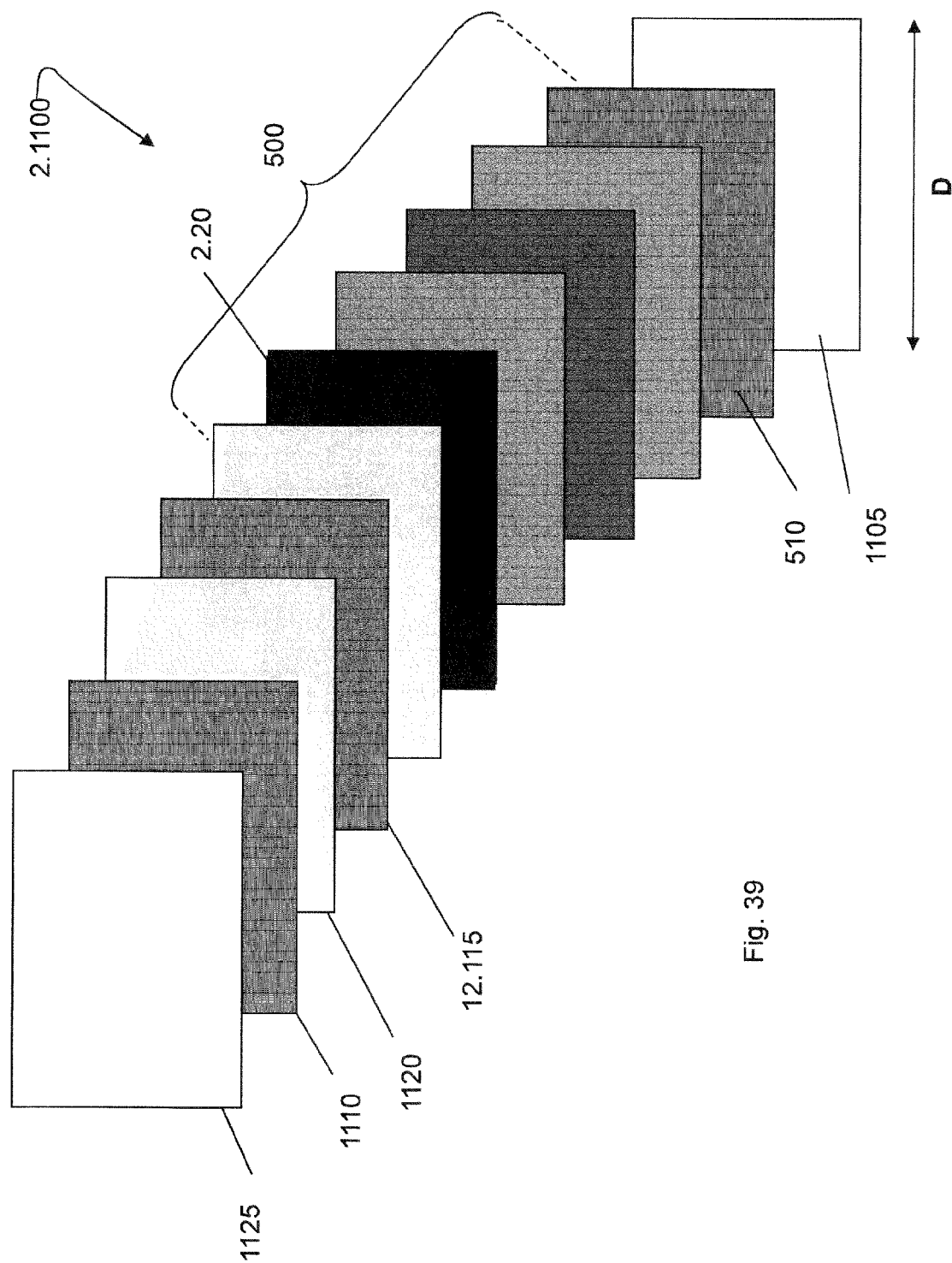
FIG. 39 is a schematic showing a multi-layered material according to a thirteenth material embodiment.

The multi-layered material 2.1100 depicted in FIG. 39 can be considered as being based on the multi-layered material 2.500 shown in FIG. 33. A film or polymer blend coating 1105 is added to the end paper layer 510 of the multi-layered material 2.500. On the other side of the multi-layered material 2.500, two paper layers 1110, 1115 which are bonded by a coating layer 1120 capable of bonding the two paper layers 1110, 1115, are added. The outermost of the two paper layers 1110 is further coated with a film or polymer blend coating 1125. This variant 2.1100 in effect adds two more layers of Kraft paper to the embodiment shown in FIG. 33. Due to the presence of multiple layers of paper, coating, and film, this material 2.1100 can be used in applications where more rigidity and higher strength is required. For example, it can be used as a moisture barrier for various commercial, construction, and industrial applications.

Figure 40:
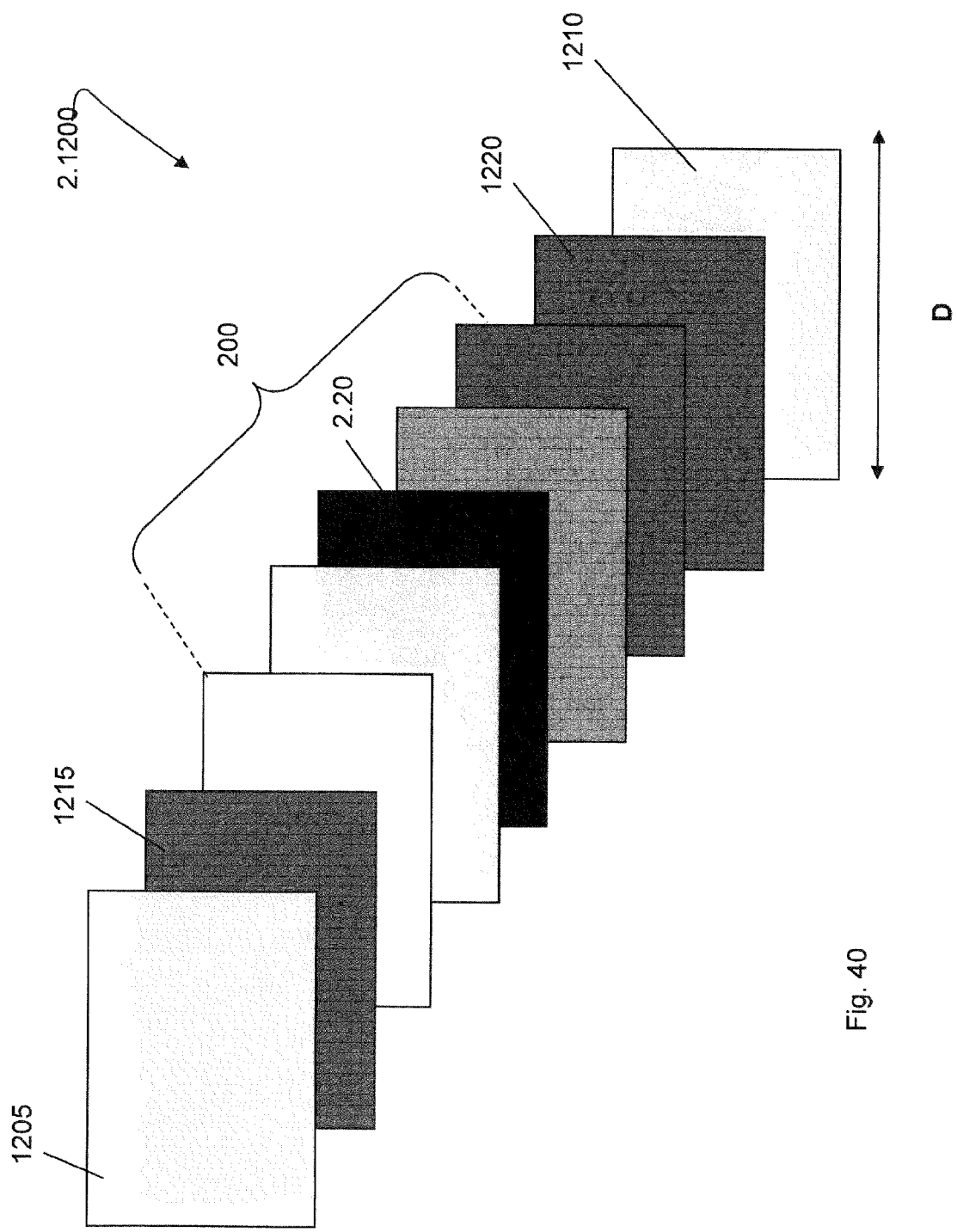
FIG. 40 is a schematic showing a multi-layered material according to a fourteenth material embodiment.

The multi-layered material 2.1200 depicted in FIG. 40 can be considered as being based on the material 2.200 depicted in FIG. 30. Here, two more paper layers 1205, 1210 are added to the basic material 2.200, one on each side. The paper layers 1205, 1210 are bonded to the basic material via waterproof adhesive films 1215, 1220, respectively. Both of the outer layers 1205, 1210 of this embodiment of the multi-layered material 2.1200 are paper. Therefore, if desired two other variants can be further added to this material 2.1200, one on each side, by the user.

The multi-layered material 2.1300 depicted in FIG. 41 is based on the material 2.100 depicted in FIG. 28, but still has the basic combination of a paper or polymer layer and a film layer 2.20. Here, a paper layer 2.15 is located adjacent the film layer 2.20. A waterproof adhesive film 2.1315 is added as an outer layer to the paper layer 2.15. A coating layer 2.25' is added as an outer layer adjacent the film layer 2.20. The positions of the adhesive film 2.1315 and the coating layer 2.25' can be reversed. The adhesive film 2.1315 allows this variant 2.1300 to be easily added to another multi-layered material.

The multi-layered material 2.1400 depicted in FIG. 42 is also based on the material 2.100 depicted in FIG. 28. An aluminium film or sheet 1405 is bonded to the coating layer 25 of the material 2.100 described in relation to FIG. 28. A polymer blend film 1410 coats the aluminium sheet 1405.

Figure 43:
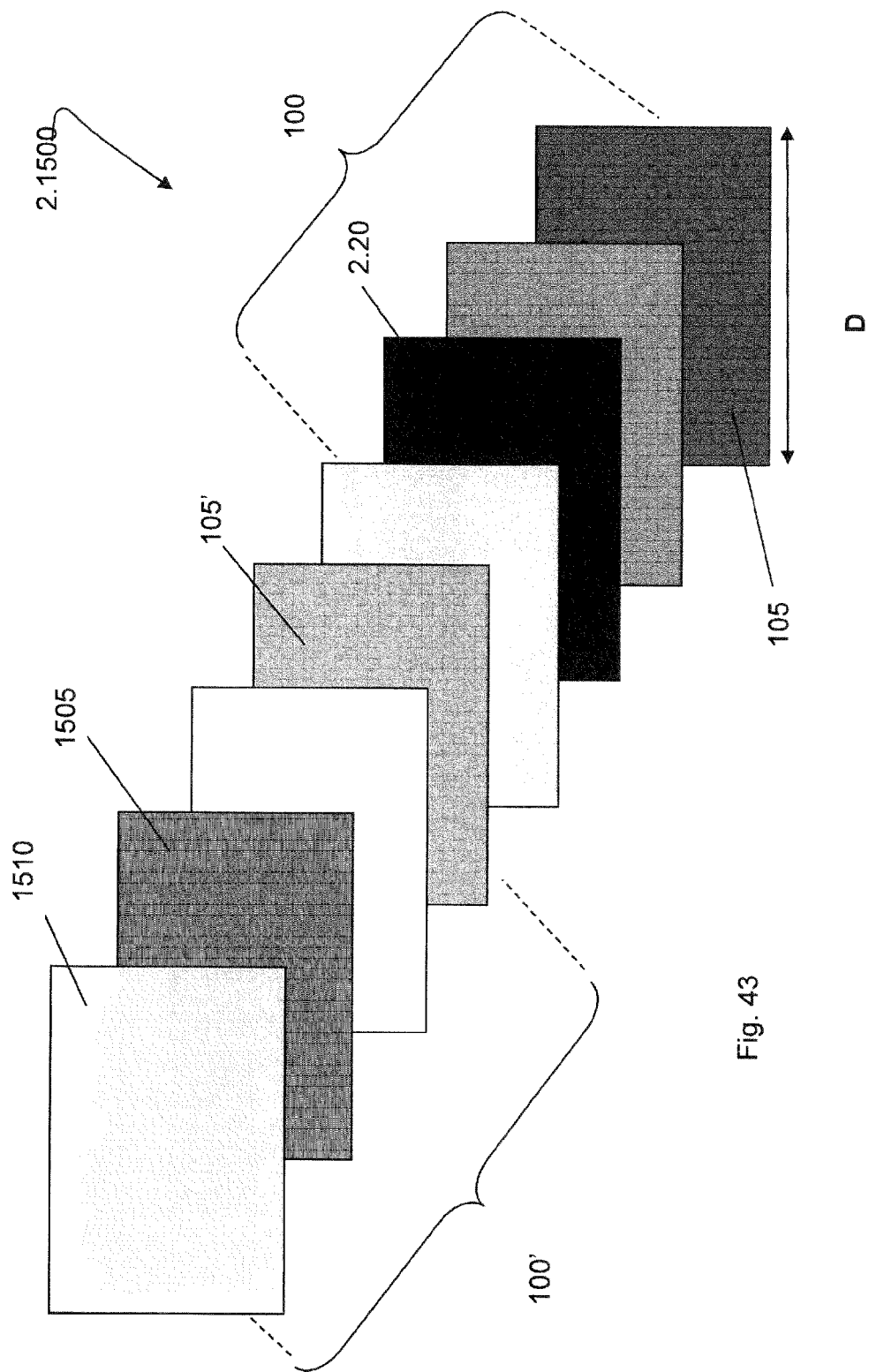
FIG. 43 is a schematic showing a multi-layered material according to a seventeenth material embodiment.

The multi-layered material 2.1500 depicted in FIG. 43 is the combination of a multi-layered material 2.100 depicted in FIG. 28 and a material 2.100' being of four layers similar to material 2.100. A difference being that material 2.100' has instead of the film layer 2.20, it is replaced by a metallic layer being an aluminium sheet 1505. Another difference is the coating layer 1510 which coats the metallic sheet is a polymer blend film.

Figure 44:
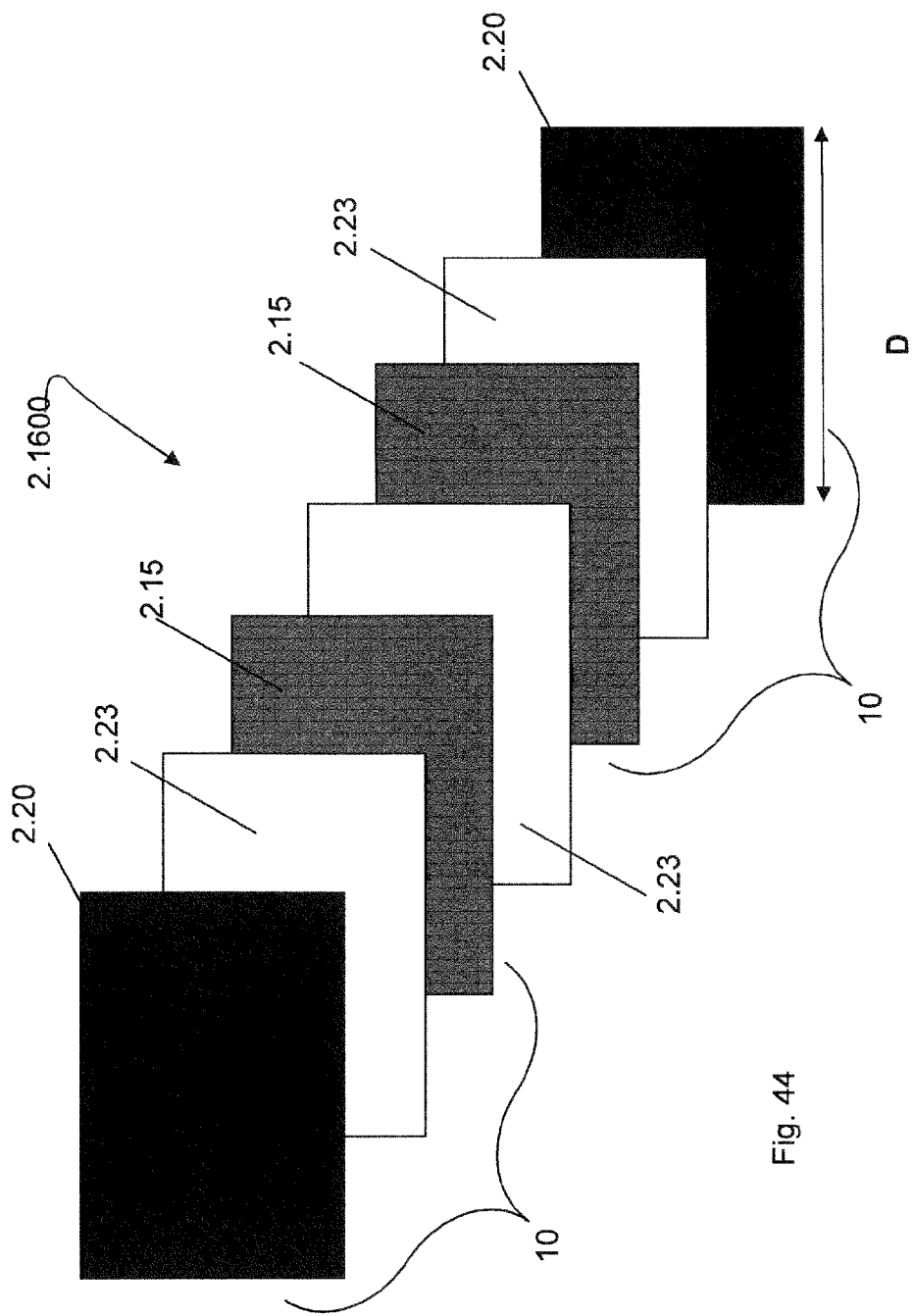
FIG. 44 is a schematic showing a multi-layered material according to an eighteenth material embodiment.

Illustrated in FIG. 44 is a multi-layered material 2.1600, which is based on the multi-layered material 2.10 from FIG. 28, in that upper and lower layers comprise the same layers as material 2.10 so that the paper or cardboard layers 2.15 are located on either side of a third polymer or adhesive layer 2.23, with the two film layers 2.20 being the outer layers of the material 2.1600. In this embodiment the film layers 2.20 can be of a gauge of from around 0.010 mm up to of the order 0.150 mm. Such a material 2.1600, depending upon the thickness it is made to, can be used to form construction elements or formwork and or be used with such construction elements or formwork.

In all of the embodiments described above in relation to FIGS. 24 to 44, some or all of the paper layers can be replaced with polymeric layers.

Any two or more of the embodiments described above in relation to FIGS. 24 to 44, or variants of the above embodiments, can be bonded together to form further variations.

In the above embodiments described above in relation to FIGS. 42 and 43, the aluminium sheet layers can be replaced with other metallic layers, provided the metal chosen possesses the qualities (e.g. sufficient tensile strength against stretching) for forming sheets or films, for the applications contemplated herein.

While the above description of embodiments described above in relation to FIGS. 24 to 44 generally describes a single layer of film 2.20, it will be readily understood that multiple layers of film 2.20 can be utilised. Additionally, the material which is selected for the film layer or layers 2.20 can be a compostable and or biodegradable and or reusable and or recyclable material so that the final product made from the material can also have these characteristics.

The steps described above with respect to FIGS. 24 to 44 can be repeated as required to construct a multilayered material, that can used for items such as liners, packaging, bags, wrapping paper, special wrapping paper, mining pipes, special mining pipes, tubes, tubes for formwork and or construction purposes and many others. The numbers of layers, their thickness and the combination of layers can be varied according to the end application and or end product that the multilayered material will be formed into or put to.

Figure 74:
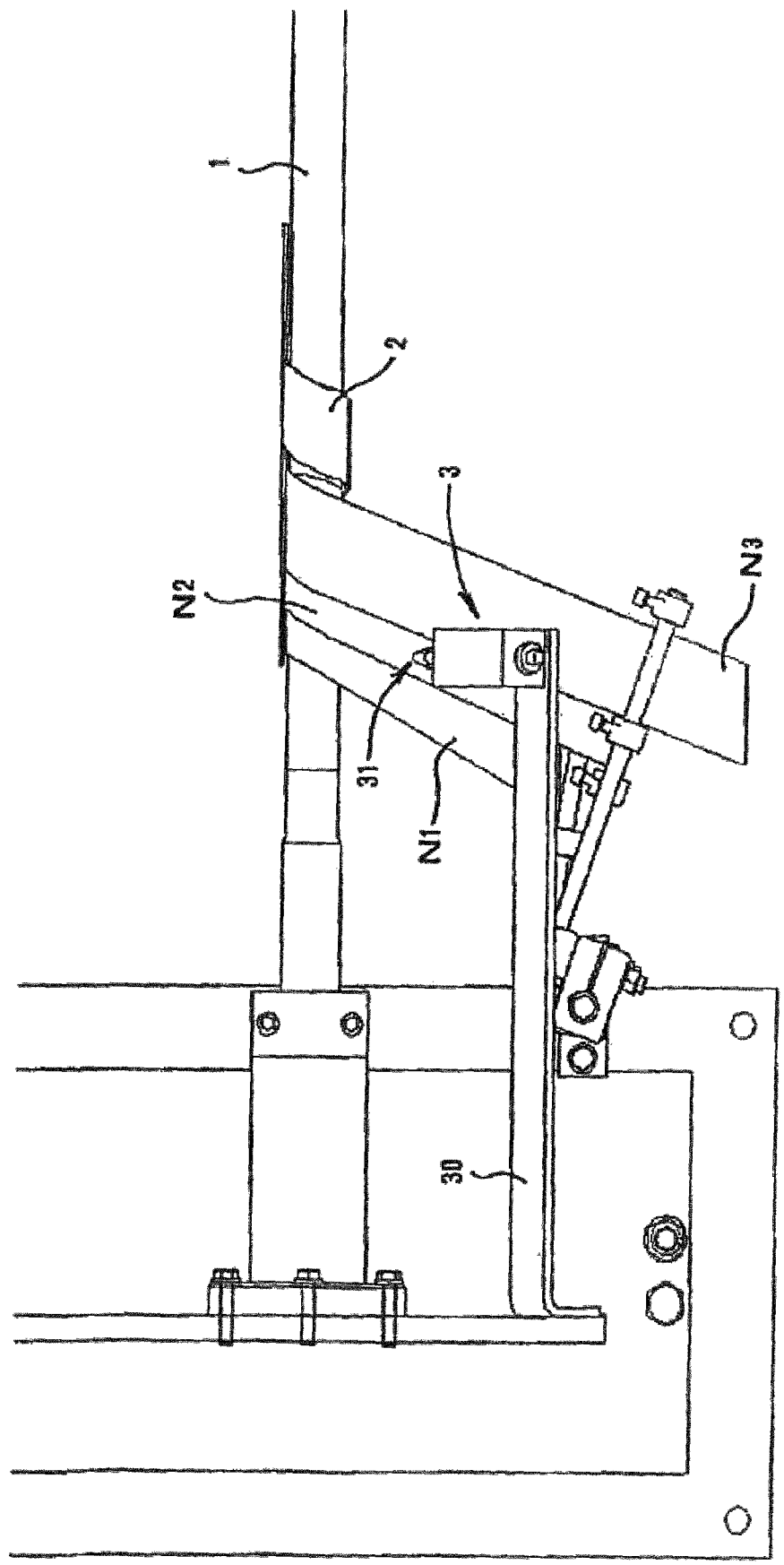
FIG. 74 is a side view or plan view depicting an existing spiral winding machine.

FIG. 74 which is taken from FIG. 2 of US patent application publication No. US2005255981 to Perini Fabio, partially shows a spiral winding machine, showing strips N1, N2, and N3, being fed into the winding machine, with the strips N1, N2 N3 being wound on a mandrel. The text of US2005255981 is incorporated herein by reference, but it will be understood that any appropriate winding or spiral winding machine or wrapping or similar technology can be used.

In the process of spiral winding the multi-layered materials 2.10, 2.10", 2.10.1, 2.100 to 2.1600 which are described above as being combined with a non-metallic non-woven film strength layer (herein after "The NNFSL Multi-Layered Materials" and indicated in Figures by reference numeral 333), there can be different ways of bonding the materials to form the tubing. For instance, lines of glue can be combed across the full width of the material. Variations having cardboard or paper outer layers are suited for this form of bonding.

An alternative way is to use a heat bonding attachment in the spiral winding machine to enable heat bonding across the entire width of the material. Variations of the multi-layered material having polymeric outer layers are suitable for heat bonding. By avoiding for example, a water-based glue, and not having paper outer layers, the resulting product is water proof rather than merely water resistant, making the resulting tube suitable for a wider range of applications. For instance, waterproof formwork tube can be suitable for use as part of reinforcing piers that are submerged in water, or for forming piers under water. If part of the process, then a wound or spirally wound tube can be placed around an existing pier and grout or similar material can be pumped between the internal surface of the tube and the pier. In such cases a split along the outer circumference of the tube may be needed if it is desired to remove the tube once the grout is set. Heat bonding may also be applied where the multilayered material includes paper or cardboard outer layers. A further alternative is to employ a combination of gluing and heat bonding. In this case, linear bonding lines, alternating between gluing and heat bonding lines, are arranged.

While the adhesive or polymer adhesive or membrane selected will vary according to application and end use of the material, where the material will be used to produce a product which is not compostable and or biodegradable and or recyclable and or reusable, then an appropriate glue or adhesive for use with the above described The NNFSL Multi-Layered Materials 333, and in forming a spiral wound or wound tube, is a one part cross-linking PVA or polyvinyl acetate adhesive, such as that sold under the designation DORUS KL 442.e1, which is D3 water resistant and is manufactured by Henkel. Whereas to manufacture a material which can be used for a product that is compostable and or biodegradable and or recyclable and or reusable, then an appropriate glue would be one such as PVA or water based glue made from a natural base so that the resultant product will end up being compostable and or biodegradable and or recyclable and or reusable.

The above paragraphs describe using spiral winding preferably onto a stationary mandrel, to form the multi-layered material into tubes e.g. for concrete formwork, or a building or constructional element such as part of a pier or column, as it will remain in place. An alternative is to wrap the material around a turning mandrel for parallel wrapping.

Figure 75:
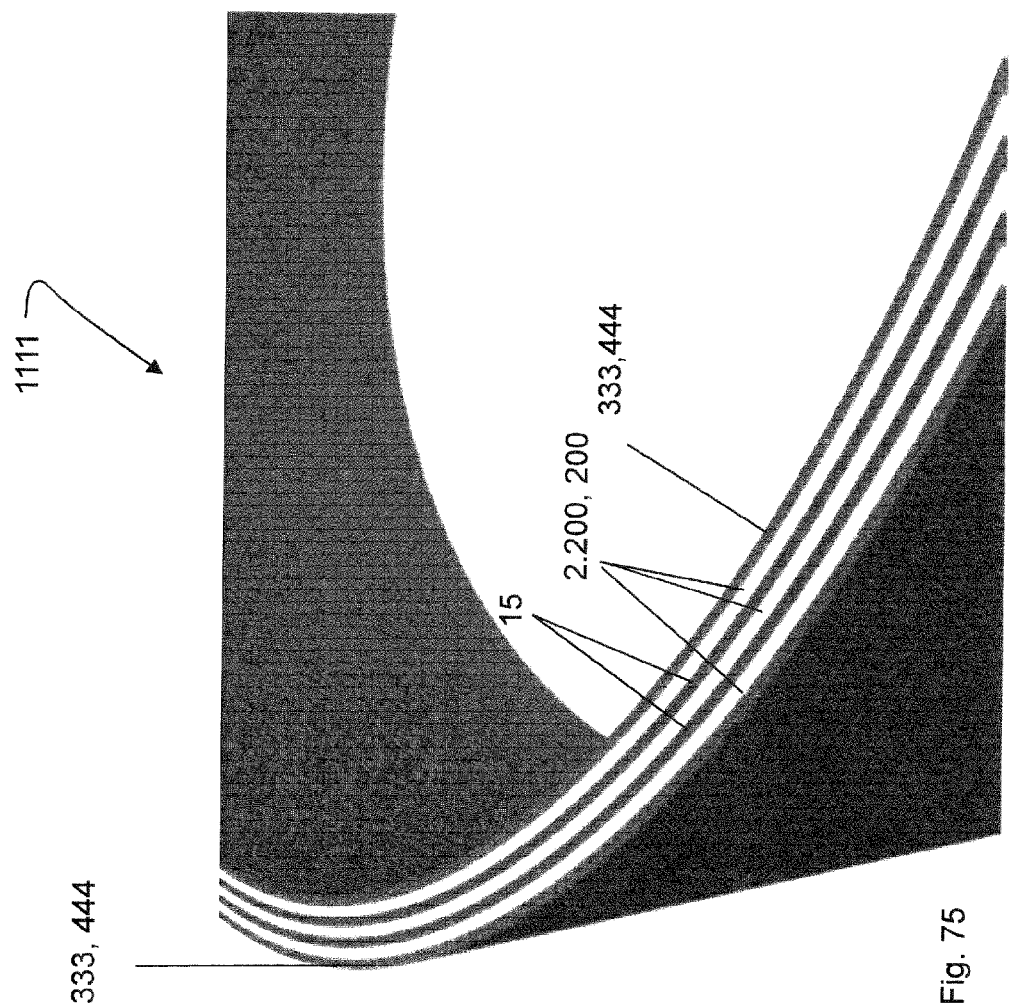
FIG. 75 illustrates a part of a spiral or other wound tube, showing the layers thereof.

Illustrated in FIG. 75 is a part section through a spiral wound or wound or wrapped concrete formwork tubing or construction element 1111, which is also shown in FIG. 78A as being spirally wound onto a mandrel 1 of FIG. 74. The resultant tubing 1111 has an inner and outer layer of the material 2.100 (or others of The NNFSL Multi-Layered Materials 333), which is adhered to an adjacent layer of material 2.200, which respectively have their upper and lower sides adhered to a layer of Kraft paper 2.15. The adhering process is effected by means of adhesive spray or combing stations 999 located between each layer coming together in the tubing 1111, as is illustrated in FIG. 76, so as to deliver onto the tubing 1111 an adhesive layer of approx. 40 microns (40 µm). Such spraying or combing can prevent excess glue being applied, or if glue is squeezed out during the winding process, it can be collected or otherwise disposed of, as is known in the art.

The illustration of FIGS. 78A to 78C show the number of layers that might be used in relatively small large concrete formwork tubing, say of the order of 1000 mm to 2400 mm diameters or for a long length of tubing say of the order of 7 metres to 14 metres in length, as hydrostatic pressure will increase with height and thus greater strength is needed.

It will be readily understood by those in the tube winding industry, that multiple layers of the The NNFSL Multi-Layered Materials 333 can be used and that depending upon the applications and hydrostatic pressures to be resisted that anything form say 2 to 25 film layers may be required, depending upon such factors as the MPa of the concrete to be poured, the setting time thereof, the diameter and the length of the tube 1111 to be used.

For tubular formwork of lesser diameter, say 200 mm to 950 mm, as can be seen in FIG. 78C, one of the adhesive coating layers 2.115 and one layer of material 2.200 (or other of The NNFSL Multi-Layered Materials 333), can be removed as the burst strength required for smaller diameters or shorter lengths, is much less than larger diameters, as the hydrostatic pressures applied by concrete poured into the mould is commensurately less. In Australian concrete pouring standards, when pouring of concrete columns is occurring, standards require that no more than 3 metres of concrete is poured, before the previous three metres has set.

As is illustrated in FIG. 74, and FIGS. 78A to 78C, a spiral wound formwork or building element tube 1111 has multiple layers, each having at least one or two layers comprised of a multi-layered sheet material such 2.10, 2.10.1, 2.100 to 2.1600 as described above, with each of the multi-layered sheet material 2.10, 2.10.1, 2.100 to 2.1600 including at least one film layer 2.20 being bonded to or adhered to at least one layer of paper, cardboard or polymer 2.15 as described above with the multiple layers also including at least one layer of paper, cardboard or polymer 2.15 between the at least two multi-layered sheet materials 2.10, 2.10.1, 2.100 to 2.1600 as illustrated in FIGS. 74 and 78A to 78C. Each multi-layered sheet material 2.10, 2.10.1, 2.100 to 2.1600, has at least one film layer 2.20 or its equivalent as illustrated in other FIGS. 24 to 44. An adhesive layer 2.115 can be used to bond the multiple layers together into the tube 1111, or heat bonding can be used to bond the multiple layers together into said tube 1111. If desired there can be four layers of the multi-layered sheet material 2.10, 2.10.1, 2.100 to 2.1600, and 2.200, and at a location intermediate an inner and outer layer is located at least one layer of paper, cardboard or polymer 2.15, each layer being bonded by an adhesive layer 2.115; or there can be three layers of said multi-layered sheet material 2.100, and 2.200, and at a location intermediate an inner and outer layer is located at least one layer of paper, cardboard or polymer 2.15, each layer being bonded by heat bonding.

The tube 1111 can include at least one layer which is a hydrophobic layer such or a waterproofing layer such as coating layer 2.25' described in relation to FIG. 25. The at least one layer of the hydrophobic layer or a waterproofing layer 2.25' can be located at one or more than one of the following locations: an innermost layer of said tube, an outermost layer of said tube; an intermediate layer of said tube.

The previous description of The NNFSL Multi-Layered Materials 333 are embodiments which include film layers 2.20 when the film material is in an unadulterated or unmodified state. The below is described film layer treatments that can be applied to the film layers 2.20, before or after they are bonded to the paper or cardboard or polymer layer 15. It will be understood that the description below in relation to FIGS. 79 to 104, directed to layer treatments that treatments to the film layers 2.20 or The NNFSL Multi-Layered Materials 333, can be applied to upper and or lower surfaces of the film layer 2.20 or The NNFSL Multi-Layered Materials 333 in the case of the scoring, scribing, embossing or debossing described below, or through the film layer 2.20 or The NNFSL Multi-Layered Materials 333 in the case of the perforation and shaped apertures. Additionally, one layer treatment can be combined with one or more of the other layer treatments, depending upon the application and end use of the material, and the strength required.

In the above description when a paper or cardboard layer is required, this layer 15 can be made of the paper or cardboard as manufactured in accordance with that described above in relation to FIGS. 1 to 23.

An advantage of film layer 2.20 in a wrapped, wound or spirally wound tube formwork or construction element, is that it leads to a reduction of cost of manufacturing, with the same or better strength characteristic by comparison with a similar number of layers of prior art tubular form work tube having woven polymer mesh or those constructed from filaments as respectively described in WO2005011972 or WO2014075131. Such reduction in cost also comes from less overall input of manufacturing labour as the cross woven threads of a woven polymer mesh are not present as in WO2005011972, and filament layers are not present as in WO2014075131.

Detailed Description of the Embodiment or Embodiments of Invention 3

The embodiments provide a multi-layered material 100, 200, 300, 400, 500, 500' as illustrated in FIGS. 45 to 56, each of which includes at least one base layer 15 of paper, cardboard or solid polymer of a natural or plant material and at least one applied layer 3.23 being applied as a flowing, liquid or melted natural polymer (hereinafter "the liquid polymer") with said liquid polymer bonding to said base layer 15 and setting or solidifying thereto. Optionally, before or after the liquid polymer applied layer 3.23 is applied to the at least one base layer 15, natural fibre reinforcing can be combined with the liquid polymer or the layer 3.23.

In the following description, if it is not specifically mentioned, then all materials, layers, adhesives, resins, coatings etc are of a natural products or material, and are compostable and or biodegradable and or recyclable and or reusable.

The material 100 of FIGS. 45 and 46 is considered to be a single ply material in that only a single paper cardboard or solid polymeric layer 15 is present.

A two ply material 200 is illustrated in FIGS. 47 and 48 and is produced by means of the material 100, to which a second paper, cardboard or solid polymeric layer 25 is added, in a subsequent bonding step. Otherwise the layers 15 and 25 are simultaneously bonded to the applied layer 3.23 in the manufacturing process.

If desired, as is illustrated in FIGS. 49 to 54, alternative layers to the second paper, cardboard or solid polymeric layer 25 can be added to form other variations. Thus in FIGS. 49 and 50, the material 300 has an the additional layer being a woven or mesh reinforcing layer 29 of a natural material, and can be applied or as described in WO2005011972, which is incorporated herein by reference, but such natural material being are compostable and or biodegradable and or reusable and or recyclable.

Figure 51:
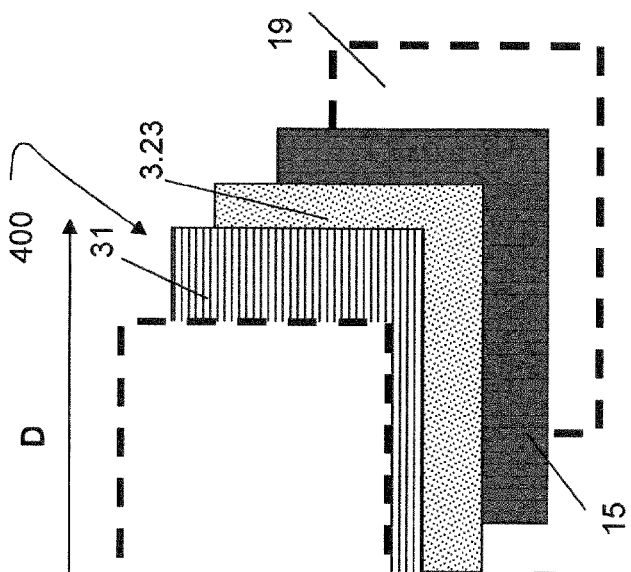
FIG. 51 is a schematic showing a multi-layered material according to a fourth material embodiment.
Figure 52:
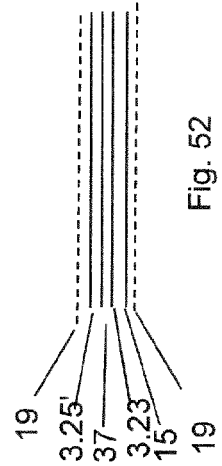
FIG. 52 is a schematic cross section through material 300 of FIG. 51 perpendicular to direction D, with base layer and applied layer and natural fibre filament layer extending into and across the page of the FIG. 52.

As illustrated in FIGS. 51 and 52, the material 400 has an additional layer being a filament reinforcing layer 31 comprised of filaments of a natural material, and can be applied or as described in WO2014075131, which is incorporated herein by reference, but such natural material being are compostable and or biodegradable and or reusable and or recyclable.

Also as illustrated in FIGS. 53 and 54, the material 500 has an additional layer being a film reinforcing layer 37 comprised of a film of a natural material, and can be applied or as described above, which, but such natural material being compostable and or biodegradable and or recyclable so that the end product has these characteristics which may be or may be not in addition to the product also being reusable.

Illustrated in FIGS. 55 and 56 is another material 500' which is symmetrically constructed by having its two outer surfaces being natural material film layers 37 which are each bonded or adhered to respective paper, cardboard or solid polymeric layers 15, by means of intervening polymer or adhesive layers 115. The film layers 37 can be of the order of 10 microns (0.01 mm) to of the order of 150 microns (0.15 mm). The respective paper, cardboard or solid polymeric layers 15, are bonded to each other by an applied layer 3.23 being applied as a flowing, liquid or melted natural polymer (hereinafter "the liquid polymer") combined with natural fibre reinforcing, with said liquid polymer bonding to the opposed layers 15 and setting or solidifying thereto. The polymeric coating or adhesive layer 115 which bonds the layers 15 and film layer 37 together are natural resins, such as natural polymer resins, water or natural solvent based adhesives. These may be heat activated, or heat activated various natural polymers. Otherwise a natural resin or adhesive can be used which creates a sealing bond to give the material a hydrophobic property. As an example, the coating layer 115 which is located between the base layer 15 and the film layer 37 can be of the order of 30 to 40 µm in thickness.

In each of FIGS. 45 to 56 the materials 100, 200, 300, 400, 500 and 500' are illustrated as having a coating layer 19 which is present in the with broken line outer frame, and a broken line in the schematic cross sectional views, and this is used to denote that a coating layer 19 can be applied to form an outer layer on the material 100, 200, 300, 400, 500 and 500'. Such coating layer 19 can be of any appropriate thickness but can be of the order of about 40 to 45 µm. The coating layer 19 is a natural polymer coating which is able to decompose and is biodegradable. The coating layer 19 can be a coloured coating. Also the coating layer 19 can be hydrophobic or hydrophilic, depending on the application and intended use of the multi-layered material 100, 200, 300, 400, 500 and 500'.

In the materials 100, 200, 300, 400, 500 and 500' as described above, the multi-layered materials have a layer 15 or a layer 25 of paper or cardboard or a solid polymer material. The applied layer 3.23 is applied, adhered or bonded directly to the adjacent solid polymeric or paper or cardboard layers 15 and or 25. Preferably the layers 15 and or 25 are made of paper, such as Kraft paper, preferably of at least 20 grams per square metre (GSM), however, it will be understood that any appropriate gauge of paper, cardboard or solid polymeric can be utilised according to the end requirements to which the material will be employed.

It will also be readily understood that an advantage of the materials 100, 200, 300, 400, 500 and 500' as described above, is that they are each are compostable and or biodegradable and or reusable and or recyclable, and this is achieved by the paper, cardboard or solid polymer being of a natural or plant material, as is the liquid polymer and the natural fibre reinforcing particles that are added as well, and the woven or mesh layers, and or filament layers and or film layers and any other polymers/adhesives/resins used in constructing the materials 100, 200, 300, 400, 500 and 500'.

Several embodiments are illustrated in FIGS. 45 to 56, and FIG. 67 to 70. The different embodiments can be used for constructing tubing or formwork or other related functions which each may require different tensile strengths, thicknesses, and weights. In the embodiments depicted in FIGS. 45 to 70, natural liquid polymer layers 3.23 when combined with natural fibre reinforcing, with the liquid polymer bonding to the base layer 15 and setting or solidifying thereto, are used as a strength layer, which is either used as is or added to as in the case of materials 200 to 500'.

Figure 49:
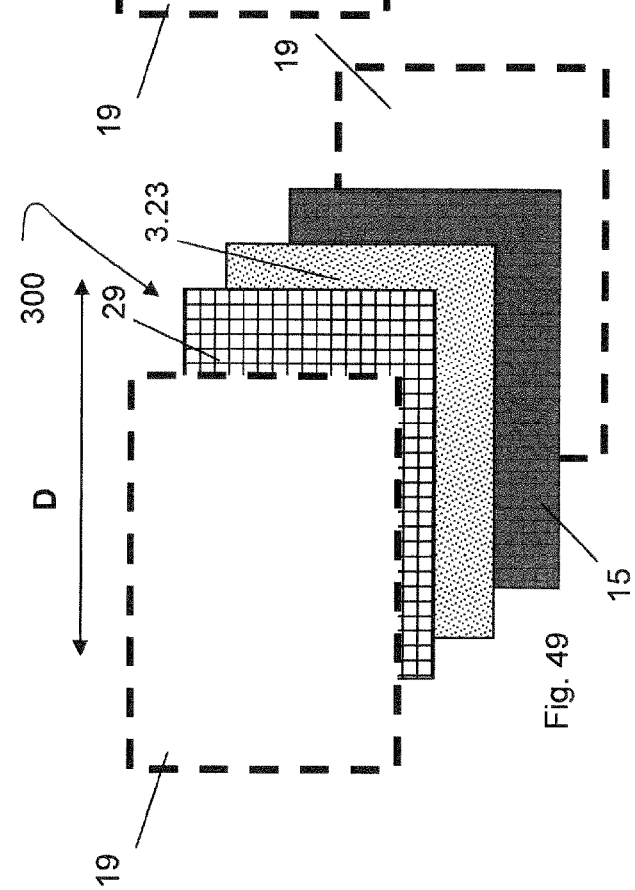
FIG. 49 is a schematic showing a multi-layered material according to a third material embodiment.
Figure 50:
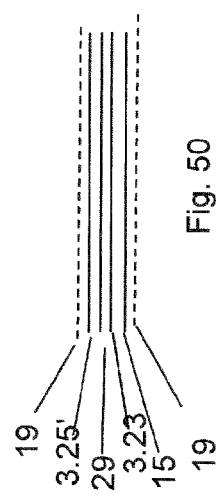
FIG. 50 is a schematic cross section through material 300 of FIG. 49 perpendicular to direction D, with base layer and applied layer and natural fibre mesh layer extending into and across the page of the FIG. 50.

As illustrated in FIG. 49, there is a layer 115 located between the cardboard layer 15 and the film layer 37, being a coating or adhesive layer 115 which bonds the layers 15 and film layer 37 together. The adhesive coating layer 115 can be made by various natural resins, such as natural polymer resins, water or natural solvent based adhesives which can be heat activated, or heat activated various natural polymers, or a natural resin or natural adhesive can be used which creates a sealing bond to give the tube a hydrophobic property. As an example, the coating layer 115 which is located between the cardboard layer 15 and the film layer 37 can be about 30 to 40 µm in thickness.

The film layer 37 of FIG. 49 is described above as being bonded to layer 25 which consists of paper or polymer or cardboard, however this can instead be a layer 3.25' of a coating, for example about 40 to 45 µm in thickness. The coating layer 3.25' can be natural or another polymer variant. The coating layer 3.25' can be a coloured coating. Also the coating layer 3.25' can be hydrophobic or hydrophilic, depending on the application and intended use of the multi-layered material.

As an example, a multi-layered material 100 or 200 as discussed above can have a nominal thickness of about 0.30 mm to 0.40 mm, and a mass of around 235 GSM. Initially, the multi-layered material 100 thus constructed can be formed into widths of approximately 2.4 metres, and formed into another roll, which can be cut or slit and rewound to desired lengths and widths. A preferred roll about 152 to 175 mm in width, and 1000 m or more in length, can be used with existing spiral winding machines, to form a spiral wound tubing of any appropriate internal diameter, for concrete formwork. Typical diameters range between 250 mm and 2000 mm. If a paper layer 15 or 25 of about 105 GSM is used, the resulting tubing having two layers of the sheet material 100 and two alternating layers of Kraft paper, is expected to have a burst strength in a radial direction of the tubing of about 700 KPa or higher.

The coating layer 19 or 3.25' can have a bonding function, or not, as the case may be depending upon the application or use of the material 100, 200, 300, 400, 500 and 500'. Where it has the same or a similar composition and function as the other coating layer 115, it enables further layers to be bonded to the multi-layered material 100, 200, 300, 400, 500 and 500'. Therefore, the multi-layered material 100, 200, 300, 400, 500 and 500' depicted in FIG. 45 to 56 can be considered a base upon which other embodiments can be constructed, or from which variants are made. Exemplary embodiments are shown in FIGS. 57 to 70. Of course, as mentioned above, the layers can be bonded in other ways, such as by roll bonding.

Thus the basic sheet material can be considered to be a paper, cardboard or solid polymeric layer 15 to which is bonded the applied layer 3.23 being formed from a flowing, liquid or melted natural polymer (hereinafter "the liquid polymer") combined with natural fibre reinforcing, with said liquid polymer bonding to the base layer 15 and setting or solidifying thereto, as in the case of material 100; a paper, cardboard or solid natural polymeric layers 15 and a similar layer 25, or woven or mesh natural reinforcing layer 29, or natural filament layer 31 or a natural film layer 37, which are bonded by an applied layer 3.23 being formed from a flowing, liquid or melted natural polymer (hereinafter "the liquid polymer") combined with natural fibre reinforcing, with said liquid polymer bonding to the base layer 15 and layer 25,29, 31 or 37 and setting or solidifying thereto, in the case of material 200, 300, 400, 500 or 500'.

If desired, it is understood that in respect of the materials 200, 300, 400, 500 or 500', a further:
a) paper, cardboard or solid natural polymeric layer 25, or
b) woven or mesh natural reinforcing layer 29, or
c) natural filament layer 31 or a natural film layer 37,
which are bonded by another applied layer 3.23 being formed from a flowing, liquid or melted natural polymer (hereinafter "the liquid polymer") combined with natural fibre reinforcing, with the liquid polymer bonding to the base layer 15 and layer 25, 29, 31 or 37 and setting or solidifying thereto.

In the following embodiments as illustrated in FIGS. 57 to 70, the materials 100 or 200 or 300 or 400 or 500 or 500' of FIGS. 45 to 56 are not shown in their separate layers, but as a single layer having a diamond pattern.

Figure 57:
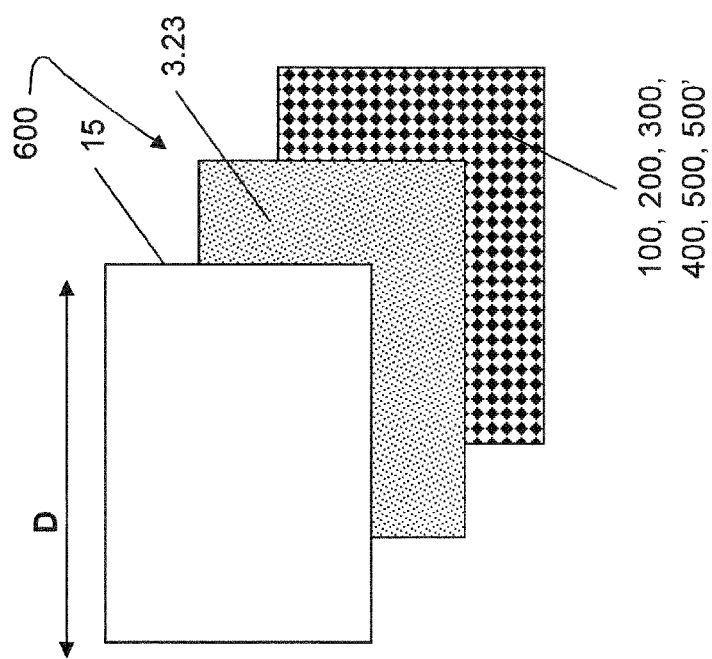
FIG. 57 is a schematic showing a multi-layered material according to a seventh material embodiment.
Figure 70:
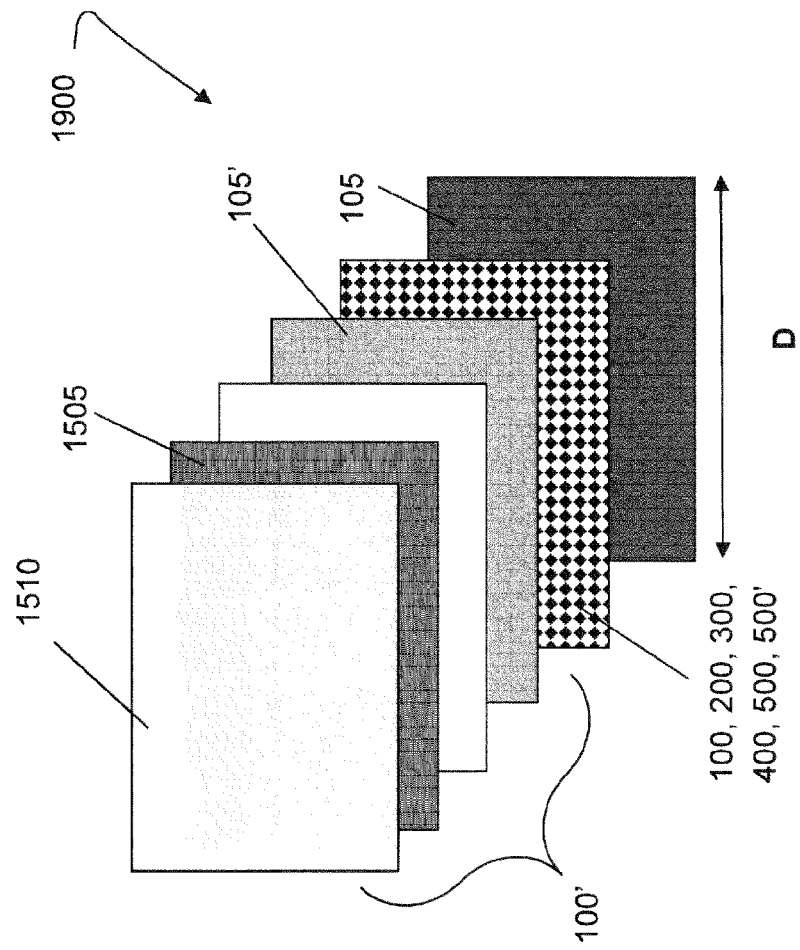
FIG. 70 is a schematic showing a multi-layered material according to a twentieth material embodiment.
Figure 69:
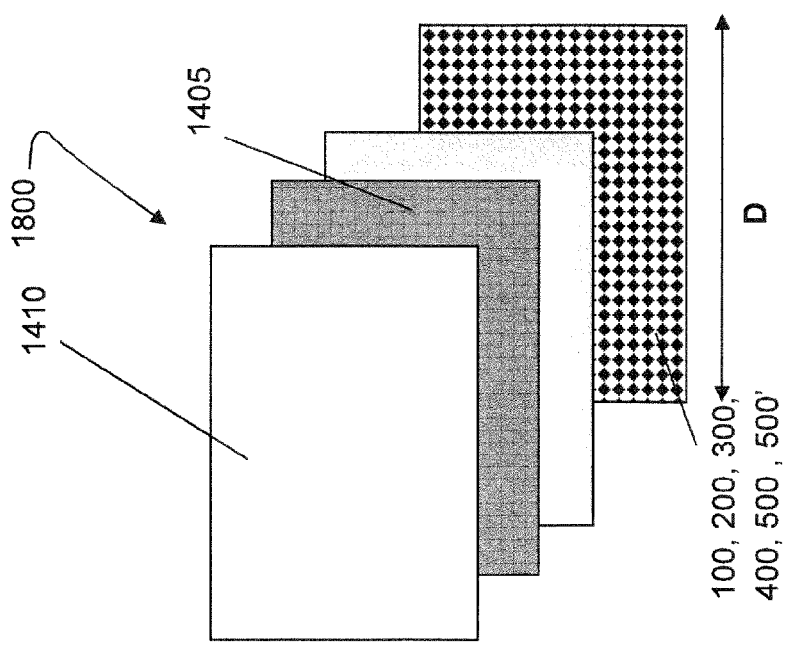
FIG. 69 is a schematic showing a multi-layered material according to a nineteenth material embodiment.

As shown in FIG. 57, the multi-layered material 600 includes a multi-layered material 100 or 200 or 300 or 400 or 500 or 500' of FIGS. 45 to 56 and further includes a paper or cardboard or solid natural polymer layer 15 that are bonded together by another applied layer 3.23. The provision of Kraft paper layers 15 on both sides of the overall material 600 increases the strength, thickness, rigidity of the material 600 compared to the multi-layered material 100 or 200 or 300 or 400 or 500 or 500' of FIGS. 45 to 56. Tensile and burst pressures of the material 600 are also increased when the material 600 is used as e.g. a construction formwork tube.

As an example, a multi-layered material 600 as depicted in FIG. 57, given Kraft paper of about 105 GSM being used, can have a nominal thickness of about 0.45 mm, and a mass of around 340 GSM. The multi-layered material 600 thus constructed can be formed into widths of approximately 2.4 metres, and formed into another roll, which can be cut or slit and rewound to desired lengths and widths. The resulting roll can be about 152 to 175 mm in width, and 1000 metres or more in length. The roll can then be spiral wound using existing spiral winding machines into tubing of any appropriate internal diameter, for concrete formwork. The resulting tubing is expected to have a burst strength of 1080 KPa or higher.

Figure 58:
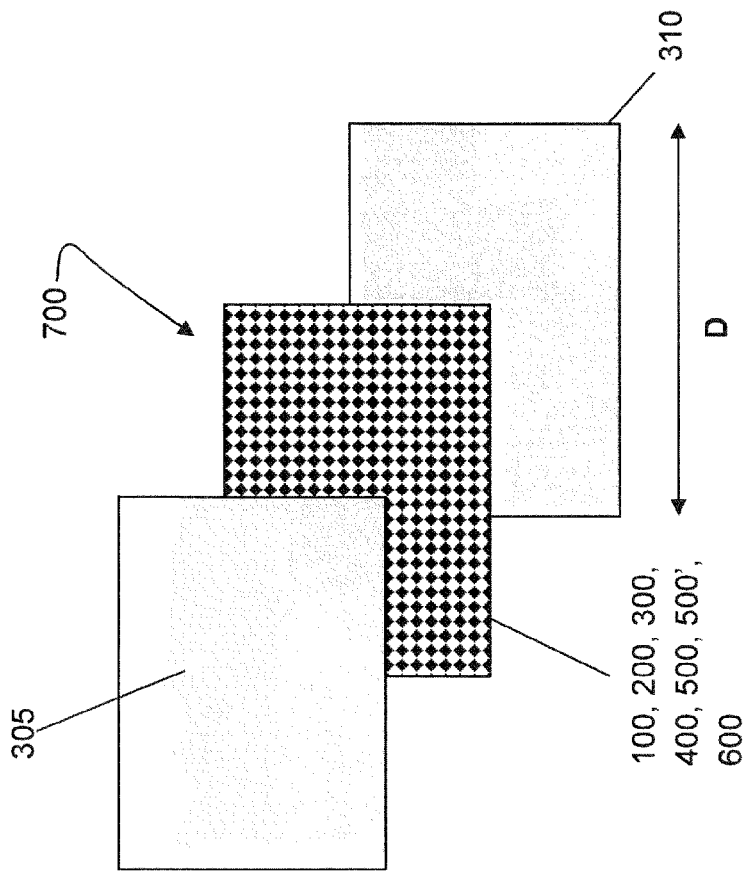
FIG. 58 is a schematic showing a multi-layered material according to an eighth material embodiment.

FIG. 58 depicts a further embodiment of a multi-layered material 700 being of a layered material 100, 200, 300, 400, 500, 500' or 600 of earlier embodiments which is further modified by adding layers of polymer blend coating layers 305, 310, one on either side of the multilayered material 100, 200, 300, 400, 500, 500' or 600—it will be noted that the diamond pattern representation in this embodiment includes previously identified material 600. The polymer blend coating layers 305, 310 are of natural materials and can be made water resistant (i.e. hydrophobic), so that the resulting multi-layered material 700 can act as a moisture barrier. The moisture barrier function of multi-layered material 700 can be useful in construction, or in other situations where specified levels of moisture pose a threat to the finished product. Notwithstanding, the polymer blend coating layers 305 and 310 are also compostable and or biodegradable and or reusable and or recyclable so that the final product is as well.

The multi-layered material 800 depicted in FIG. 59 is similar to the multi-layered material 700 depicted in FIG. 58. The difference between the two materials 800 and 700 is that the multi-layered material 800 shown in FIG. 59 adds one natural fibre reinforcing layer or polymer blend coating layer 405 on one side of the multi-layered material 600 shown in FIG. 57. Other multi-layered materials, or simply another applied layer 3.23, can then be bonded to the multi-layered material 800 where further strength and thickness in the overall material is required.

The multi-layered material 900 depicted in FIG. 60 is constructed by adding an applied layer 3.23 which bonds another paper or cardboard or solid natural polymer layer 3.510 to the paper or cardboard or solid natural polymer layer 15 of the basic multi-layered material 100, 200, 300, 400, 500, 500'. Another single layer or multi-layered material can be bonded to the paper or cardboard layer 3.510 to create the desired outcome. The multi-layered material 900 can be used in different applications, e.g. to form spiral wound tubes.

The cardboard, Kraft paper, or solid natural polymeric layers 25 or 3.510, or exposed applied layer 3.23 assist with later bonding of the multi-layered material into spiral wound tubes, by either natural adhesive or other bonding means which will be are compostable and or biodegradable.

The multi-layered material 1000 depicted in FIG. 61 is similar to the multi-layered material 900 depicted in FIG. 60. The difference is that the second paper or cardboard layer 605 is bonded to the paper or cardboard or natural solid polymer layer 15 of the basic multi-layered material 100, 200, 300, 400, 500 or 500' via another applied layer 3.23.

The multi-layered material 1100 depicted in FIG. 62 adds a natural are compostable and or biodegradable film or polymer blend coating 705 to the paper layer 15 of the multi-layered material 100, 200, 300, 400, 500 or 500'. Further layers or variants of the multi-layered material can be added if desired.

The multi-layered material 1200 depicted in FIG. 63 adds a further film layer 37 sandwiched between two natural compostable and or biodegradable coating layers 810, 815, to the paper layer 15 of the multi-layered material 100, 200, 300, 400, 500 or 500'. The coating layer 815 closest to the paper layer 15 needs to be able to bond to the paper layer 15.

The multi-layered material 1300 depicted in FIG. 64 combines the material 100, 200, 300, 400, 500 or 500' shown in FIGS. 45 to 56 to the material 1200 depicted in FIG. 63.

The multi-layered materials 1200, 1300 depicted in FIGS. 63 and 64 have two and three applied layers 3.23, respectively. This increases the tensile and burst pressures of the materials 1200, 1300. The materials 1200, 1300 may be suitable as moisture barrier or heavy duty construction liner.

The multi-layered material 1400 depicted in FIG. 65 combines two of the multi-layered materials 100, 200, 300, 400, 500 or 500', one on either side of three centre layers. The three centre layers include a natural and are compostable and or biodegradable coating layer 115, a film layer 37, and another paper or cardboard or solid natural polymer layer 15. This variant can further be bonded to another variant combination, as it has a Kraft paper as an outer layer. Doing so can substantially increase the overall tensile strength, burst pressure, and rigidity in the finished product.

The multi-layered material 1500 depicted in FIG. 66 can be considered as being based on the multi-layered material 900 shown in FIG. 60. A natural and or compostable or biodegradable film or polymer blend coating 1105 is added to the end paper layer 3.510 of the multi-layered material 900. On the other side of the multi-layered material 900, two paper layers 1110, 1115 which are bonded by a natural and compostable and or biodegradable coating layer 1120 capable of bonding the two paper layers 1110, 1115, are added. The outermost of the two paper layers 1110 is further coated with a natural and compostable and or biodegradable film or polymer blend coating 1125. This variant 1100 in effect adds two more layers of Kraft paper to the embodiment shown in FIG. 60. Due to the presence of multiple layers of paper, coating, and film, this material 1500 can be used in applications where more rigidity and higher strength is required. For example, it can be used as a moisture barrier for various commercial, construction, and industrial applications.

The multi-layered material 1600 depicted in FIG. 67 can be considered as being based on the material 600 depicted in FIG. 57. Here, two more paper layers 1205, 1210 are added to the basic material 600, one on each side. The paper layers 1205, 1210 are bonded to the basic material 600 via natural and compostable and or biodegradable waterproof adhesive films 1215, 1220, respectively. Both of the outer layers 1205, 1210 of this variant of the multi-layered material 1600 are paper. Therefore, if desired two other variants can be further added to this material 1600, one on each side, by the user.

The multi-layered material 1700 depicted in FIG. 68 is based on the material 100, 200, 300, 400, 500 or 500' depicted in FIGS. 45 to 56, but still has the basic combination of a paper or cardboard or natural solid polymer layer 15 and an applied layer 23. A natural and compostable and or biodegradable waterproof adhesive film 1315 is added as an outer layer to the material 100, 200, 300, 400, 500 or 500'. Whereas a natural and compostable and or biodegradable coating layer 3.25' is added as an outer layer on the other side of the adjacent the material 100, 200, 300, 400, 500 or 500'. The positions of the adhesive film 1315 and the coating layer 3.25' can be reversed. The adhesive film 1315 allows this variant 1700 to be easily added to another multi-layered material.

In all of the above embodiments, some or all of the paper layers can be replaced with solid polymeric layers.

Any two or more of the above embodiments, or variants of the above embodiments, can be bonded together to form further variations, on the proviso that a bonding system or adhesive used is of a compostable and or biodegradable type.

While the above description generally describes a single applied layer 3.23, it will be readily understood that multiple applied layers 3.23 can be utilised.

In respect of the above embodiments, a method of producing a material 100, 200, 300, 400 400, 500 or 500' and others as described above, is illustrated in FIGS. 71 to 73, whereby the method includes the step of combining at least one base layer of paper, cardboard or solid polymer of a natural or plant material to an applied layer, whereby the applied layer is a flowing, liquid or melted natural polymer (hereinafter "the liquid polymer") combined with natural fibre reinforcing material, with the liquid polymer bonding to the base layer and setting or solidifying thereto.

As illustrated in FIG. 71 the natural fibre reinforcing material 61 is added to the liquid polymer 67 prior to the liquid polymer 67 being applied to the base layer 15 by a combining or mixing process at a location remote from where the liquid polymer 67 is applied to the base layer 15. For example off site at another location or factory or supplier, or at a different location and then in a pre-mixed state added to a hopper 53 for application to a base layer. Thus the hopper 53 receives and holds a pre-mixed mixture of liquid polymer 67 and natural fibre reinforcing material 61, which is then sprayed or deposited on or otherwise applied to the continuously passing paper or cardboard or solid polymer of a natural or plant material.

Alternatively, the natural fibre reinforcing material 61 can be added to the liquid polymer 67 prior to the liquid polymer 67 being applied to the base layer 15 by a combining or mixing process at a location at or in the vicinity of where the liquid polymer 67 is applied to the base layer 15. By this it is meant that the mixing process can occur in the hopper 53, as in FIG. 71, or separate supply or hopper 53.1 of natural fibre reinforcing material 61 which is down stream of hopper 53 having and applying liquid polymer 67.

Figure 72:
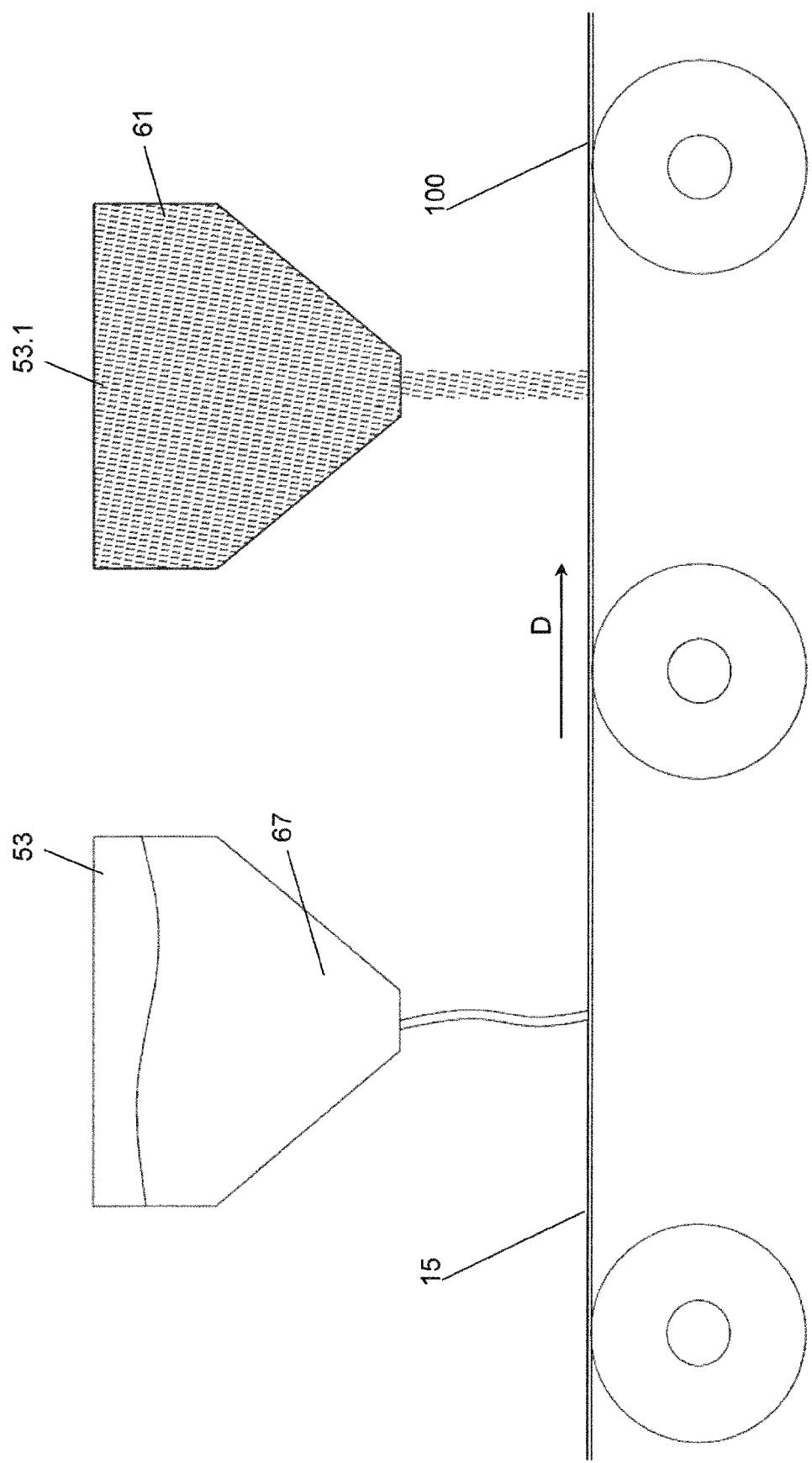
FIG. 72 is a schematic of a process step according to a second method embodiment.

The natural fibre reinforcing material 61 can alternatively be added to the liquid polymer 67 simultaneously with, or sequentially to, the liquid polymer 67 being applied to the base layer 15, such as illustrated in FIG. 72 where the natural fibre reinforcing material 61 is added sequentially, or after, the liquid polymer 67 is applied. Whereas if the hopper 53.1 and hopper 53 of FIG. 72, were oriented and positioned closer together, then the material 61 will be added almost simultaneously to the polymer 67.

As illustrated in FIG. 72, the natural fibre reinforcing material 61 can added by means of a hopper 53 or other dry delivery system to be deposited on the liquid polymer 67. If hopper 53.1 were upstream of the hopper 53, then the material 61 would be deposited first on the base layer 15, and then the polymer 67 is added.

Figure 73:
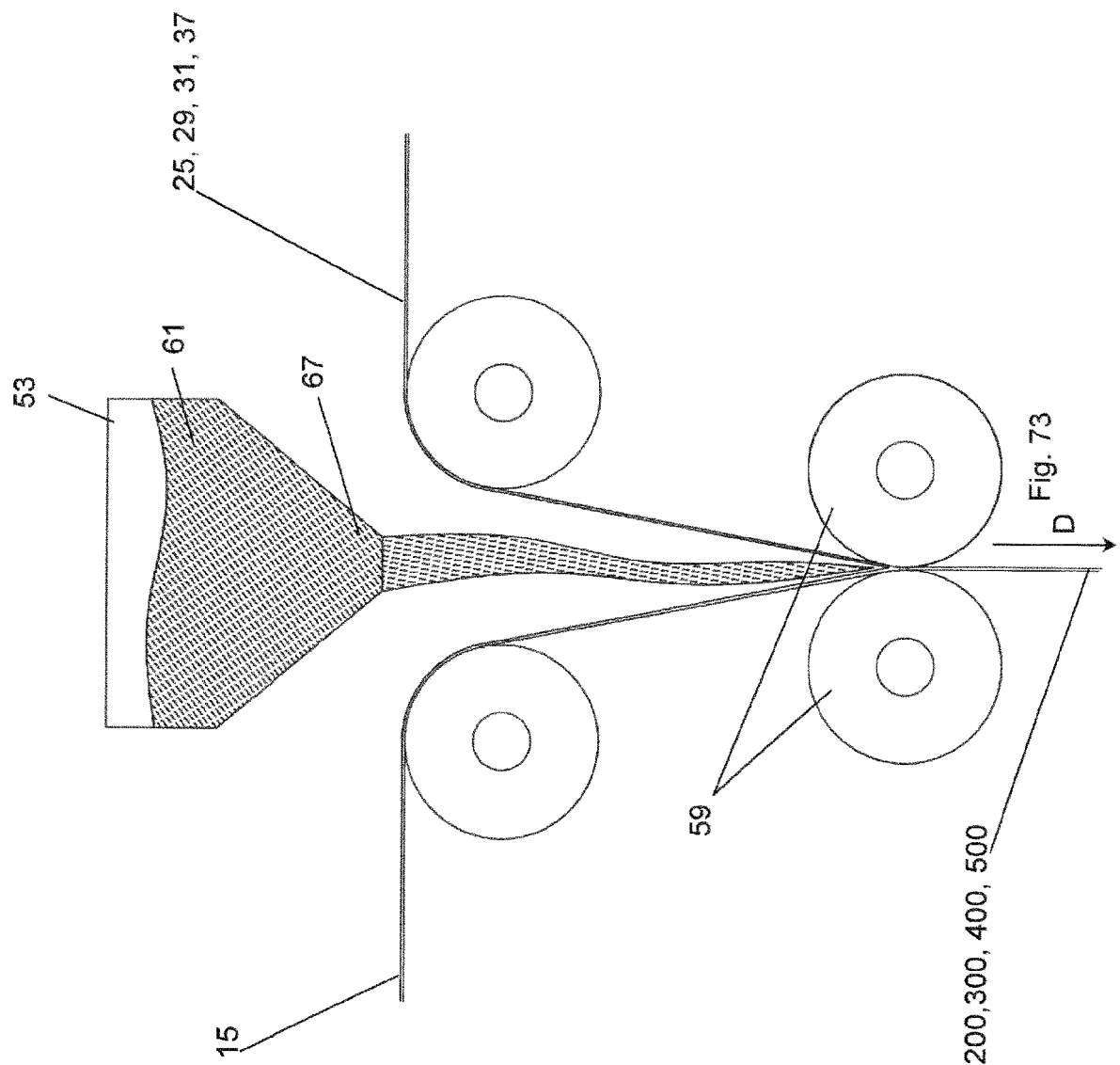
FIG. 73 is a schematic of a process step according to a third method embodiment.

Illustrated in FIG. 73 is a process step whereby a paper or cardboard or solid natural polymer layer 15 is simultaneously bonded to a layer 25, 29, 31 or 37 as described above, while the premixed liquid polymer 67 and natural fibre reinforcing material 61 combination or mixture is simultaneously added, and the combination of all three elements then passes through compressing rollers 59 natural fibre reinforcing material 61 o produce the material 200, 300, 400, 500, 500', depending on whether paper layer 25, woven or mesh layer 29, filament layer 31 or film layer 37 is used.

The natural reinforcing material 61 is comprised of natural fibres which are compostable and or biodegradable and or recyclable and or reusable, which are one of or a combination of two or more of: hemp, jute, bamboo, kabuya, kenaf, ramie, sisal, or other appropriate natural fibre.

In the systems and method as illustrated in FIGS. 71 and 73, where the natural fibres 61 are pre-mixed with the liquid polymer 67, then they are such that their orientation is not predetermined. Whereas, in the system and method of FIG. 72, the natural fibres 61, because they are being combined in a dry or moist state with the liquid polymer 67, they can have their orientation predetermined, whereby the exit the hopper 53.1 in specified dimension and are metered from the hopper 53.1 so that they exit the hopper 53.1 at a rate which applies to the liquid polymer 67 to achieve a desired end result.

The orientation of the natural fibre reinforcing 61 is selected according to the desired end result to be obtained from the material or the product into which the material is used. The orientation can be at an angle to the roll direction of the paper or cardboard or natural solid polymer layer 15 and this angle can range from parallel to the roll direction D to 90 degrees to the roll direction D.

The natural fibre reinforcing materials 61 utilised can be of a length which is not predetermined, that is, in the products, methods and systems of the previous FIGS. 45 to 73, they can be one or more than one of the following: random or of non-pre-set length; uniform length; all the same length where the fibres are first passed through a sizing process; a mixture of pre-set lengths; a range of pre-set lengths.

The range of lengths for the fibres 61 utilised will depend upon the application for, design of, strength characteristic or other material property characteristic requirements of the material being produced and the application to which that material will be put. The length of fibre is expected to be of the order to 2 to 25 mm and up to 50 mm in length, when the fibres 61 are pre-mixed with the liquid polymer, as is the case with the process or method of FIGS. 71 and 1873 or whether they are being added by means of a hopper 53.1, as in the case of FIG. 72. It may be that the operation and characteristics of the hopper 53.1 may dictate a fibre length to ensure the optimal operation of the hopper 53.1 and fibre metering systems used relative to the rate of movement of the layer 15, or other materials, passing under the hopper 53.1.

The fibres 61 if in a dry or moist state, and added separately to the liquid polymer 67 after application to the layer 15, could also be oriented in a random fashion as they exit the hopper 53.1.

The natural fibre reinforcing material 61 can be added between two layers with the two layers being different from each other, such as one being a layer of paper/cardboard/natural solid polymer and the other being in filament form; or one being a layer of paper/cardboard/natural solid polymer and the other being in natural material film form; or one being a layer of paper/cardboard/natural solid polymer and the other being in woven or mesh form; or one being a layer of paper/cardboard/natural solid polymer and the other being in a shredded filament form; or one being a layer in filament form and the other being in film form; or one being a layer in filament form and the other being in woven or mesh form; or one being a layer in filament form and the other being in a shredded filament form; or one being a layer in film form and the other being in woven or mesh form; or one being a layer in film form and the other being in a shredded filament form; or one being a layer in woven or mesh form and the other being in a shredded filament form; or a combination of the forms if more than two layers of natural fibre reinforcing material 61 are required.

The steps described herein with respect to FIGS. 45 to 73 can be repeated as required to construct a multilayered material, that can used for items such as liners, packaging, bags, wrapping paper, special wrapping paper, mining pipes, special mining pipes, tubes, tubes for formwork and or construction purposes and many others. The numbers of layers, their thickness and the combination of layers can be varied according to the end application and or end product that the multilayered material will be put to.

In the process of spiral winding the multi-layered materials 100, 200, 300, 400, 500, 500', 600, 700, 800, 900, 1000, 1100, 1200, 1300, 1400, 1500, 1600, 1700, 1800, 1900 which are described above as being combined with natural fibre reinforcing (Herein after "The NFR Multi-Layered Materials" and indicated in Figures by reference numeral 444), there can be different ways of bonding the materials to form the tubing. For instance, lines of glue can be combed across the full width of the material. Variations having cardboard or paper outer layers are suited for this form of bonding.

An alternative way is to use a heat bonding attachment in the spiral winding machine to enable heat bonding across the entire width of the material. Variations of the multi-layered material having polymeric outer layers are suitable for heat bonding. By avoiding for example, a water-based glue, and not having paper outer layers, the resulting product is water proof rather than merely water resistant, making the resulting tube suitable for a wider range of applications. For instance, waterproof formwork tube can be suitable for use as part of reinforcing piers that are submerged in water, or for forming piers under water. If part of the process, then a wound or spirally wound tube can be placed around an existing pier and grout or similar material can be pumped between the internal surface of the tube and the pier. In such cases a split along the outer circumference of the tube may be needed if it is desired to remove the tube once the grout is set. Heat bonding may also be applied where the multi-layered material includes paper or cardboard outer layers. A further alternative is to employ a combination of gluing and heat bonding. In this case, linear bonding lines, alternating between gluing and heat bonding lines, are arranged.

While the adhesives, or liquid polymers or membranes selected will vary according to application and end use of the material, an appropriate glue or adhesive for use with the above described embodiments, and in forming a spiral wound or wound tube, is a PVA or polyvinyl acetate adhesive, which can exhibit the properties of being compostable and or biodegradable and or recyclable, so that the end product or application will be compostable and or biodegradable and or recyclable and or reusable. An advantage of PVA for example, is that it can also form a water resistant or hydrophobic layer when it sets.

The above paragraphs describe using spiral winding preferably onto a stationary mandrel, to form the multi-layered material into tubes e.g. for concrete formwork, or a building or constructional element such as part of a pier or column, as it will remain in place. An alternative is to wrap the material around a turning mandrel for parallel wrapping.

Illustrated in FIG. 75 is a part section through a spiral wound or wound or wrapped concrete formwork tubing or construction element 1111, which is also shown in FIG. 76 as being spirally wound onto a mandrel 1 of FIG. 74. The resultant tubing 1111 has an inner and outer layer of the material 100 (as an example, but could be any one of The NFR Multi-Layered Materials 444), which is adhered to an adjacent layer of material 200 (as an example, but could be any one of The NFR Multi-Layered Materials 444), which respectively have their upper and lower sides adhered to a layer of Kraft paper 15. The adhering process is achieved by means of adhesive spray or combing stations 999 located between each layer coming together in the tubing 1111, as is illustrated in FIG. 76, so as to deliver onto the tubing 1111 an adhesive layer of approx. 40 microns (40 μm). Such spraying or combing can prevent excess glue being applied, or if glue is squeezed out during the winding process, it can be collected or otherwise disposed of, as is known in the art.

The illustration of FIGS. 75 and 77 show the number of layers that might be used in relatively small large concrete formwork tubing, say of the order of 1000 mm to 2400 mm diameters or for a long length of tubing say of the order of 7 metres to 14 metres in length, as hydrostatic pressure will increase with height and thus greater strength is needed.

It will be readily understood by those in the tube winding industry, that multiple layers of the film layered sheet materials or NFR The Multi-Layered Materials 444 can be used and that depending upon the applications and hydrostatic pressures to be resisted that anything form say 2 to 25 film layers or The NFR Multi-Layered Materials 444 may be required, depending upon such factors as the MPa of the concrete to be poured, the setting time thereof, the diameter and the length of the tube 1111 to be used.

For tubular formwork of lesser diameter, say 200 mm to 950 mm, as can be seen in FIG. 78, one of the applied layers 3.23 and one layer of material 200, can be removed as the burst strength required for smaller diameters or shorter lengths, is much less than larger diameters, as the hydrostatic pressures applied by concrete poured into the mould is commensurately less. In Australian concrete pouring standards, when pouring of concrete columns is occurring, standards require that no more than 3 metres of concrete is poured, before the previous three metres has set.

As is illustrated in FIG. 75, and FIGS. 76 to 78, a spiral wound formwork or building element tube 1111 has multiple layers, each having at least one or two layers comprised of a multi-layered sheet material such as The NFR Multi-Layered Materials 444 as described above, with each of The NFR Multi-Layered Materials 444 including at least applied layer 3.23 being bonded to or adhered to at least one layer of paper, cardboard or polymer 15 as described above with the multiple layers also including at least one layer of paper, cardboard or polymer 15 between the at least two of The NFR Multi-Layered Materials 444 as illustrated in FIGS. 75, 77 and 78. Each of the The NFR Multi-Layered Materials 444 has at least applied layer 3.23 or its equivalent as illustrated in other FIGS. 45 to 70. An adhesive layer 3.23, 115, 1215, 1220 can be used to bond the multiple layers together into the tube 1111, or heat bonding can be used to bond the multiple layers together into said tube 1111. If desired there can be four layers of the The NFR Multi-Layered Materials 444, and at a location intermediate an inner and outer layer is located at least one layer of paper, cardboard or polymer 15, each layer being bonded by an adhesive layer 3.23, 115, 1215, 1220; or there can be three layers of The NFR Multi-Layered Materials 444, and at a location intermediate an inner and outer layer is located at least one layer of paper, cardboard or polymer 15, each layer being bonded by heat bonding.

The tube 1111 can include at least one layer which is a hydrophobic layer such as a waterproofing or water-resistant layer such as coating layer 3.25' described in relation to FIG. 25. The at least one layer of the hydrophobic layer or a waterproofing or water-resistant layer 3.25' can be located at one or more than one of the following locations: an innermost layer of the tube, an outermost layer of the tube; an intermediate layer of the tube.

The previous description of embodiments is referring to The NFR Multi-Layered Materials 444 when the material or layers are in an unadulterated or unmodified state. It will be understood that the description below in relation to FIGS. 79 to 104, are directed to layer treatments that can be applied to upper and or lower surfaces of the The NFR Multi-Layered Materials 444 in the case of the scoring, scribing, embossing or debossing described below, or through the The NFR Multi-Layered Materials 444 in the case of the perforation and shaped apertures. Additionally, one layer treatment can be combined with one or more other layer treatments, depending upon the application and end use of the material, and the strength required.

While the following layer treatment descriptions are discussed in relation to the multilayered materials of the previously described Figures, it will be understood that the film layer treatments can be applied to a layer or layers of other multilayered materials.

Layer and Layer Treatment 1—Perforations and Shaped Apertures

As illustrated in FIGS. 79 to 83, the film layer 2.20, The NNFSL Multi-Layered Materials 333, layer 15, film layer 37 or The NFR Multi-Layered Materials 444 (herein after "The Layer or Material" and in FIGS. 79 to 104 such layers are identified by numeral 555) can include one or more perforations or shaped apertures 20.1, 20.11, 20.2 or 20.3 therein.

The perforations or shaped apertures 20.1, 20.11, 20.2 or 20.3 can be of a shape which is one or has one, or a combination of two or more of the following features: circular as in the case of aperture 20.2, elliptical (not illustrated), regular polygonal as in case of 20.1, 20.11 and 20.3, regular pentagonal (not illustrated), regular hexagonal as in the case of 20.3, irregular polygonal (not illustrated), irregular pentagonal (not illustrated), irregular hexagonal (not illustrated); rectangular as in 20.1 and 20.11; elongated as in 20.1 and 20.11; aligned to be parallel with the roll direction D of The Layer or Material 555 as in 20.1; aligned to be at an angle to the roll direction D of The Layer or Material 555 as in 20.11.

It will be noted that in FIG. 79 the rectangular apertures 20.1 are arranged in a regular array of rows and columns where the longitudinal axis of the apertures 20.1 is aligned parallel to the roll direction D of the layer 555. Whereas in FIG. 80 the a rectangular apertures 20.1 are also in rows and columns like in FIG. 79 except that the apertures 20.1 are spaced further apart in their respective rows and columns, and it will be noted that every second row is offset from the preceding row while every second column is offset from the preceding column. The rectangular apertures 20.1 are aligned so that their longitudinal axis is generally parallel to the roll direction D. It will be noted in the embodiment of FIG. 81, the rectangular apertures 20.11 are oriented so that their longitudinal axis is generally at 90 degrees to the roll direction D. It will be noted that the apertures 20.11 like those of FIG. 80 are spaced further apart in their respective rows and columns, and it will be noted that every second row is offset from the preceding row while every second column is offset from the preceding column.

Whereas in FIG. 82, the apertures 20.2 are circular is section or shape, and are positioned in an array of rows and columns. In FIG. 83 the apertures 20.3 are of a regular hexagonal shape.

It will be understood that the shape of the apertures such as 20.1, 20.11, 20.2 or 20.3, or their arrangement on The Layer or Material 555, can be any appropriate shape or any appropriate arrangement, including if needed random arrangements. The shapes can be combined whereby a single layer 555 may have a number of different shaped apertures through it.

The perforations or shaped apertures 20.1, 20.11, 20.2 or 20.3 can be formed in The Layer or Material 555 before being bonded to other layers such as paper cardboard or polymer. Then, when bonded or adhered together by means of a layer 3.23 or a PVA adhesive or other polymer-based adhesive, the adhesive will enter and interact with the apertures and the paper/cardboard/polymer layer to which it will be bonded. The side edges of the apertures also bond and "pockets" of air can be trapped which helps the polymer or PVA adhesive to set.

The perforations or shaped apertures 20.1, 20.11, 20.2 or 20.3 instead can be formed in The Layer or Material 555 after The Layer or Material 555 is bonded to other layers, such as paper cardboard or polymer, so that all have the perforations or shaped apertures 20.1, 20.11, 20.2 or 20.3.

The perforations or shaped apertures 20.11, 20.2 or 20.3 can be formed in The Layer or Material 555 by any known means, such as by stamping/pressing in a direction perpendicular to the plane of The Layer or Material 555; or continuously by means of a roller with cutters positioned around its circumference and along its length, or laser or other cutting mechanisms.

The Layer or Material Treatment 2—Scoring or Scribing

As illustrated in FIGS. 84 to 94 and 97 to 102 are mechanisms and examples of scoring and or scribing in order to impress or compress channels in The Layer or Material 555.

The Layer or Material 555 can include one or more lines 33.0, 33.1, 33.2, 33.3 of scoring or scribing which are impressed or compressed therein.

The lines of scoring or scribing 33.0, 33.1, 33.2, 33.3 can have or can be one or more than one of the following features: on one side of The Layer or Material 555 as illustrated in The Layer or Material 555 of FIGS. 79 to 104; on two opposed sides of The Layer or Material 555 as illustrated in FIGS. 101 and 102; equally spaced across the width of The Layer or Material 555 as illustrated in FIGS. 97 to 102; formed to different depths in The Layer or Material 555 across the width thereof as illustrated in FIGS. 97 to 99; adjacent lines of scoring or scribing are all of the same cross sectional shape across the width of The Layer or Material 555 as in FIGS. 97 to 102; adjacent lines of scoring or scribing are of different cross sectional shapes across the width of The Layer or Material 555 (not illustrated); have a cross section which is partially curved as in FIG. 99; have a cross section which is an open channel having three sides as in FIGS. 98, 101 and 102; have a cross section which is an open channel as in FIGS. 97 to 102; have a cross section which is an open channel having two sides as in FIGS. 97 and 99.

The lines 33.0, 33.1, 33.2, 33.3 of scoring or scribing can be formed in The Layer or Material 555 being already bonded to other layers 15, 37 or 2.20 or such as paper, cardboard or polymer. Then when the two are bonded together the "channels" or lines of scoring will help improve the strength of The Layer or Material 555, and will also assist the PVA or polymer adhesive to set better and faster than if the lines were not present.

Alternatively, or in addition to the lines 33.0, 33.1, 33.2, 33.3 being formed, the lines 33.0, 33.1, 33.2, 33.3 of scoring or scribing can be formed in The Layer or Material 555 after The Layer or Material 555 is bonded to other layers, such as paper cardboard or polymer, whereby both The Layer or Material 555 and other layers have the lines 33.0, 33.1, 33.2, 33.3 formed in them.

Illustrated in FIGS. 84 to 94 are the mechanisms and arrangements used to form the lines 33.0, 33.1, 33.2, 33.3 of scoring or scribing in The Layer or Material 555 described previously.

FIG. 84 illustrates a profile or cross section through a rotary knife 26 which has a three-sided tip to form a truncated v channel or line 33.1 of scoring as illustrated in FIGS. 98, 101 and 102.

Figure 88:
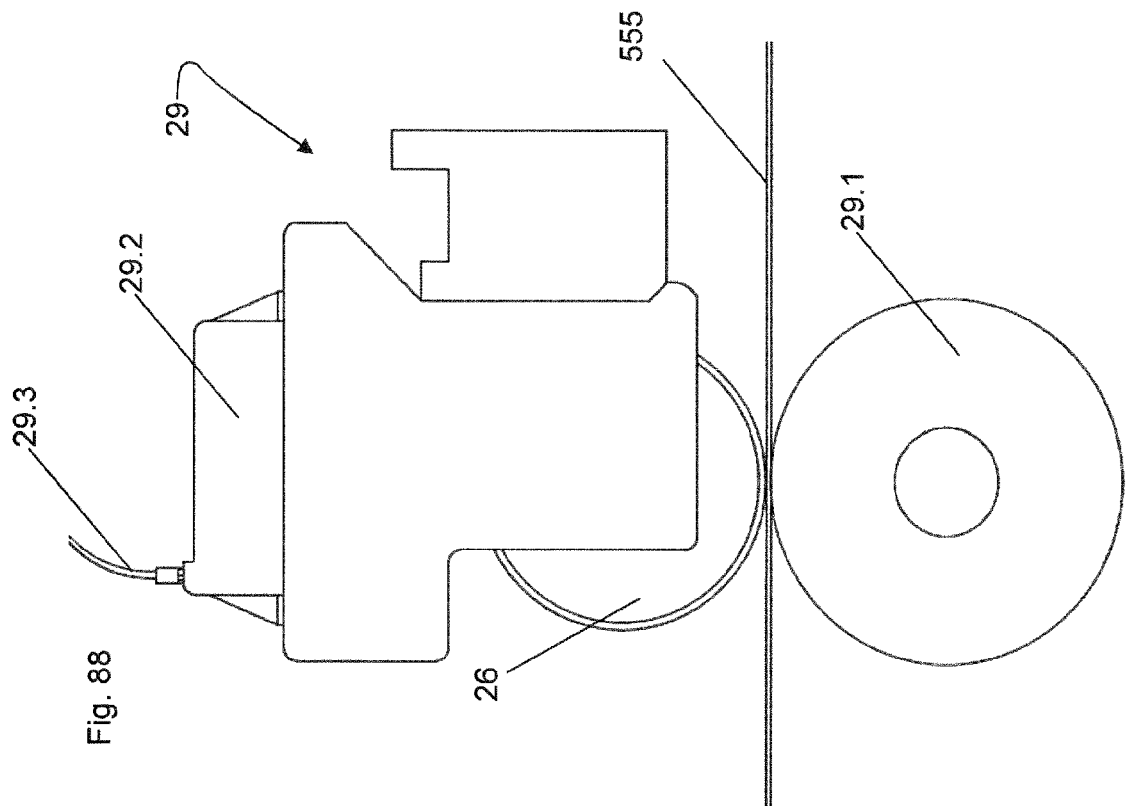
FIG. 88 illustrates a side view of the arrangement of the components of FIG. 29.
Figure 87:
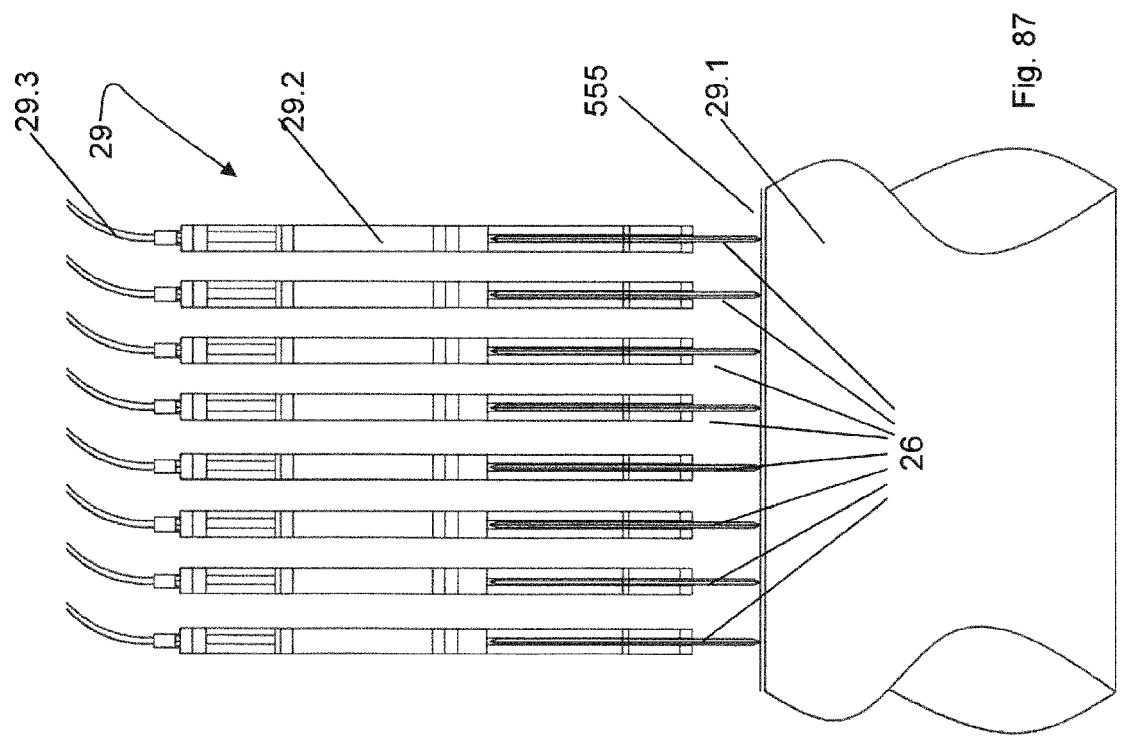
FIG. 87 illustrates a schematic front view of an assembly of rotating knives or blade for scoring or scribing the upper surface of the film layer.

To form such lines 33.1 in the upper surface of The Layer or Material 555 an arrangement such as that illustrated in FIGS. 87 and 88 can be used. In FIG. 87 there are arranged a series of adjacently assembled rotary knives 26 which have their rotation axis or axes, individually or as a group, mounted for movement by one or more hydraulic or pneumatic cylinders 29.2 which are respectively powered by hydraulic or pneumatic lines 29.3. The cylinders or actuators 29.2 are able to apply pressure to The Layer or Material 555 by sandwiching The Layer or Material 555 between the knives 26 and a rotating or stationary cylindrical anvil 29.1. If each knife 26 is connected to its own cylinder or actuator 20.2, then different pressures can be applied to adjacent knives, whereby different depth of lines or channels or scoring or scribing can be produced in the one layer, if desired. Due to the pressures involved, only one of the anvils 29.1 or the blades 26 need be driven in rotation, but if desired they can be both contra rotating at the same speed so as to not tear The Layer or Material 555.

Illustrated in FIGS. 89 and 90 are components and arrangements similar to that of FIGS. 87 and 88 in an inverted condition so that an under surface of The Layer or Material 555 can have lines of scoring or scribing applied. The respective scoring stations 29 and 29' for upper and lower surfaces of The Layer or Material 555 can be sequentially located in a roll processing system.

In FIG. 91 a scoring station 29 to do the upper surface of The Layer or Material 555 prior to The Layer or Material 555 being joined or bonded to a lower paper/cardboard/polymer layer 15. Whereas in FIG. 92 the scoring station 29 is located downstream of the location where The Layer or Material 555 and lower paper/cardboard/polymer layer 15 are bonded or joined, whereby the scoring will be applied to both layers.

Figure 93:
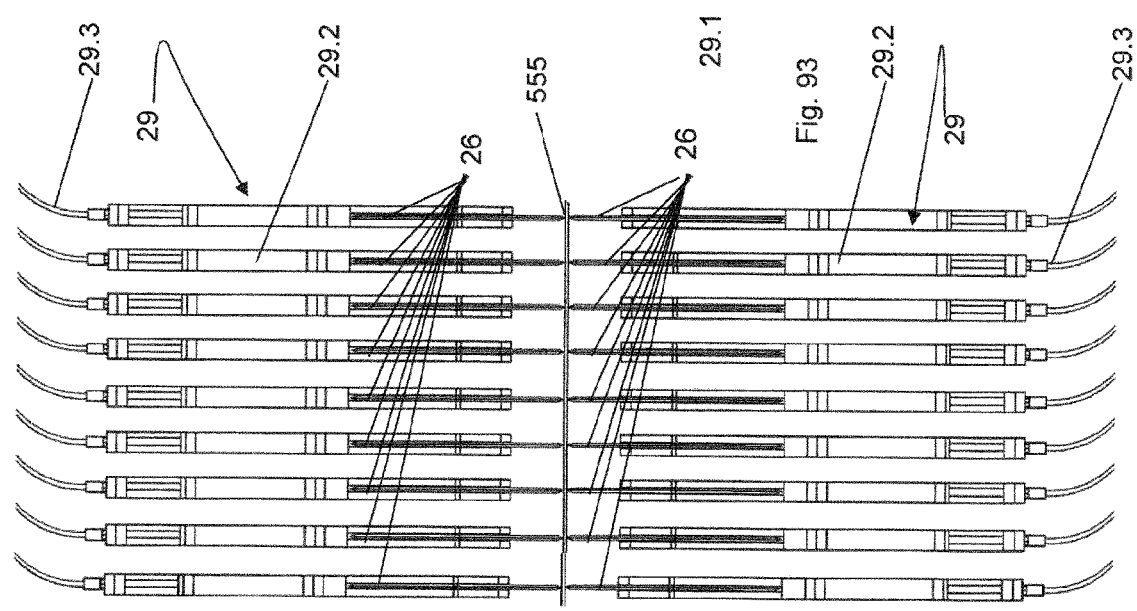
FIG. 93 illustrates a schematic front view of an arrangement of knives to score or scribe the upper and lower surfaces of a film layer.

The arrangement of knives 26 as illustrated in FIG. 93, where upper and lower knives 26 simultaneously engage each other will produce a set of scoring or scribing lines 33.1 as illustrated in FIG. 100. While a v-shaped knife end is illustrated in FIG. 93 a blunt knife profile such as that illustrated in FIG. 84 or 85 will be better suited.

Figure 94:
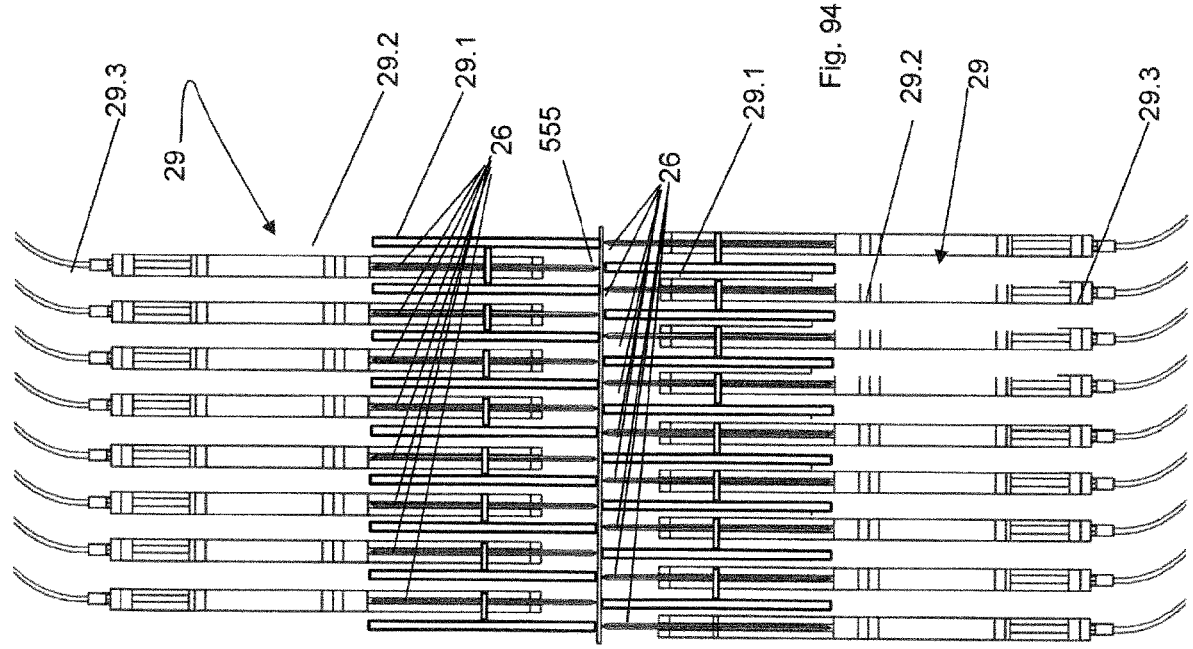
FIG. 94 illustrates a schematic front view of an alternative arrangement of knives to score or scribe the upper and lower surfaces of a film layer.

Whereas the offset nature and positioning of the knives 26 in FIG. 94, which engage opposed relatively thin rotating anvils 29.1, will produce a set of scoring or scribing lines 33.1 as illustrated in FIG. 102.

It will be understood that by substituting rotary knives 26 with knives 27 will produce rounded scoring or scribing lines 33.2 as illustrated in FIG. 99. Additionally, the use of knife 28 will produce the respective pairs of scoring or scribing lines 33.3 of FIG. 100.

The Layer or Material Treatment 3—Embossed or Debossed Shapes

The embodiment illustrated in FIGS. 79 to 83 and FIGS. 95 and 96 can generally be described as the forming of embossed or debossed shapes 20.13 in The Layer or Material 555. The shapes illustrated in FIGS. 79 to 83 represent the schematic plan views of some of the examples of the embossed or debossed shapes 20.13 that can be formed in The Layer or Material 555. Additionally, and in a similar manner to the apertures in The Layer or Material 555, the shapes 20.13 selected for embossing or debossing into The Layer or Material 555 can be decided upon by the end use or application to which the material will be put, and the desired amount of strength in the finished product.

The shapes 20.13 that can be embossed or debossed can be one or has one, or a combination of two or more, of the following features: circular as illustrated in FIG. 82, elliptical (not illustrated), regular polygonal as illustrated in FIGS. 79 to 81 and 83, regular pentagonal (not illustrated), regular hexagonal as illustrated in FIG. 83, irregular polygonal (not illustrated), irregular pentagonal (not illustrated), irregular hexagonal (not illustrated); rectangular as illustrated in FIGS. 79 to 81; elongated as illustrated in FIGS. 79 to 81; aligned to be parallel with the roll direction of the layer as illustrated in FIGS. 79 and 80; aligned to be at an angle to the roll direction of the layer as illustrated in FIG. 83.

The embossed or debossed shapes 20.13 can be formed in The Layer or Material 555 prior to the layer 3.23, or other layers being bonded.

The embossed or debossed shapes 20.13 can be formed in The Layer or Material 555 after it is bonded to other layers, such as paper, cardboard or polymer, so that they all have the embossed or debossed shapes 20.13.

The side view of The Layer or Material 555 of FIGS. 80 and 81 when viewed in side view will look like the view shown in FIG. 95, whereas the side view of The Layer or Material 555 of FIG. 81 will look like the view shown in FIG. 96.

The embossed or debossed shapes 20.13 can be formed by any known mechanism including by stamping/pressing in a direction perpendicular to the plane of The Layer or Material 555; or continuously by means of a roller with set of male and or female dies positioned around its circumference and along its length, and a corresponding roller with female and or male moulds or a mould surface to thereby continuously form the embossed or debossed shapes 20.13. Alternatively, the embossing or debossing can be done by heating and corresponding moulds.

The Layer or Material Treatment 4—Formation of Intermittent Slits

A fourth layer or material treatment is to provide a series of slits or cuts in The Layer or Material 555. This will be done by a knife of similar construction as the one which produced the lines 33.0 in FIG. 97 or 33.3 in FIG. 100, where sufficient pressure is applied between the knife and the anvil such that slits will be formed. By programming the cylinders or actuators to remove pressure and apply pressure intermittently then an array of short slits can be produced.

It will be understood that the layer or material treatments 1 to 4 as described above can be readily performed individually to The Layer or Material 555, or can be combined so as to achieve a specific result required by the end use of the material or product.

In manufacturing spiral or other wound type tubing of various heights or lengths, and of various diameters, the numbers of layers of The Layer or Material 555, can be readily established by trial and error and calculation. The numbers of layers of the layers or material and the finished thickness of the tubular formwork or construction element will also be dependent upon the MPa value of the concrete and it's settling time. All these factors affect the hydrostatic burst pressure resistance that must be provided by the tube, as will be readily understood in the formwork and winding arts.

While the above description focuses on spiral winding, that is a helical winding, it will be readily understood that the tubular formwork or construction element can be made by straight or cylindrical winding, or other winding or wrapping techniques.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A method of making a paper material or product, said method including the step of adding natural reinforcing material in the form of dry natural fibres to a layer of pulp after it exits from a layer formation process or apparatus wherein the orientation of the fibres is not predetermined.

2. A method as claimed in claim 1, wherein the natural fibres are of a length which is not predetermined.

3. A method as claimed in claim 1, wherein the natural fibres are of a length which is predetermined.

4. A method as claimed in claim 3, wherein said length is selected according to a strength characteristic or other material property characteristic to be worked into the product.

5. A method as claimed in claim 3, wherein said predetermined length is a combination of two or more different lengths.

6. A method as claimed in claim 1, wherein said natural fibres are one or a combination of two or more of: hemp, jute, bamboo, kabuya, kenaf, ramie, and sisal.

7. A method as claimed in claim 1, wherein an additional layer of pulp is applied over said natural fibres to thereby sandwich said natural fibres between two layers of pulp.

8. A method as claimed in claim 7, wherein additional natural fibres are applied to the last laid pulp layer.

9. A method as claimed in claim 8, wherein a layer of pulp is applied over said additional natural fibres thereby sandwiching said additional natural fibres between two layers of pulp.

10. A method as claimed in claim 1, wherein additional layers of pulp are added alternately with additional natural fibres to construct a multilayered paper material or product with natural fibres sandwiched between layers of pulp.

11. A method as claimed in claim 1, wherein said pulp is any appropriate paper making pulp including or sourced from wood, fibre crops, waste paper, or rags or a combination of two or more thereof.

12. A paper material or product made by the method of claim 1.

13. A paper material or product as claimed in claim 12, said paper material or product being adapted for use as packaging, bags, wrapping paper, special wrapping paper, mining pipes, special mining pipes, tubes, or tubes for formwork.

14. A method as claimed in claim 2, wherein an additional layer of pulp is applied over said natural fibres to thereby sandwich said natural fibres between two layers of pulp.

15. A method as claimed in claim 3, wherein an additional layer of pulp is applied over said natural fibres to thereby sandwich said natural fibres between two layers of pulp.

16. A method as claimed in claim 2, wherein additional layers of pulp are added alternately with additional natural fibres to construct a multilayered paper material or product with natural fibres sandwiched between layers of pulp.

17. A method as claimed in claim 1, wherein the dry natural fibres are staple fibres.

18. A method as claimed in claim 1, wherein the dry natural fibres are of a length up to and including about 50 mm.

19. A method as claimed in claim 1, wherein the dry natural fibres are added by means of a hopper.

* * * * *